US012782619B2

(12) United States Patent
Hisanaga et al.

(10) Patent No.: US 12,782,619 B2
(45) Date of Patent: Nov. 3, 2026

(54) LAMINATE, VISUAL-LINE TRACKING SYSTEM, AND HEAD-MOUNTED DISPLAY

(71) Applicant: FUJIFILM Corporation, Tokyo (JP)

(72) Inventors: Kazuya Hisanaga, Minamiashigara (JP); Yuki Hirai, Minamiashigara (JP); Kouitsu Sasaki, Minamiashigara (JP); Shinichi Morishima, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 317 days.

(21) Appl. No.: 18/403,158

(22) Filed: Jan. 3, 2024

(65) Prior Publication Data

US 2024/0192414 A1 Jun. 13, 2024

Related U.S. Application Data

(63) Continuation of application No. PCT/JP2022/026712, filed on Jul. 5, 2022.

(30) Foreign Application Priority Data

Jul. 5, 2021 (JP) ................................ 2021-111797

(51) Int. Cl.
*G02B 5/20* (2006.01)
*G02B 5/26* (2006.01)

(52) U.S. Cl.
CPC ............... *G02B 5/208* (2013.01); *G02B 5/26* (2013.01)

(58) Field of Classification Search
None
See application file for complete search history.

(56) References Cited

U.S. PATENT DOCUMENTS 10,852,824 B1 12/2020 Hatzilias et al.
2018/0196179 A1* 7/2018 Takishita ............ C09K 19/322
(Continued)

FOREIGN PATENT DOCUMENTS

CN 109477916 A 3/2019
CN 109725416 A 5/2019
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2022/026712, dated Jan. 18, 2024.
(Continued)

*Primary Examiner* — Ryan Crockett
(74) *Attorney, Agent, or Firm* — Birch, Stewart, Kolasch & Birch, LLP

(57) ABSTRACT

The present invention provides a laminate having excellent clearness of reflected light without impairing visibility of an image, a visual-line tracking system using the laminate, and a head-mounted display on which the visual-line tracking system is mounted.

The laminate including a near infrared light reflecting layer and a near infrared light absorbing layer, in which a visible light transmittance of the laminate is 60% or more, the near infrared light absorbing layer contains a near infrared absorbing compound, and the following expressions (1) and (2) are satisfied.

$$\Delta\theta_1 \leq 3° \quad (1)$$

$$R_2/R_1 \leq 0.1 \quad (2)$$

$\Delta\theta_1$: a half-width of a peak of near infrared reflected light with the highest intensity, which is obtained from a (Continued)

measurement result of an angle dependence of intensity of near infrared light reflected by the near infrared light reflecting layer $R_1$: the highest intensity of near infrared reflected light among peaks of the near infrared reflected light obtained from the measurement result of the angle dependence of the intensity of near infrared light reflected by the near infrared light reflecting layer $R_2$: the second highest intensity of near infrared reflected light among the peaks of the near infrared reflected light obtained from the measurement result of the angle dependence of the intensity of near infrared light reflected by the near infrared light reflecting layer.

7 Claims, 4 Drawing Sheets

(56) References Cited

U.S. PATENT DOCUMENTS

| | | | | |
|---|---|---|---|---|
| 2018/0329489 | A1 | 11/2018 | Price et al. | |
| 2019/0109161 | A1 | 4/2019 | Goto et al. | |
| 2019/0384388 | A1* | 12/2019 | Price | G02B 27/0172 |
| 2023/0137004 | A1* | 5/2023 | Huizen | H04N 25/10 348/77 |

FOREIGN PATENT DOCUMENTS

| | | | |
|---|---|---|---|
| CN | 110927853 | A | 3/2020 |
| CN | 111095048 | A | 5/2020 |
| JP | 2011-107321 | A | 6/2011 |
| JP | 2018-173608 | A | 11/2018 |
| WO | WO2017/056909 | A1 | 4/2017 |

OTHER PUBLICATIONS

International Search Report (Form PCT/ISA/210) for International Application No. PCT/JP2022/026712, dated Aug. 30, 2022, with English translation.

Chinese Office Action and Search Report for corresponding Chinese Application No. 202280047648.7, dated Mar. 27, 2026, with English translation.

Japanese Office Action for corresponding Japanese Application No. 2023-533147, dated May 26, 2026, with English translation.

Chinese Office Action and Search Report for corresponding Chinese Application No. 202280047648.7, dated Jul. 29, 2026, with English translation.

* cited by examiner

LAMINATE, VISUAL-LINE TRACKING SYSTEM, AND HEAD-MOUNTED DISPLAY

CROSS-REFERENCE TO RELATED APPLICATIONS

This application is a Continuation of PCT International Application No. PCT/JP2022/026712 filed on Jul. 5, 2022, which claims priority under 35 U.S.C. § 119(a) to Japanese Patent Application No. 2021-111797 filed on Jul. 5, 2021. The above applications are hereby expressly incorporated by reference, in their entirety, into the present application.

BACKGROUND OF THE INVENTION

1. Field of the Invention

The present invention relates to a laminate, a visual-line tracking system, and a head-mounted display.

2. Description of the Related Art

In recent years, a laminate in which a near infrared light absorbing layer and a near infrared light reflecting layer are laminated has been required for a head-mounted display (HMD) that is means for providing virtual reality (VR) and augmented reality (AR) to a user.

By disposing the laminate between an image display unit of the HMD and an eyeball of the user and using the laminate in a visual-line tracking system using a near infrared light source and a near infrared light detector, it is possible to perform various processes such as displaying an object observed by the user in detail, emphasizing the object observed by the user, focusing on the object observed by the user, displaying the object observed by the user with high resolution, and using the visual line of the user as a pointing device.

For example, JP2011-107321A discloses an infrared ray shielding filter for a display, which is disposed in front of a display panel to shield infrared rays emitted from the display panel, the infrared ray shielding filter having, in the following order from an observer side, at least a near infrared light reflecting layer which transmits visible light and reflects near infrared rays and a near infrared light absorbing layer which transmits visible light and absorbs near infrared rays.

SUMMARY OF THE INVENTION

However, in the infrared ray shielding filter disclosed in JP2011-107321A, there is a problem in that transmittance of visible light is low and visibility of an image to be displayed is deteriorated in a head-mounted display (HMD) application equipped with a visual-line tracking system.

In addition, in the visual-line tracking system, in a case where the infrared rays reflected by the infrared ray shielding filter in the related art is detected by the infrared detector, there are problems in that clearness of the reflected light is deteriorated such that the reflected light is blurred, and accuracy of the visual line tracking is deteriorated.

An object of the present invention is to provide a laminate having excellent clearness of reflected light without impairing visibility of an image, a visual-line tracking system using the laminate, and a head-mounted display on which the visual-line tracking system is mounted.

As a result of intensive examination conducted by the present inventors, it has been found that, in a case where visible light transmittance of a laminate including a near infrared light reflecting layer and a near infrared light absorbing layer is 60% or more, it is possible to provide an HMD equipped with a visual-line tracking system without impairing the visibility of an image. In addition, it has been found that, by containing a near infrared absorbing compound in the near infrared light absorbing layer and by satisfying the expressions (1) and (2), it is possible to provide a laminate, a visual-line tracking system, and an HMD with excellent clearness of reflected light.

$$\Delta\theta_1 \leq 3° \quad (1)$$

$$R_2/R_1 \leq 0.1 \quad (2)$$

In other words, it has been found that the above-described objects can be achieved by employing the following configurations.

[1] A laminate comprising:

a near infrared light reflecting layer; and a near infrared light absorbing layer, in which a visible light transmittance of the laminate is 60% or more, the near infrared light absorbing layer contains a near infrared absorbing compound, and the following expressions (1) and (2) are satisfied, $$\Delta\theta_1 \leq 3° \quad (1)$$

$$R_2/R_1 \leq 0.1 \quad (2)$$

$\Delta\theta_1$: a half-width of a peak of near infrared reflected light with a highest intensity, which is obtained from a measurement result of an angle dependence of intensity of near infrared light reflected by the near infrared light reflecting layer, $R_1$: a highest intensity of near infrared reflected light among peaks of the near infrared reflected light obtained from the measurement result of the angle dependence of the intensity of near infrared light reflected by the near infrared light reflecting layer, $R_2$: a second highest intensity of near infrared reflected light among the peaks of the near infrared reflected light obtained from the measurement result of the angle dependence of the intensity of near infrared light reflected by the near infrared light reflecting layer.

[2] The laminate according to [1], in which the near infrared absorbing compound is a copper compound.

[3] The laminate according to [2], in which the copper compound is a copper complex.

[4] The laminate according to [3], in which the copper complex has a compound having at least two coordination sites.

[5] The laminate according to [4], in which the copper complex has a compound having two or more coordinating atoms which are coordinated with an unshared electron pair.

[6] The laminate according to [1], in which the near infrared light absorbing layer contains two or more near infrared absorbing compounds.

[7] The laminate according to [1], in which the near infrared light reflecting layer includes a cholesteric liquid crystal layer.

[8] A visual-line tracking system comprising:

the laminate according to any one of [1] to [7].

[9] The visual-line tracking system according to [8], in which near infrared light sources are arranged in an array.

[10] A visual-line tracking system comprising:

a laminate including a near infrared light reflecting layer and a near infrared light absorbing layer;

a near infrared light source; and a near infrared light detector, in which a visible light transmittance of the laminate is 60% or more, the near infrared light absorbing layer contains a near infrared absorbing compound, the laminate satisfies the following expressions (1) and (2), and at least a part of near infrared rays irradiated from the near infrared light source to an eyeball of a user is reflected by the eyeball of the user, at least a part of the reflected near infrared rays is reflected by the near infrared light reflecting layer, and the near infrared light detector detects the reflected near infrared rays, $$\Delta\theta_1 \leq 3^\circ \quad (1)$$

$$R_2/R_1 \leq 0.1 \quad (2)$$

$\Delta\theta_1$: a half-width of a peak of near infrared reflected light with a highest intensity, which is obtained from a measurement result of an angle dependence of intensity of near infrared light reflected by the near infrared light reflecting layer, $R_1$: a highest intensity of near infrared reflected light among peaks of the near infrared reflected light obtained from the measurement result of the angle dependence of the intensity of near infrared light reflected by the near infrared light reflecting layer, $R_2$: a second highest intensity of near infrared reflected light among the peaks of the near infrared reflected light obtained from the measurement result of the angle dependence of the intensity of near infrared light reflected by the near infrared light reflecting layer.

[11] The visual-line tracking system according to [10], in which near infrared light sources are arranged in an array.

[12] The visual-line tracking system according to [10], in which an area of the near infrared light reflecting layer is smaller than an area of the near infrared light absorbing layer.

[13] The visual-line tracking system according to [10], further comprising:

a near infrared light absorbing layer at a position different from the near infrared light absorbing layer.

[14] A head-mounted display comprising:

the visual-line tracking system according to any one of to [13].

[15] A head-mounted display comprising:

the visual-line tracking system according to [8].

According to the present invention, it is possible to provide a laminate having excellent clearness of reflected light without impairing visibility of an image, a visual-line tracking system using the laminate, and an HMD on which the visual-line tracking system is mounted.

DESCRIPTION OF THE PREFERRED EMBODIMENTS

Hereinafter, the present invention will be described in detail. Although configuration requirements to be described below are described based on representative embodiments of the present invention, the present invention is not limited to the embodiments. In the present specification, a numerical range expressed using "to" means a range including numerical values described before and after "to" as a lower limit value and an upper limit value.

In the present specification, visible light is light having a wavelength that can be seen by human eyes among electromagnetic waves, and indicates light in a wavelength range of 380 to 780 nm. Near infrared light is light in a wavelength range of 780 nm to 2500 nm.

In addition, in the present specification, a liquid crystalline composition and a liquid crystalline compound include those which no longer exhibit liquid crystal properties due to curing or the like as a concept.

<Laminate>

Figure 1:
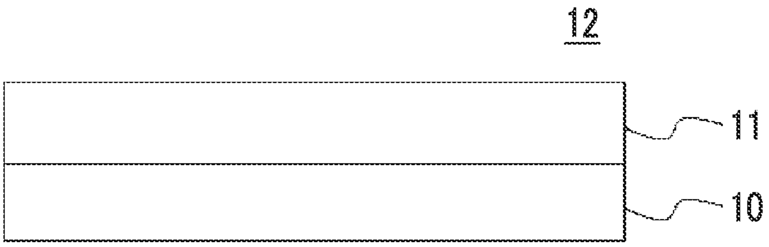
FIG. 1 is a schematic cross-sectional view of a laminate according to the embodiment of the present invention.

FIG. 1 is a schematic cross-sectional view showing an example according to the embodiment of the laminate of the present invention. A laminate 12 shown in FIG. 1 has a configuration in which a near infrared light reflecting layer 11 is laminated on a near infrared light absorbing layer 10. The near infrared light absorbing layer 10 has a light absorption peak in a near infrared wavelength range (also referred to as a near infrared range). In addition, the near infrared light reflecting layer 11 has a light reflection peak in the near infrared range.

The laminate according to the embodiment of the present invention has a visible light transmittance of 60% or more, the near infrared light absorbing layer contains a near infrared absorbing compound, and the following expressions (1) and (2) are satisfied.

$$\Delta\theta_1 \leq 3^\circ \quad (1)$$

$$R_2/R_1 \leq 0.1 \quad (2)$$

$\Delta\theta_1$: a half-width of a peak of near infrared reflected light with the highest intensity, which is obtained from a measurement result of an angle dependence of intensity of near infrared light reflected by the near infrared light reflecting layer $R_1$: the highest intensity of near infrared reflected light among peaks of the near infrared reflected light obtained from the measurement result of the angle dependence of the intensity of near infrared light reflected by the near infrared light reflecting layer $R_2$: the second highest intensity of near infrared reflected light among the peaks of the near infrared reflected light obtained from the measurement result of the angle dependence of the intensity of near infrared light reflected by the near infrared light reflecting layer Since the laminate according to the embodiment of the present invention has such a configuration, in a case where the laminate is used for a head-mounted display (HMD) equipped with a visual-line tracking system, it is possible to prevent visibility of a displayed image from being deteriorated. In addition, in the visual-line tracking system, since the reflected light reflected by the laminate is suppressed from being blurred and clearness of the reflected light can be increased, accuracy of the visual-line tracking can be improved.

In addition, the laminate according to the embodiment of the present invention may include a bonding layer between the near infrared light absorbing layer 10 and the near infrared light reflecting layer 11. As the bonding layer, layers formed of various known materials can be used as long as the layers can bond objects to be bonded to each other. The bonding layer may be a layer formed of an adhesive which has fluidity in a case of bonding and then is to be a solid, a layer formed of a pressure sensitive adhesive which is a gel-like (rubber-like) soft solid in a case of bonding and the gel-like state does not change thereafter, or a layer formed of a material having characteristics of both the adhesive and the pressure sensitive adhesive. Accordingly, as the bonding layer, a known layer used for bonding a sheet-like material in an optical device, an optical element, or the like, such as an optical clear adhesive (OCA), an optically transparent double-sided tape, and an ultraviolet curable resin, may be used.

In addition, it is preferable that a difference in refractive index between the bonding layer and the layer to be laminated is small. In a case where the difference in refractive index is small, interface reflection between the layers of the laminate can be suppressed, and reflection performance described later can be enhanced.

The laminate according to the embodiment of the present invention may be formed by holding each layer with a frame, a holding device, or the like without using the bonding layer.

In addition, the laminate according to the embodiment of the present invention may further include any of a light transmitting layer, a light reflecting layer, a light absorbing layer, an ultraviolet absorbing layer, an antireflection layer, or the like, and may include a combination of these layers.

{Visible Light Transmittance}

From the viewpoint of image visibility in a case of being mounted on HMD, the laminate according to the embodiment of the present invention preferably has a visible light transmittance of 60% or more. In addition, the visible light transmittance is more preferably 80% or more, and particularly preferably 95% or more. In addition, the visible light transmittance does not need to satisfy the above-described condition in the entire visible light wavelength range, and the wavelength range may be changed in accordance with a luminescence wavelength of an image display device of the HMD to be used. For example, in a case where an organic electroluminescent display is used, it is sufficient that a visible light transmittance in a wavelength range of 400 to 700 nm satisfies the above-described condition.

The visible light transmittance of the laminate can be obtained by measuring a transmittance T(550) [%] at a wavelength of 550 nm using an ultraviolet-visible-near infrared analyzing photometer ("UV-3100", manufactured by Shimadzu Corporation).

{Reflection Performance}

In the laminate according to the embodiment of the present invention, it is preferable that the half-width $\Delta\theta_1$ of a peak of near infrared reflected light with a highest intensity, which is obtained from a measurement result of an angle dependence of intensity of near infrared light reflected by the near infrared light reflecting layer, the highest intensity $R_1$ of near infrared reflected light among peaks of the near infrared reflected light, and the second highest intensity $R_2$ satisfy the following expressions (1) and (2).

$$\Delta\theta_1 \leq 3^\circ \quad (1)$$

$$R_2/R_1 \leq 0.1 \quad (2)$$

By satisfying the expressions (1) and (2), since the reflected light as a reflected signal can be clearly reflected and the reflected light as a noise can be reduced, it is possible to perform visual-line detection with a high S/N ratio in a case of being used in, for example, the visual-line tracking system. In addition, the laminate according to the embodiment of the present invention is not limited to the above-described applications, and can be used in various sensing devices using near infrared rays. In addition, $\Delta\theta_1$ is more preferably 2° or less, and particularly preferably 1° or less. Examples of the lower limit thereof include 0°. $R_2/R_1$ is more preferably 0.05 or less, and particularly preferably 0.01 or less. Examples of the lower limit thereof include 0.

Figure 6:
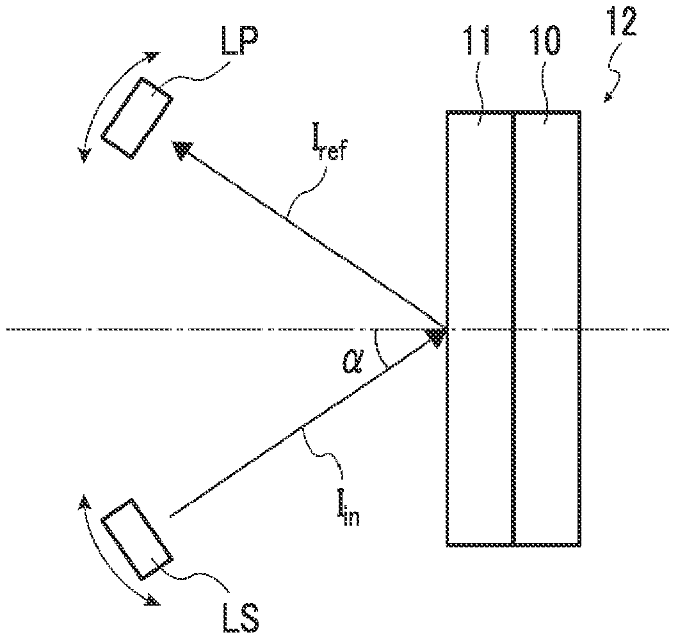
FIG. 6 is a diagram for describing a method of measuring a distribution of intensity of reflected light with respect to an incidence angle of a laminate.
Figure 7:
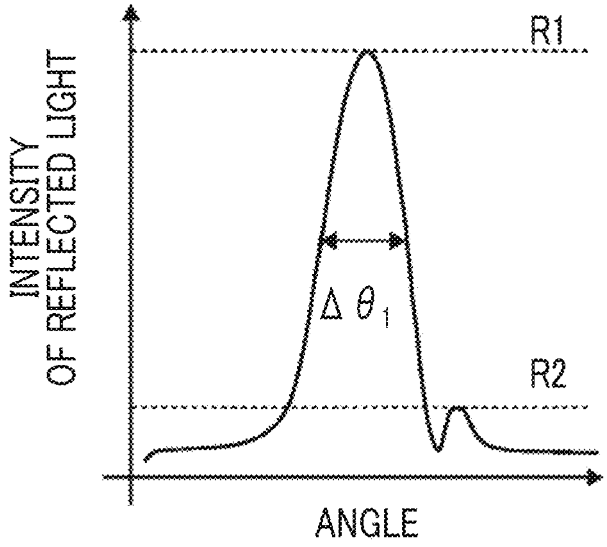
FIG. 7 is a graph schematically illustrating a relationship between the angle and the intensity of reflected light.

The reflection performance (the half-width $\Delta\theta_1$ of the peak of near infrared reflected light and the ratio $R_2/R_1$ of the intensity of reflected light) of the laminate is measured as follows. As shown in FIG. 6, a surface of the laminate 12 on the near infrared light reflecting layer 11 side is irradiated with incidence light $I_{in}$ at an incidence angle $\alpha$ from a laser light source LS (for example, wavelength of 980 nm), and an intensity of reflected light $I_{ref}$ reflected from the near infrared light reflecting layer 11 is detected by an infrared detector LP (for example, laser power meter LP-1 (manufactured by Sanwa Electric Instrument Co., Ltd.)). At this time, the intensity of the reflected light $I_{ref}$ is detected at an angle at which the intensity is the highest. The incidence angle $\alpha$ is changed from any angle in increments of 0.5°, and the intensity of reflected light for each incidence angle $\alpha$ is measured. As a result, a graph showing a relationship between the incidence angle $\alpha$ and the reflection intensity, as schematically shown in FIG. 7, is obtained. From the obtained intensity distribution for each incidence angle $\alpha$, the half-width $\Delta\theta_1$ of the peak of reflected light having the highest intensity, and the ratio $R_2/R_1$ between the reflection intensity $R_1$ of the peak of reflected light having the highest intensity and the reflection intensity $R_2$ of the peak of reflected light having the second highest intensity are calculated.

In the laminate according to the embodiment of the present invention, it is preferable that smoothness of a surface of the near infrared light reflecting layer is high and a haze of the laminate is small. As a result, scattering of the reflected light can be suppressed, and the above-described reflection performance can be enhanced.

[Near Infrared Light Absorbing Layer]

In the present invention, it is preferable that the near infrared light absorbing layer contains a near infrared absorbing compound. In addition, the near infrared light absorbing layer may contain two or more near infrared absorbing compounds. The near infrared absorbing compound is not particularly limited as long as it is a compound having absorption in the above-described near infrared range, and is preferably a copper compound. The above-described copper compound may be or may not be a copper complex, but is more preferably a copper complex. In a case where the near infrared light absorbing layer contains a copper complex as the near infrared absorbing compound, the near infrared light absorbing layer is formed of a composition for forming a copper complex layer, containing a copper complex.

<<Copper Complex>>

The composition for forming a copper complex layer contains a copper complex. As the copper complex, a complex of copper and a compound (ligand) having a coordination site for copper is preferable. Examples of the coordination site for copper include a coordination site to be coordinated with an anion and a coordinating atom to be coordinated with an unshared electron pair. The copper complex preferably has two or more ligands. In a case of having two or more ligands, the respective ligands may be the same or different from each other. Examples of the copper complex include a tetracoordinate copper complex, a pentacoordinate copper complex, and a hexacoordinate copper complex; and a tetracoordinate copper complex or a pentacoordinate copper complex is more preferable, and a pentacoordinate copper complex is still more preferable. In addition, in the copper complex, it is preferable that the copper and the ligand form a 5-membered ring and/or a 6-membered ring. Such a copper complex has a stable shape and excellent complex stability.

A content of metals other than the copper in the copper complex is preferably 10% by mass or less, more preferably 5% by mass or less, and still more preferably 2% by mass or less with respect to the solid content of the copper complex. According to this aspect, a film in which foreign matter defects are suppressed is easily formed. In addition, a lithium content of the copper complex is preferably 100 ppm by mass or less. In addition, a potassium content of the copper complex is preferably 30 ppm by mass or less. Examples of a method for reducing the content of metals other than the copper in the copper complex include a method of purifying the copper complex by a method such as reprecipitation, recrystallization, column chromatography, and sublimation purification. In addition, it is also possible to use a method in which the copper complex is dissolved in a solvent and then purified by filtration through a filter. Examples of a preferred aspect of the filter include a filter described in the section of the preparation of the composition, which will be described later. The content of the metals other than the copper in the copper complex can be measured by inductively coupled plasma optical emission spectroscopy.

A moisture content in the copper complex is preferably 5% by mass or less, more preferably 3% by mass or less, and still more preferably 1% by mass or less. According to this aspect, a composition having excellent temporal stability is easily prepared.

The total content of a free halogen anion and a halogen compound in the copper complex is preferably 5% by mass or less, more preferably 3% by mass or less, and still more preferably 1% by mass or less with respect to the total solid content of the copper complex. According to this aspect, a composition having excellent temporal stability is easily prepared.

In the present invention, it is also preferable that the copper complex is a copper complex other than a phthalocyanine copper complex. Here, the phthalocyanine copper complex is a copper complex having a compound having a phthalocyanine skeleton as a ligand. The compound having a phthalocyanine skeleton has a planar structure in which a π-electron conjugated system extends over the entire molecule. The phthalocyanine copper complex absorbs light through a π-π* transition. In order to absorb light in an infrared range by the π-π* transition, a compound serving as a ligand needs to have a long conjugated structure. However, in a case where the conjugated structure of the ligand is lengthened, visible transparency tends to decrease. Therefore, the phthalocyanine copper complex may be insufficient in visible transparency. In addition, it is also preferable that the copper complex is a copper complex having a compound having no maximal absorption wavelength in a wavelength range of 400 to 600 nm as a ligand. Since the copper complex having a compound having a maximal absorption wavelength in a wavelength range of 400 to 600 nm as a ligand has absorption in a visible range (for example, in a wavelength range of 400 to 600 nm), visible transparency may be insufficient. Examples of the compound having a maximal absorption wavelength in a wavelength range of 400 to 600 nm include a compound having a long conjugated structure and a large light absorption of π-π* transition. Specific examples thereof include a compound having a phthalocyanine skeleton.

The copper complex can be obtained by, for example, mixing and/or reacting a copper component (copper or a compound containing copper) with the compound (ligand) having a coordination site for copper. The compound (ligand) having a coordination site for copper may be a low-molecular-weight compound or a polymer. Both can be used in combination. It is preferable that the copper component is diluted or dissolved in methanol and then filtered before use. A pore diameter of a filter paper or a filter used for the filtration is preferably 1 μm or less.

Regarding a copper complex in which the ligand is stoichiometrically coordinated with copper at a molar ratio of copper:ligand=1:p, it is preferable that the molar ratio of reaction between the copper component and the ligand in the copper complex synthesis is set to 1:q (here, $q \geq p$ and q is any number). In a case where $q<p$, the copper component as a raw material is likely to remain in the copper complex, which causes a deterioration in visible transparency or a foreign matter defect. A residual ratio of the copper component as a raw material in the copper complex (a content of the copper component which is not coordinated with the ligand) is preferably 10% by mass or less, more preferably 5% by mass or less, and still more preferably 2% by mass or less with respect to the solid content of the copper complex. In addition, in a case where the ligand remains excessively in the copper complex, the visible transparency may decrease, the number of foreign matter defects may increase, or heat stability of the composition may decrease. Therefore, it is preferable that $p \leq q \leq 2p$, more preferable that $p \leq q \leq 1.5p$, and still more preferable that $p \leq q \leq 1.2p$. A residual ratio of the ligand in the copper complex (a content of the ligand which is not coordinated with the copper) is preferably 10% by mass or less, more preferably 5% by mass or less, and still more preferably 2% by mass or less with respect to the solid content of the copper complex. In addition, in the production of the copper complex, it is preferable to provide a plurality of crystallization steps. In the crystallization, it is preferable that an amount of a good solvent is smaller than that of a poor solvent. In addition, in a case of providing a plurality of crystallization steps, it is preferable that the solid content of the copper complex is adjusted to 80% by mass and then the next crystallization step is performed.

The copper component is preferably a compound including divalent copper. As the copper component, one kind may be used alone, or two or more kinds may be used. As the copper component, for example, a copper oxide or a copper salt can be used. For example, the copper salt is preferably copper carboxylates (such as copper acetate, copper ethyl acetoacetate, copper formate, copper benzoate, copper stearate, copper naphthenate, copper citrate, and copper 2-ethylhexanoate), copper sulfonates (such as copper methanesulfonate), copper phosphate, copper phosphate ester, copper phosphonate, copper phosphonate ester, copper phosphinate, copper amide, copper sulfonamide, copper imide, copper acylsulfonimide, copper bissulfonimide, copper methide, alkoxy copper, phenoxy copper, copper hydroxide, copper carbonate, copper sulfate, copper nitrate, copper perchlorate, copper fluoride, copper chloride, or copper bromide; more preferably copper carboxylate, copper sulfonate, copper sulfonamide, copper imide, copper acylsulfonimide, copper bissulfonimide, alkoxy copper, phenoxy copper, copper hydroxide, copper carbonate, copper fluoride, copper chloride, copper sulfate, or copper nitrate; still more preferably copper carboxylate, copper acylsulfonimide, phenoxy copper, copper chloride, copper sulfate, or copper nitrate; and particularly preferably copper carboxylate, copper acylsulfonimide, copper chloride, or copper sulfate. In particular, as the copper phosphonate, the following aspects are preferable:

a copper phosphonate formed by a phosphonic acid represented by Formula (a) and a copper ion; or a copper phosphate formed by a phosphate compound including at least one of a phosphoric acid diester represented by Formula (c1) or a phosphoric acid monoester represented by Formula (c2) and a copper ion.

(a)

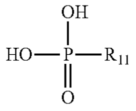

[in the formula, Rui represents a phenyl group, a nitrophenyl group, a hydroxyphenyl group, a halogenated phenyl group in which at least one hydrogen atom in a phenyl group is substituted with a halogen atom, an alkyl group having 6 or less carbon atoms, a benzyl group, or a halogenated benzyl group in which at least one hydrogen atom in a benzene ring of a benzyl group is substituted with a halogen atom]

The phosphonic acid represented by Formula (a) is not particularly limited, and examples thereof include phenylphosphonic acid, nitrophenylphosphonic acid, hydroxyphenylphosphonic acid, bromophenylphosphonic acid, dibromophenylphosphonic acid, fluorophenylphosphonic acid, difluorophenylphosphonic acid, chlorophenylphosphonic acid, dichlorophenylphosphonic acid, ethylphosphonic acid, methylphosphonic acid, propylphosphonic acid, butylphosphonic acid, pentylphosphonic acid, hexylphosphonic acid, benzylphosphonic acid, bromobenzylphosphonic acid, dibromobenzylphosphonic acid, fluorobenzylphosphonic acid, difluorobenzylphosphonic acid, chlorobenzylphosphonic acid, and dichlorobenzylphosphonic acid.

(c1)

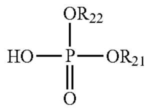

(c2)

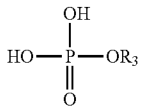

In Formula (c1) and Formula (c2), $R_{21}$, $R_{22}$, and $R_3$ are each a monovalent functional group represented by $-(CH_2CH_2O)_nR_4$, in which n is an integer of 1 to 25 and $R_4$ represents an alkyl group having 6 to 25 carbon atoms. $R_{21}$, $R_{22}$, and $R_3$ are functional groups of the same type or different types.

In the present invention, the copper complex is preferably a compound having a maximal absorption wavelength in a wavelength range of 700 to 1200 nm. The maximal absorption wavelength of the copper complex is more preferably in a wavelength range of 720 to 1200 nm and still more preferably in a wavelength range of 800 to 1100 nm. The maximal absorption wavelength can be measured using, for example, Cary 5000 UV-Vis-NIR (spectrophotometer, manufactured by Agilent Technologies, Inc.). A molar absorption coefficient of the copper complex at the maximal absorption wavelength in the above-described wavelength range is preferably 120 (L/mol·cm) or more, more preferably 150 (L/mol·cm) or more, still more preferably 200 (L/mol·cm) or more, even more preferably 300 (L/mol·cm) or more, and particularly preferably 400 (L/mol·cm) or more. The upper limit thereof is not particularly limited, but can be, for example, 30,000 (L/mol·cm) or less. In a case where the above-described molar absorption coefficient of the copper complex is 100 (L/mol·cm) or more, a near infrared light absorbing layer having excellent infrared shielding property can be formed even in a case of a thin film. A gram light absorption coefficient of the copper complex at a wavelength of 800 nm is preferably 0.11 (L/g·cm) or more, more preferably 0.15 (L/g·cm) or more, and still more preferably 0.24 (L/g·cm) or more. In the present invention, the molar absorption coefficient and the gram light absorption coefficient of the copper complex can be obtained by dissolving the copper complex in a measurement solvent to prepare a solution having a concentration of 1 g/L, and measuring an absorption spectrum of the solution in which the copper complex is dissolved. As a measuring apparatus, UV 1800 (wavelength range: 200 to 1100 nm) manufactured by Shimadzu Corporation and Cary 5000 (wavelength range: 200 to 1300 nm) manufactured by Agilent Technologies, Inc. can be used. Examples of the measurement solvent include water, N,N-dimethylformamide, propylene glycol monomethyl ether, 1,2,4-trichlorobenzene, and acetone. In the present invention, a solvent capable of dissolving the copper complex to be measured is selected from the above-described measurement solvents and used. Among these, in a case of a copper complex dissolved in propylene glycol monomethyl ether, propylene glycol monomethyl ether is preferably used as the measurement solvent. The "dissolve" means that a solubility of the copper complex in the solvent at 25 °C exceeds 0.01 g/100 g Solvent. In the present invention, the molar absorption coefficient and the gram light absorption coefficient of the copper complex are preferably values measured using any one of the above-described measurement solvents, and more preferably values in propylene glycol monomethyl ether.

(Low-Molecular-Weight-Type Copper Complex)

As the copper complex, for example, a copper complex represented by Formula (Cu-1) can be used. This copper complex is a copper complex in which a ligand L is coordinated with copper as a central metal, and the copper is usually divalent copper. This copper complex can be obtained, for example, by reacting a compound serving as the ligand L or a salt thereof with the copper component.

$$Cu(L)_{n1}\cdot(X)_{n2} \qquad \text{Formula (Cu-1)}$$

In the formula, L represents a ligand coordinated with copper, and X represents a counter ion. n1 represents an integer of 1 to 4. n2 represents an integer of 0 to 4.

X represents a counter ion. The copper complex may be a neutral complex having no charge, a cation complex, or an anion complex. In this case, a counter ion optionally present to neutralize the charge of the copper complex.

In a case where the counter ion is a negative counter ion (counter anion), for example, the counter ion may be an inorganic anion or an organic anion. Examples of the counter anion include a hydroxide ion, a halogen anion (such as a fluoride ion, a chloride ion, a bromide ion, and an iodide ion), a substituted or unsubstituted alkyl carboxylate ion (such as an acetate ion and a trifluoroacetate ion), a substituted or unsubstituted arylcarboxylic acid ion (such as a benzoate ion), a substituted or unsubstituted alkylsulfonate ion (such as a methanesulfonate ion and a trifluoromethanesulfonate ion), a substituted or unsubstituted arylsulfonate ion (such as a p-toluenesulfonate ion and p-chlorobenzenesulfonate ion), an aryldisulfonate ion (such as a 1,3-benzenedisulfonate ion, a 1,5-naphthalenedisulfonate ion, and a 2,6-naphthalenedisulfonate ion), an alkylsulfate ion (such as a methylsulfate ion), a sulfate ion, a thiocyanate ion, a nitrate ion, a perchlorate ion, a borate ion (such as a tetrafluoroborate ion, a tetraarylborate ion, and a tetrakis(pentafluorophenyl)borate ion ($B—(C_6F_5)_4$), a sulfonate ion (such as a p-toluenesulfonate ion), an imide ion (such as a sulfonimide ion, an N,N-bis(fluorosulfonyl)imide ion, a bis(trifluoromethanesulfonyl)imide ion, a bis(nonafluorobutanesulfonyl)imide ion, and an N,N-hexafluoro-1,3-disulfonylimide ion), a phosphate ion, a hexafluorophosphate ion, a picrate ions, an amide ion (including, for example, amides substituted with an acyl group or a sulfonyl group), and a methide ions (including, for example, methides substituted with an acyl group or a sulfonyl group). Among these, a halogen anion, a substituted or unsubstituted alkylcarboxylate ion, a sulfate ion, a nitrate ion, a tetrafluoroborate ion, a tetraarylborate ion, a hexafluorophosphate ion, an amide ion (including, for example, amides substituted with an acyl group or a sulfonyl group), or a methide ion (including methides substituted with an acyl group or a sulfonyl group) is preferable.

In addition, the counter anion is preferably a low nucleophilic anion. The low nucleophilic anion is an anion formed by dissociation of a proton by an acid having a low pKa, which is generally called a superacid. The definition of the superacid varies depending on the literature, but is a general term for acids having a lower pKa than methanesulfonic acid, and a structure described in J. Org. Chem. 2011, 76, pp. 391 to 395 Equilibrium Acidities of Superacids has been known. The pKa of the low nucleophilic anion is, for example, preferably −11 or less and more preferably −11 to −18. The pKa can be measured, for example, by a method described in J. Org. Chem. 2011, 76, pp. 391 to 395. A pKa value in the present specification is a pKa in 1,2-dichloroethane unless otherwise specified. In a case where the counter anion is the low nucleophilic anion, a decomposition reaction of the copper complex or a resin hardly occurs, and heat resistance is favorable. The low nucleophilic anion is more preferably a tetrafluoroborate ion, a tetraarylborate ion (including aryls substituted with a halogen atom or a fluoroalkyl group), a hexafluorophosphate ion, an imide ion (including amides substituted with an acyl group or a sulfonyl group), or a methide ion (including methides substituted with an acyl group or a sulfonyl group); and more preferably a tetraarylborate ion (including aryls substituted with a halogen atom or a fluoroalkyl group), an imide ion (including amides substituted with a sulfonyl group), or a methide ion (including methides substituted with a sulfonyl group).

In addition, in the present invention, it is also preferable that the counter anion is a halogen anion, a carboxylate ion, a sulfonate ion, a borate ion, a sulfonate ion, or an imide ion. Specific examples thereof include a chloride ion, a bromide ion, an iodide ion, an acetate ion, a trifluoroacetate ion, a formate ion, a phosphate ion, a hexafluorophosphate ion, a p-toluenesulfonate ion, a tetrafluoroborate ion, a tetrakis (pentafluorophenyl)borate ion, an N,N-bis(fluorosulfonyl) imide ion, a bis(trifluoromethanesulfonyl)imide ion, a a nonafluoro-N-bis(nonafluorobutanesulfonyl)imide ion, [(trifluoromethane)sulfonyl]butanesulfonylimide ion, and an N,N-hexafluoro-1,3-disulfonylimide ion. Among these, a trifluoroacetate ion, a hexafluorophosphate ion, a tetrafluborate ion, a tetrakis(pentafluorophenyl)borate ion, an N,N-bis (fluorosulfonyl)imide ion, a bis(trifluoromethanesulfonyl) imide ion, a bis(nonafluorobutanesulfonyl)imide ion, a nonafluoro-N-[(trifluoromethane)sulfonyl]butanesulfonylimide ion, or an N,N-hexafluoro-1,3-disulfonylimide ion is preferable; and a trifluoroacetate ion, a tetrakis(pentafluorophenyl)borate ion, an N,N-bis(fluorosulfonyl)imide ion, a bis(trifluoromethanesulfonyl)imide ion, a bis(nonafluorobutanesulfonyl)imide ion, a nonafluoro-N-[(trifluoromethane) sulfonyl]butanesulfonylimide ion, or an N,N-hexafluoro-1, 3-disulfonylimide ion is more preferable.

In a case where the counter ion is a positive counter ion (counter cation), examples thereof include inorganic or organic ammonium ions (for example, a tetraalkylammonium ion such as a tetrabutylammonium ion, a triethylbenzylammonium ion, a pyridinium ion, and the like), phosphonium ions (for example, a tetraalkylphosphonium ion such as a tetrabutylphosphonium ion, an alkyltriphenylphosphonium ion, a triethylphenylphosphonium ion, and the like), an alkali metal ion, and a proton.

In addition, the counter ion may be a metal complex ion (for example, a copper complex ion).

The ligand L is a compound having a coordination site for copper, and examples thereof include a compound having one or more selected from a coordination site coordinated with copper by an anion or a coordinating atom coordinated with copper by an unshared electron pair. The coordination site coordinated by an anion may or may not be dissociable. As the ligand L, a compound (multidentate ligand) having two or more coordination sites coordinated with copper is preferable. In addition, in order to improve visible transmittance, it is preferable that a plurality of π-conjugated systems such as aromatic compounds are not continuously bonded in the ligand L. As the ligand L, a compound (monodentate ligand) having one coordination site with copper and a compound (multidentate ligand) having two or more coordination sites with copper can be used in combination. Examples of the monodentate ligand include a monodentate ligand coordinated by an anion or an unshared electron pair. Examples of the ligand coordinated by an anion include a halide anion, a hydroxide anion, an alkoxide anion, a phenoxide anion, an amide anion (including amides substituted with an acyl group or a sulfonyl group), an imide anion (including imides substituted with an acyl group or a sulfonyl group), an anilide anion (including anilides substituted with an acyl group or a sulfonyl group), a thiolate anion, a hydrogen carbonate anion, a carboxylic acid anion, a thiocarboxylic acid anion, a dithiocarboxylic acid anion, a hydrogen sulfate anion, a sulfonic acid anion, a dihydrogen phosphate anion, a phosphoric acid diester anion, a phosphonic acid monoester anion, a phosphonic acid hydrogen anion, a phosphinate anion, a nitrogen-containing heterocyclic anion, a nitrate anion, a hypochlorite anion, a cyanide anion, a cyanate anion, an isocyanate anion, a thiocyanate anion, an isothiocyanate anion, and an azide anion. Examples of the monodentate ligand coordinated by an unshared electron pair include water, alcohol, phenol, ether, amine, aniline, amide, imide, imine, nitrile, isonitrile, thiol, thioether, a carbonyl compound, a thiocarbonyl compound, sulfoxide, a heterocycle, carbonic acid, carboxylic acid, sulfuric acid, sulfonic acid, phosphoric acid, phosphonic acid, phosphinic acid, a nitric acid, and an ester thereof.

It is sufficient that the anion included in the above-described ligand L is capable of coordinating to a copper atom, and the anion is preferably an oxygen anion, a nitrogen anion, or a sulfur anion. The coordination site to be coordinated by an anion is preferably at least one selected from the following group of monovalent functional groups (AN-1) or group of divalent functional groups (AN-2). A wave line in the following structural formulae is a bonding position with an atomic group constituting the ligand.

Group (AN-1)

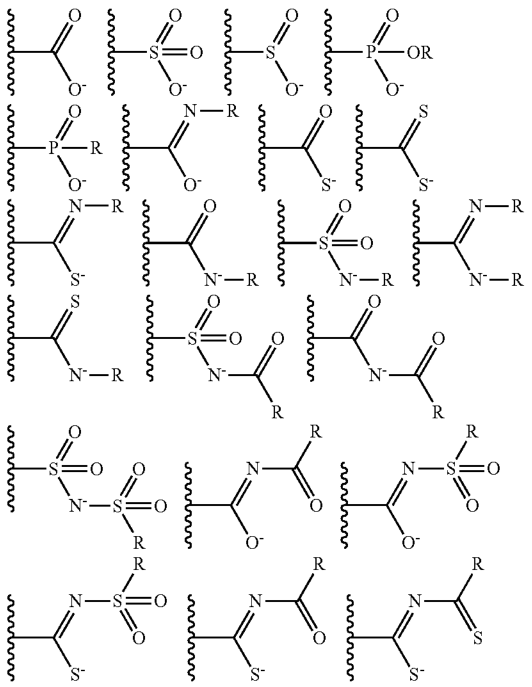

-continued

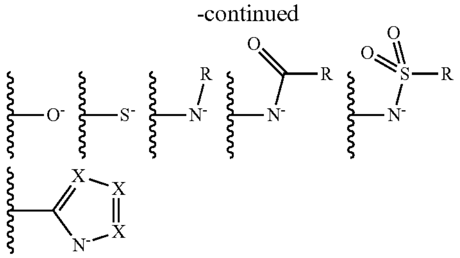

Group (AN-2)

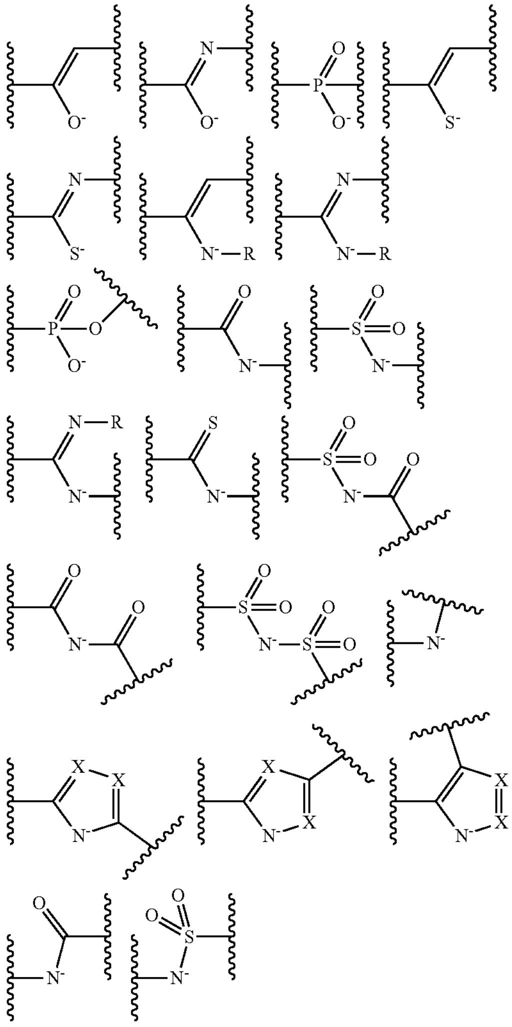

In the formulae, X represents N or CR, and R's each independently represent a hydrogen atom, an alkyl group, an alkenyl group, an alkynyl group, an aryl group, or a heteroaryl group.

The alkyl group represented by R may be linear, branched, or cyclic, but is preferably linear. The number of carbon atoms in the alkyl group is preferably 1 to 10, more preferably 1 to 6, and still more preferably 1 to 4. Examples of the alkyl group include a methyl group. The alkyl group may have a substituent. Examples of the substituent include a halogen atom, a carboxyl group, and a heterocyclic group. The heterocyclic group as the substituent may be monocyclic or polycyclic, and may be aromatic or non-aromatic. The number of heteroatoms constituting the heterocycle is preferably 1 to 3, and more preferably 1 or 2. It is preferable that the heteroatom constituting the heterocycle is a nitrogen atom. In a case where the alkyl group has the substituent, the substituent may further have a substituent. The alkenyl group represented by R may be linear, branched, or cyclic, but is preferably linear. The number of carbon atoms in the alkenyl group is preferably 2 to 10 and more preferably 2 to 6. The alkenyl group may be unsubstituted or may have a substituent. Examples of the substituent include those described above.

The alkynyl group represented by R may be linear, branched, or cyclic, but is preferably linear. The number of carbon atoms in the alkynyl group is preferably 2 to 10 and more preferably 2 to 6. The alkynyl group may be unsubstituted or may have a substituent. Examples of the substituent include those described above.

The aryl group represented by R may be monocyclic or polycyclic, but is preferably monocyclic. The number of carbon atoms in the aryl group is preferably 6 to 18, more preferably 6 to 12, and still more preferably 6. The aryl group may be unsubstituted or may have a substituent. Examples of the substituent include those described above.

The heteroaryl group represented by R may be monocyclic or polycyclic. The number of heteroatoms constituting the heteroaryl group is preferably 1 to 3. The heteroatom constituting the heteroaryl group is preferably a nitrogen atom, a sulfur atom, or an oxygen atom. The number of carbon atoms in the heteroaryl group is preferably 6 to 18 and more preferably 6 to 12. The heteroaryl group may be unsubstituted or may have a substituent. Examples of the substituent include those described above.

Examples of the coordination site to be coordinated by an anion also include a monoanionic coordination site. The monoanionic coordination site denotes a site for coordination to a copper atom through a functional group having one negative charge. Examples thereof include an acid group having an acid dissociation constant (pKa) of 12 or less. Specific examples thereof include an acid group containing a phosphorus atom (a phosphoric acid diester group, a phosphonic acid monoester group, a phosphinic acid group, and the like), a sulfo group, a carboxyl group, and an imide acid group; and a sulfo group or a carboxyl group is preferable.

The coordinating atom coordinated by an unshared electron pair is preferably an oxygen atom, a nitrogen atom, a sulfur atom, or a phosphorus atom; more preferably an oxygen atom, a nitrogen atom, or a sulfur atom; still more preferably an oxygen atom or a nitrogen atom; and particularly preferably a nitrogen atom. In a case where the coordinating atom coordinated by an unshared electron pair is a nitrogen atom, an atom adjacent to the nitrogen atom is preferably a carbon atom or a nitrogen atom and more preferably a carbon atom.

It is preferable that the coordinating atom coordinated by an unshared electron pair is included in a ring or included in at least one partial structure selected from the following groups of monovalent functional groups (UE-1), divalent functional groups (UE-2), and trivalent functional groups (UE-3). A wave line in the following structural formulae is a bonding position with an atomic group constituting the ligand.

Group (UE-1)

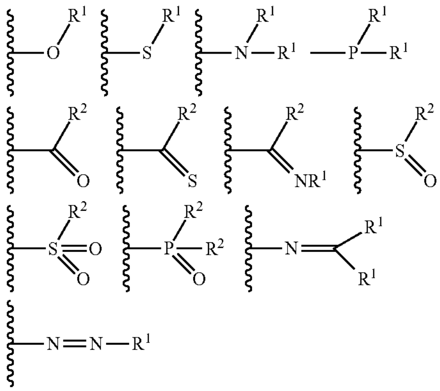

Group (UE-2)

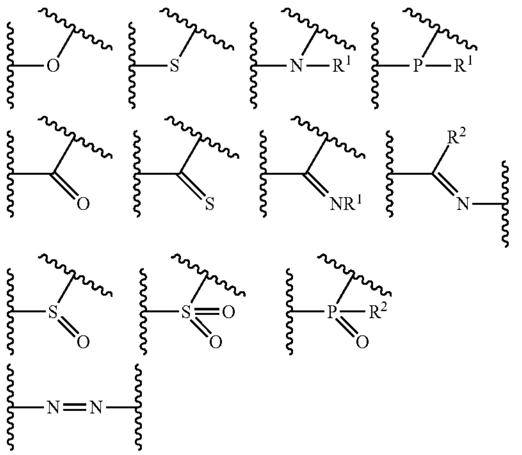

Group (UE-3)

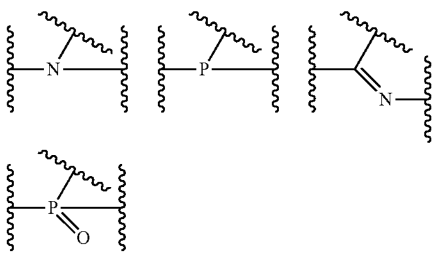

In the groups (UE-1) to (UE-3), $R^1$ represents a hydrogen atom, an alkyl group, an alkenyl group, an alkynyl group, an aryl group, or a heteroaryl group, and $R^2$ represents a hydrogen atom, an alkyl group, an alkenyl group, an alkynyl group, an aryl group, a heteroaryl group, an alkoxy group, an aryloxy group, a heteroaryloxy group, an alkylthio group, an arylthio group, a heteroarylthio group, an amino group, or an acyl group.

The coordinating atom coordinated by an unshared electron pair may be included in a ring. In a case where the coordinating atom coordinated by an unshared electron pair is included in a ring, the ring including the coordinating atom coordinated by an unshared electron pair may be monocyclic or polycyclic, and may be aromatic or non-aromatic. The ring including the coordinating atom coordinated by an unshared electron pair is preferably a 5- to 12-membered ring and more preferably a 5- to 7-membered ring.

The ring including the coordinating atom coordinated by an unshared electron pair may have a substituent, and examples of the substituent include a linear, branched, or cyclic alkyl group having 1 to 10 carbon atoms, an aryl group having 6 to 12 carbon atoms, a halogen atom, a silicon atom, an alkoxy group having 1 to 12 carbon atoms, an acyl group having 2 to 12 carbon atoms, an alkylthio group having 1 to 12 carbon atoms, and a carboxyl group.

In a case where the ring including the coordinating atom coordinated by an unshared electron pair has a substituent, the ring may further have a substituent, and examples thereof include a group consisting of a ring including the coordinating atom coordinated by an unshared electron pair, a group including at least one partial structure selected from the above-described groups (UE-1) to (UE-3), an alkyl group having 1 to 12 carbon atoms, an acyl group having 2 to 12 carbon atoms, and a hydroxyl group.

In a case where the coordinating atom coordinated by an unshared electron pair is included in the partial structure represented by each of the groups (UE-1) to (UE-3), $R^1$ represents a hydrogen atom, an alkyl group, an alkenyl group, an alkynyl group, an aryl group, or a heteroaryl group; and $R^2$ represents a hydrogen atom, an alkyl group, an alkenyl group, an alkynyl group, an aryl group, a heteroaryl group, an alkoxy group, an aryloxy group, a heteroaryloxy group, an alkylthio group, an arylthio group, a heteroarylthio group, an amino group, or an acyl group.

The alkyl group, the alkenyl group, the alkynyl group, the aryl group, and the heteroaryl group have the same definitions as those of the alkyl group, the alkenyl group, the alkynyl group, the aryl group, and the heteroaryl group described above regarding the coordination site coordinated by an anion, and preferred ranges thereof are also the same.

The number of carbon atoms in the alkoxy group is preferably 1 to 12 and more preferably 3 to 9.

The number of carbon atoms in the aryloxy group is preferably 6 to 18 and more preferably 6 to 12.

The heteroaryloxy group may be monocyclic or polycyclic. A heteroaryl group constituting the heteroaryloxy group has the same definition as those of the heteroaryl group described above regarding the coordination site coordinated by an anion, and a preferred range thereof is also the same.

The number of carbon atoms in the alkylthio group is preferably 1 to 12 and more preferably 1 to 9.

The number of carbon atoms in the arylthio group is preferably 6 to 18 and more preferably 6 to 12.

The heteroarylthio group may be monocyclic or polycyclic. A heteroaryl group constituting the heteroarylthio group has the same definition as those of the heteroaryl group described above regarding the coordination site coordinated by an anion, and a preferred range thereof is also the same.

The number of carbon atoms in the acyl group is preferably 2 to 12 and more preferably 2 to 9.

$R^1$ is preferably a hydrogen atom, an alkyl group, an alkenyl group, an alkynyl group, or an aryl group, more preferably a hydrogen atom or an alkyl group, and still more preferably an alkyl group. As the alkyl group, an alkyl group having 1 to 4 carbon atoms is preferable, and a methyl group is more preferable. In a case where a substituent on an N atom, that is, $R^1$ is the alkyl group, a ligand contribution rate to the molecular orbital of the copper complex is improved, the molar absorption coefficient at the maximal absorption wavelength is improved, and infrared shielding property and visible transparency tend to be further improved. In particular, an alkyl group is preferable from the viewpoint of heat resistance and a balance between the infrared shielding property and the visible transparency.

In a case where the ligand has the coordination site coordinated by an anion and the coordinating atom coordinated by an unshared electron pair in one molecule, the number of atoms linking the coordination site coordinated by an anion and the coordinating atom coordinated by an unshared electron pair is preferably 1 to 6 and more preferably 1 to 3. By adopting such a configuration, since the structure of the copper complex is more easily distorted, a color value can be further improved, and the molar absorption coefficient is easily increased while enhancing the visible transparency. The kind of the atom linking the coordination site coordinated by an anion and the coordinating atom coordinated by an unshared electron pair may be one kind or two or more kinds. A carbon atom or a nitrogen atom is preferable.

In a case where the ligand has two or more coordinating atoms coordinated by an unshared electron pair in one molecule, the ligand may have three or more coordinating atoms coordinated by an unshared electron pair, preferably has two to five coordinating atoms, and more preferably has four coordinating atoms. The number of atoms linking the coordinating atoms coordinated by an unshared electron pair is preferably 1 to 6, more preferably 1 to 3, still more preferably 2 or 3, and particularly preferably 3. With such a configuration, since the structure of the copper complex is more easily distorted, the color value can be further improved. The atom linking the coordinating atoms coordinated by an unshared electron pair may be one kind or two or more kinds. The atom linking the coordinating atoms coordinated by an unshared electron pair is preferably a carbon atom.

In the present invention, the ligand is preferably a compound having at least two coordination sites (also referred to as a multidentate ligand). The ligand more preferably has at least three coordination sites, still more preferably has three to five coordination sites, and particularly preferably has four or five coordination sites. The multidentate ligand acts as a chelating ligand for the copper component. That is, it is considered that, in a case where at least two coordination sites of the multidentate ligand are chelate-coordinated with copper, the structure of the copper complex is distorted, excellent visible transparency is obtained, infrared absorption ability can be improved, and the color value is also improved. As a result, even in a case where the near infrared light absorbing layer is used for a long period of time, the characteristics thereof are not impaired.

Examples of the multidentate ligand include a compound including one or more coordination sites coordinated by an anion and one or more coordinating atoms coordinated by an unshared electron pair, a compound including two or more coordinating atoms coordinated by an unshared electron pair, and a compound including two coordination sites coordinated by an anion. These compounds can be each independently used alone or in combination of two or more kinds thereof. In addition, as the compound serving as the ligand, a compound having only one coordination site can also be used.

The multidentate ligand is preferably a compound represented by Formulae (IV-1) to (IV-14). For example, in a case where the ligand is a compound having four coordination sites, a compound represented by Formula (IV-3), (IV-6), (IV-7), or (IV-12) is preferable, and from the reason that the compound coordinates more strongly with a metal center and easily forms a stable five-coordination complex with high heat resistance, a compound represented by Formula (IV-12) is more preferable. In addition, for example, in a case where the ligand is a compound having five coordination sites, a compound represented by Formula (IV-4), (IV-8) to (IV-11), (IV-13), or (IV-14) is preferable, and from the reason that the compound coordinates more strongly with a metal center and easily forms a stable five-coordination complex with high heat resistance, a compound represented by Formula (IV-9), (IV-10), (IV-13), or (IV-14) is more preferable, and a compound represented by Formula (IV-13) is still more preferable.

(IV-1)

$$X^1—L^1—X^2$$

(IV-2)

$$X^3—L^2—X^{43}—L^3—X^4$$

(IV-3)

$$X^5—L^4—X^{44}—L^6—X^{45}—L^6—X^6$$

(IV-4)

$$X^7—L^7—X^{46}—L^8—X^{47}—L^9—X^{48}—L^{10}—X^8$$

(IV-5)

(IV-6)

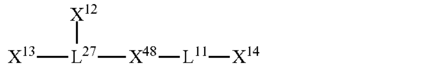

(IV-7)

(IV-8)

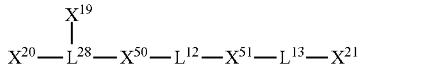

(IV-9)

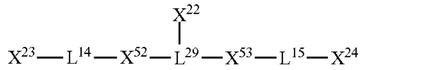

(IV-10)

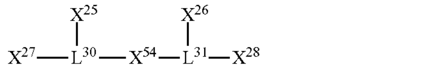

(IV-11)

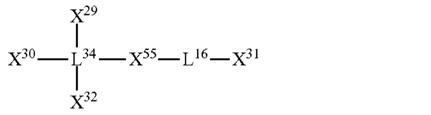

(IV-12)

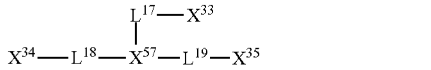

(IV-13)

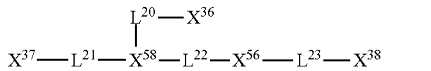

(IV-14)

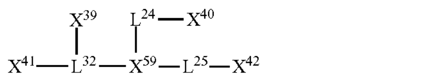

In Formulae (IV-1) to (IV-14), $X^1$ to $X^{59}$ each independently represent a coordination site, $L^1$ to $L^{25}$ each independently represent a single bond or a divalent linking group, $L^{26}$ to $L^{32}$ each independently represent a trivalent linking group, and $L^{33}$ and $L^{34}$ each independently represent a tetravalent linking group.

It is preferable that $X^1$ to $X^{42}$ each independently represent at least one selected from the group consisting of a ring including the coordinating atom coordinated by an unshared electron pair, the above-described group (AN-1), and the above-described group (UE-1).

It is preferable that $X^{43}$ to $X^{56}$ each independently represent at least one selected from the group consisting of a ring including the coordinating atom coordinated by an unshared electron pair, the above-described group (AN-2), and the above-described group (UE-2). It is preferable that $X^{57}$ to $X^{59}$ each independently represent at least one selected from the group above-described (UE-3).

$L^1$ to $L^{25}$ each independently represent a single bond or a divalent linking group. The divalent linking group is preferably an alkylene group having 1 to 12 carbon atoms, an arylene group having 6 to 12 carbon atoms, —SO—, —O—, —$SO_2$—, or a group consisting of a combination thereof, and more preferably an alkylene group having 1 to 3 carbon atoms, a phenylene group, —$SO_2$—, or a group consisting of a combination thereof.

$L^{26}$ to $L^{32}$ each independently represent a trivalent linking group. Examples of the trivalent linking group include a group obtained by removing one hydrogen atom from the above-described divalent linking group.

$L^{33}$ and $L^{34}$ each independently represent a tetravalent linking group. Examples of the tetravalent linking group include a group obtained by removing two hydrogen atoms from the above-described divalent linking group.

Here, R in the groups (AN-1) and (AN-2) and $R^1$ in the groups (UE-1) to (UE-3) may be linked to each other to form a ring between R's, between $R^1$'s, or between R and $R^1$. Specific examples of Formula (IV-2) include the following compound (IV-2A). $X^3$, $X^4$, $X^{43}$ are a group shown below, $L^2$ and $L^3$ are a methylene group, and $R^1$ is a methyl group, but $R^1$'s may be linked to each other to form a ring such as (IV-2B) and (IV-2C).

(IV-2A)

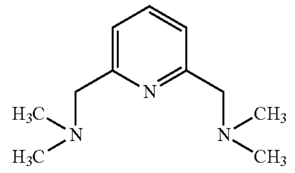

(IV-2B)

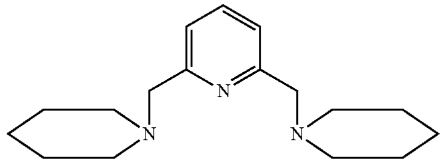

(IV-2C)

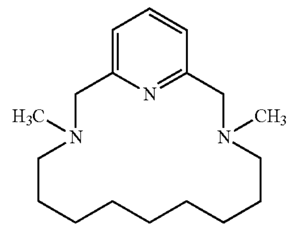

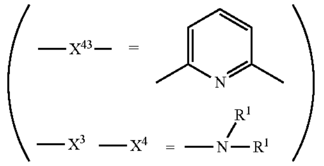

Specific examples of the compound forming the ligand include compounds shown below, and examples thereof include compounds shown as preferred specific examples of the multidentate ligand, which will be described later, and salts of these compounds. Examples of an atom constituting the salt include a metal atom and tetrabutylammonium. The metal atom is more preferably an alkali metal atom or an alkaline earth metal atom. Examples of the alkali metal atom include sodium and potassium. Examples of the alkaline earth metal atom include calcium and magnesium. In addition, reference can be made to the description of paragraphs 0022 to 0042 of JP2014-041318A and the description of paragraphs 0021 to 0039 of JP2015-043063A, the contents of which are incorporated herein by reference.

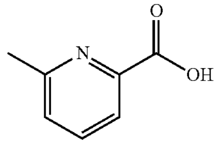

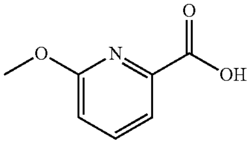

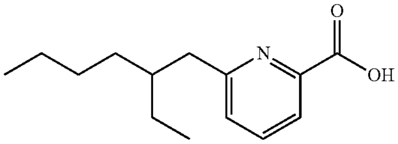

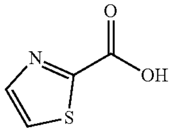

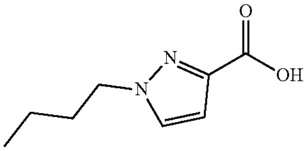

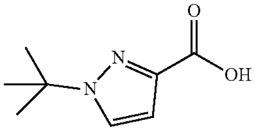

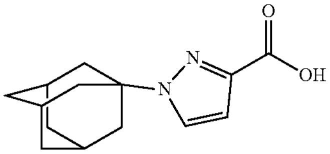

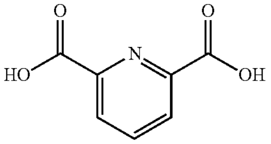

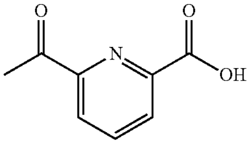

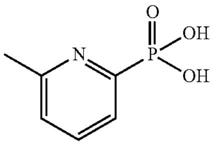

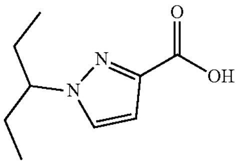

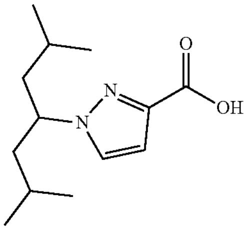

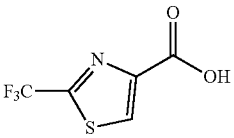

-continued

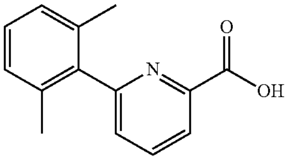

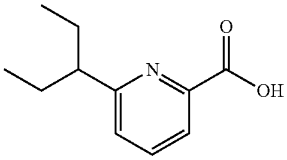

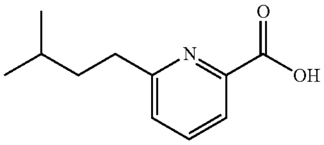

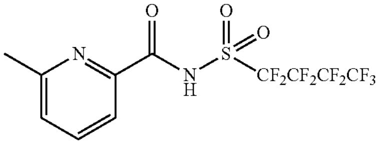

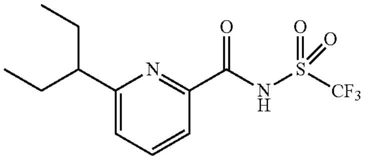

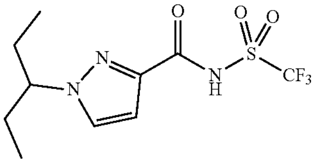

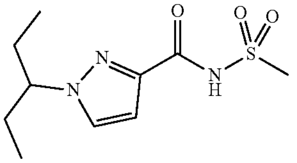

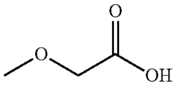

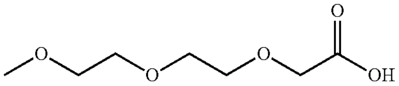

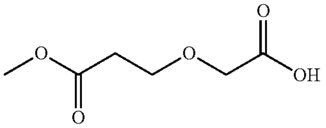

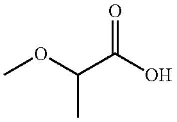

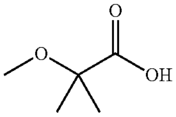

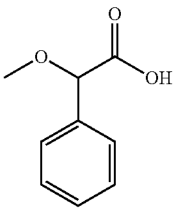

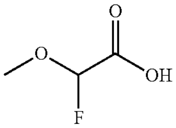

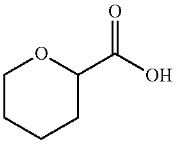

-continued
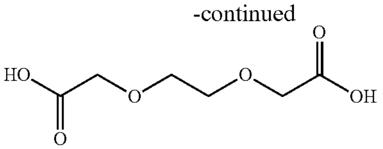
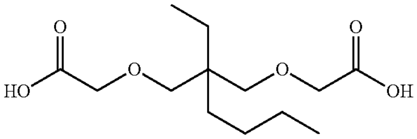
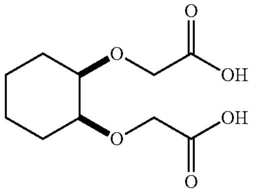
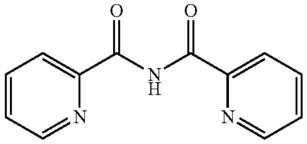
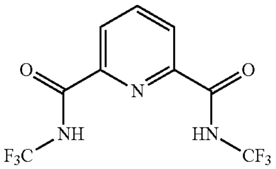
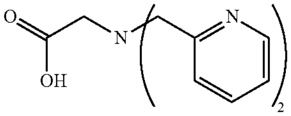
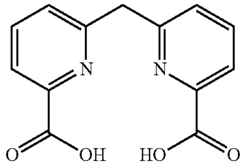
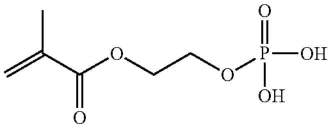
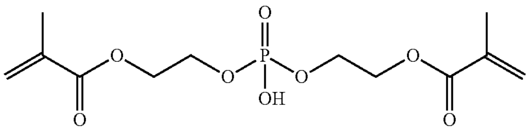
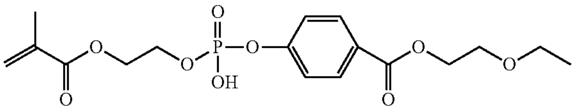
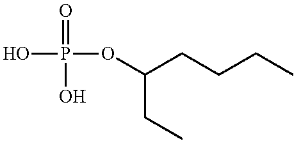
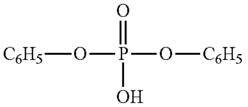
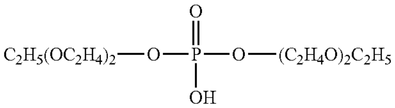
-continued
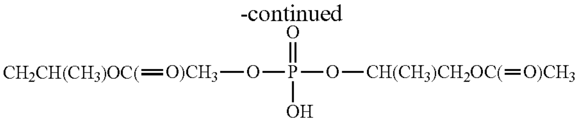
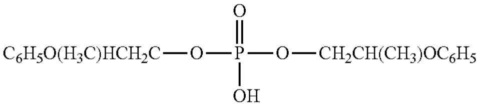
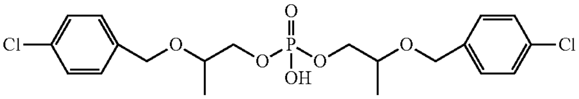
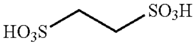
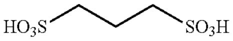
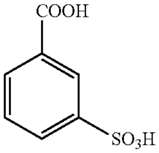
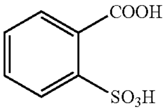
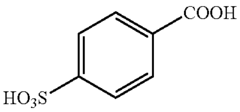
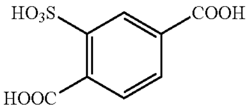
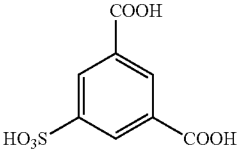
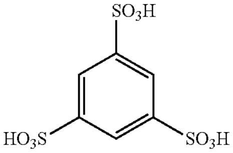
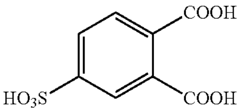
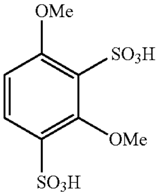
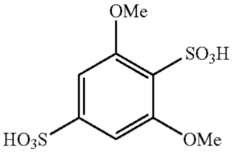
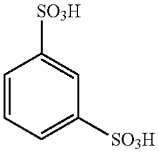
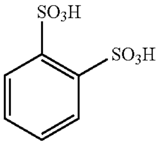
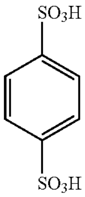
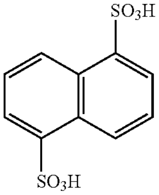
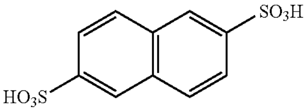
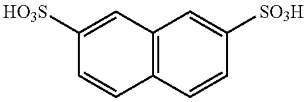
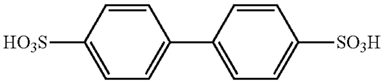
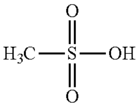
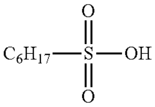

-continued

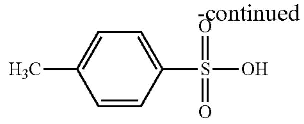

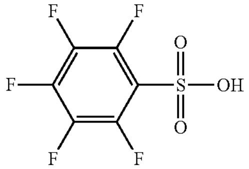

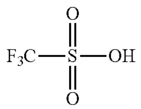

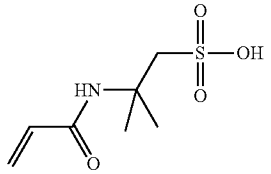

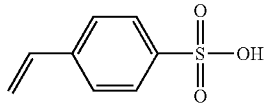

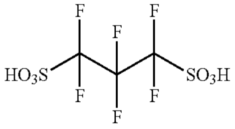

Preferred examples of the copper complex include the following aspects of (1) to (5), more preferably (2) to (5), still more preferably (3) to (5), and particularly preferably (4) or (5).

(1) copper complex having one or two of compounds having two coordination sites as a ligand.

(2) copper complex having a compound having three coordination sites as a ligand.

(3) copper complex having a compound having three coordination sites and a compound having two coordination sites as ligands.

(4) copper complex having a compound having four coordination sites as a ligand.

(5) copper complex having a compound having five coordination sites as a ligand.

In the aspect (1), the compound having two coordination sites is preferably a compound having two coordinating atoms coordinated by an unshared electron pair, or a compound having the coordination site coordinated by an anion and having the coordinating atom coordinated by an unshared electron pair. In addition, in a case where two compounds having two coordination sites are included as ligands, the compounds of the ligands may be the same or different from each other.

In addition, in the aspect (1), the copper complex can further have a monodentate ligand. The number of monodentate ligands can be 0, or can be 1 to 3. As the type of the monodentate ligand, both of a monodentate ligand coordinated by an anion and a monodentate ligand coordinated by an unshared electron pair are preferable. In a case where the compound having two coordination sites is a compound having two coordinating atoms coordinated by an unshared electron pair, a monodentate ligand coordinated by an anion is more preferable from the viewpoint of a strong coordinating force. In a case where the compound having two coordination sites is a compound having the coordination site coordinated by an anion and the coordinating atom coordinated by an unshared electron pair, a monodentate ligand coordinated by an unshared electron pair is more preferable from the reason that the entire copper complex has no charge.

In the aspect (2), the compound having three coordination sites is preferably a compound having the coordinating atom coordinated by an unshared electron pair, and more preferably a compound having three coordinating atoms coordinated by an unshared electron pair. In addition, in the aspect (2), the copper complex can further have a monodentate ligand. The number of monodentate ligands can also be 0. In addition, the number thereof may be 1 or more, preferably 1 to 3, more preferably 1 or 2, and still more preferably 2. As the type of the monodentate ligand, both of a monodentate ligand coordinated by an anion and a monodentate ligand coordinated by an unshared electron pair are preferable, and for the reason described above, a monodentate ligand coordinated by an anion is more preferable.

In the aspect (3), the compound having three coordination sites is preferably a compound having the coordination site coordinated by an anion and the coordinating atom coordinated by an unshared electron pair, and more preferably a compound having two coordination sites coordinated by an anion and one coordinating atom coordinated by an unshared electron pair. Furthermore, it is particularly preferable that the two coordination sites coordinated by an anion are different from each other. In addition, the compound having two coordination sites is preferably a compound having the coordinating atom coordinated by an unshared electron pair, and more preferably a compound having two coordinating atoms coordinated by an unshared electron pair. Among these, a combination in which the compound having three coordination sites is a compound having two coordination sites coordinated by an anion and one coordinating atom coordinated by an unshared electron pair and the compound having two coordination sites is a compound having two coordinating atoms coordinated by an unshared electron pair is particularly preferable. In addition, in the aspect (3), the copper complex can further have a monodentate ligand. The number of monodentate ligands can be 0, or can be 1 or more. 0 is more preferable.

In the aspect (4), the compound having four coordination sites is preferably a compound having the coordinating atom coordinated by an unshared electron pair, more preferably a compound having two or more coordinating atoms coordinated by an unshared electron pair, and still more preferably a compound having four coordinating atoms coordinated by an unshared electron pair. In addition, in the aspect (4), the copper complex can further have a monodentate ligand.

The number of monodentate ligands can be 0, 1 or more, or 2 or more. 1 is preferable. As the type of the monodentate ligand, both of a monodentate ligand coordinated by an anion and a monodentate ligand coordinated by an unshared electron pair are preferable.

In the aspect (5), the compound having five coordination sites is preferably a compound having the coordinating atom coordinated by an unshared electron pair, more preferably a compound having two or more coordinating atoms coordinated by an unshared electron pair, and still more preferably a compound having five coordinating atoms coordinated by an unshared electron pair. In addition, in the aspect (5), the copper complex can further have a monodentate ligand. The number of monodentate ligands can be 0, or can be 1 or more. The number of monodentate ligands is preferably 0.

Examples of the multidentate ligand include compounds having two or more coordination sites among the compounds described in the specific examples of the ligand above, and compounds shown below.

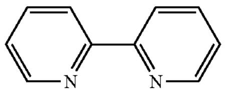
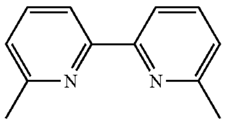
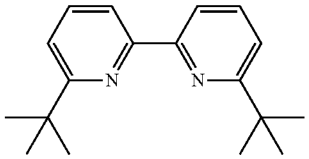
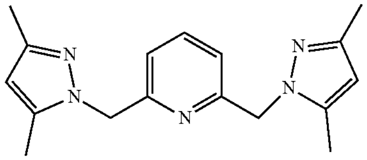
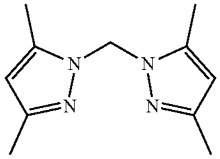
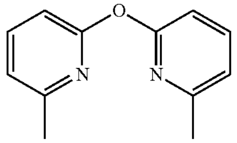
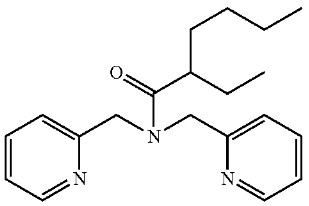
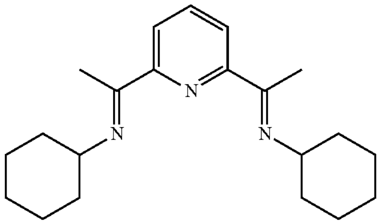
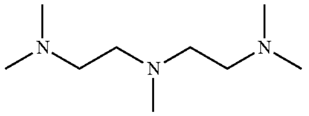
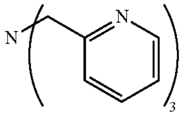
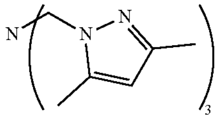
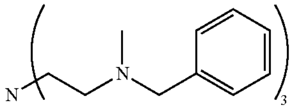
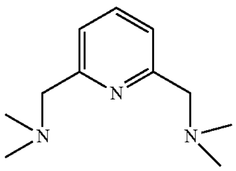
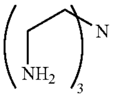
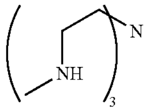
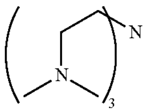
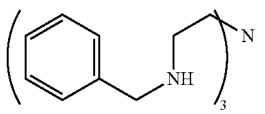
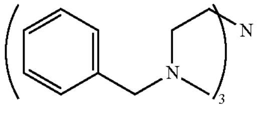
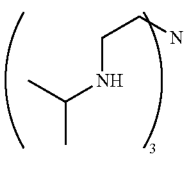
-continued
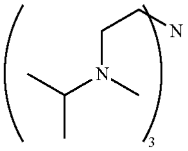
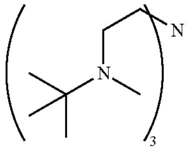
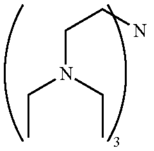
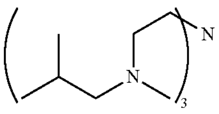
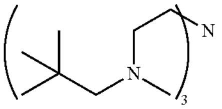
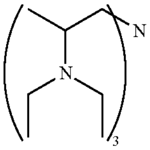
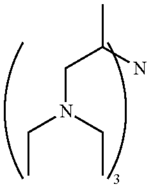
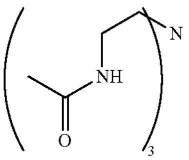
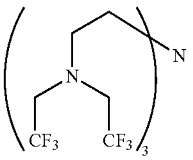
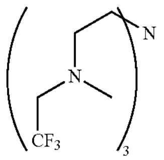
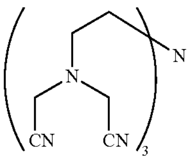
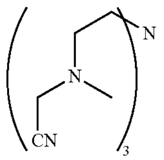
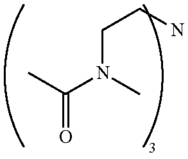
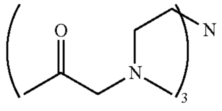
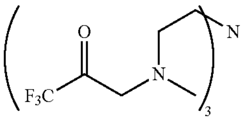
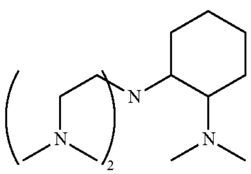
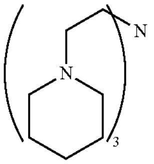
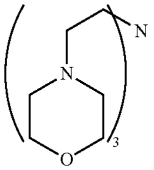
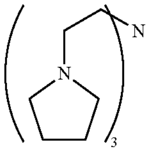
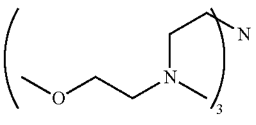
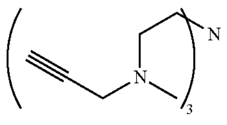

-continued

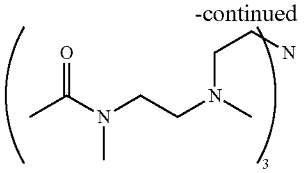

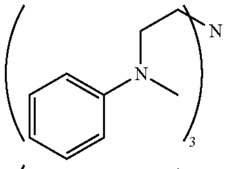

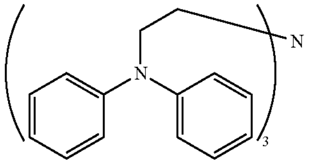

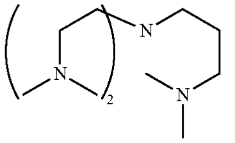

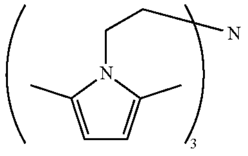

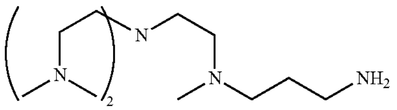

[Phosphate Copper Complex]

In the present invention, a phosphate copper complex can also be used as the copper complex. The phosphate copper complex has copper as a central metal and a phosphate compound as a ligand. The phosphate compound forming the ligand of the phosphate copper complex is preferably a compound represented by Formula (L-100) or a salt thereof.

$(HO)_n—P(=O)—(OR^1)_{3-n}$ Formula (L-100)

In the formula, $R^1$ represents an alkyl group having 1 to 18 carbon atoms, an aryl group having 6 to 18 carbon atoms, an aralkyl group having 7 to 18 carbon atoms, or an alkenyl group having 2 to 18 carbon atoms; $—OR^1$ represents a polyoxyalkyl group having 4 to 100 carbon atoms, a (meth) acryloyloxyalkyl group having 4 to 100 carbon atoms, or a (meth)acryloylpolyoxyalkyl group having 4 to 100 carbon atoms; and n represents 1 or 2. In a case where n is 1, $R^1$'s may be the same or different from each other.

Specific examples of the phosphate compound include the above-described ligands. In addition, reference can be made to the description in paragraphs 0022 to 0042 of JP2014-041318A, the contents of which are incorporated herein by reference.

[Sulfonate Copper Complex]

In the present invention, a sulfonate copper complex can also be used as the copper complex. The sulfonate copper complex has copper as a central metal and a sulfonate compound as a ligand. The sulfonate compound forming the ligand of the sulfonate copper complex is preferably a compound represented by Formula (L-200) or a salt thereof.

$R^2—SO_2—OH$ Formula (L-200)

In the formula, $R^2$ represents a monovalent organic group. Examples of the monovalent organic group include an alkyl group, an aryl group, and a heteroaryl group.

The alkyl group, the aryl group, and the heteroaryl group may be unsubstituted or may have a substituent. Examples of the substituent include a polymerizable group (preferably a vinyl group or a group having an ethylenically unsaturated bond, such as a (meth)acryloyloxy group), a halogen atom (a fluorine atom, a chlorine atom, a bromine atom, and an iodine atom), an alkyl group, a carboxylic acid ester group (for example, $—CO_2CH_3$), a halogenated alkyl group, an alkoxy groups, a methacryloyloxy group, an acryloyloxy group, an ether group, an alkylsulfonyl group, an arylsulfonyl group, a sulfide group, an amide group, an acyl group, a hydroxyl group, a carboxyl group, a sulfonic acid group, an acid group containing a phosphorus atom, an amino group, a carbamoyl group, and a carbamoyloxy group.

Specific examples of the sulfonate compound include the above-described ligands. In addition, reference can be made to the description in paragraphs 0021 to 0039 of JP2015-043063A, the contents of which are incorporated herein by reference.

[Other Copper Complexes]

In the present invention, a phthalocyanine copper complex and a naphthalocyanine copper complex can also be used as the copper complex. In addition, in the present invention, a polynuclear copper complex can also be used as the copper complex. Specific examples thereof include a dinuclear copper complex having a carboxylic acid ion or the like as a ligand, and these may be in equilibrium with a mononuclear copper complex in the composition.

<<<Polymer-Type Copper Complex>>>

In the present invention, as the copper complex, a copper-containing polymer having a copper complex site in a side chain of a polymer can be used.

Examples of the copper complex site include those having copper and a site (coordination site) capable of coordinating with copper. Examples of the site coordinated with copper include a site coordinated by an anion or an unshared electron pair. In addition, the copper complex site preferably has a site for tetradentate coordination or pentadentate coordination with copper. Examples of details of the coordination site include those described above regarding the low-molecular-weight-type copper compound, and a preferred range thereof is also the same.

Examples of the copper-containing polymer include a polymer obtained by reacting a polymer including a coordination site (also referred to as a polymer (B1)) with a copper component, and a polymer obtained by reacting a polymer having a reactive site on a side chain of the polymer (hereinafter, also referred to as a polymer (B2)) with a copper complex which has a functional group capable of reacting with the reactive site of the polymer (B2). A weight-average molecular weight of the copper-containing polymer is preferably 2,000 or more, more preferably 2,000 to 2,000,000, and still more preferably 6,000 to 200,000.

The copper-containing polymer may include other repeating units in addition to the repeating unit having a copper complex site. Examples of the other repeating units include a repeating unit having a crosslinkable group.

In the composition for forming a copper complex layer, a content of the copper complex is preferably 5% to 95% by mass with respect to the total solid content of the composition for forming a copper complex layer. The lower limit thereof is preferably 10% by mass or more, more preferably 15% by mass or more, and still more preferably 20% by mass or more. The upper limit thereof is preferably 70% by mass or less, more preferably 60% by mass or less, and still more preferably 50% by mass or less.

The solid content of the composition for forming a copper complex layer means components in the composition for forming a copper complex layer, excluding a solvent. Even in a case where property of the component is in a liquid state, the component is regarded as the solid content.

<<Other Infrared Absorber>>

The composition for forming a copper complex layer may contain an infrared absorber other than the copper complex (also referred to as other infrared absorbers). Examples of the other infrared absorbers include a cyanine compound, a pyrrolopyrrole compound, a squarylium compound, a phthalocyanine compound, a naphthalocyanine compound, a diiminium compound, a thiol complex compound, a transition metal oxide, a quaterrylene compound, and a croconium compound.

Examples of the pyrrolopyrrole compound include compounds described in paragraphs 0016 to 0058 of JP2009-263614A and compounds described in paragraphs 0037 to 0052 of JP2011-068731A, the contents of which are incorporated herein by reference. Examples of the squarylium compound include compounds described in paragraphs 0044 to 0049 of JP2011-208101A, the contents of which are incorporated herein by reference. Examples of the cyanine compound include compounds described in paragraphs 0044 and 0045 of JP2009-108267A and compounds described in paragraphs 0026 to 0030 of JP2002-194040A, the contents of which are incorporated herein by reference. Examples of the diiminium compound include compounds described in JP2008-528706A, the contents of which are incorporated herein by reference. Examples of the phthalocyanine compound include compounds described in paragraph 0093 of JP2012-077153A, oxytitanium phthalocyanine described in JP2006-343631A, and compounds described in paragraphs 0013 to 0029 of JP2013-195480A, the contents of which are incorporated herein by reference. Examples of the naphthalocyanine compound include compounds described in paragraph 0093 of JP2012-077153A, the contents of which are incorporated herein by reference. In addition, as the cyanine compound, the phthalocyanine compound, the diiminium compound, the squarylium compound, and the croconium compound, for example, compounds described in paragraphs 0010 to 0081 of JP2010-111750A may be used, the contents of which are incorporated herein by reference. In addition, regarding the cyanine-based compound, reference can be made to, for example, "Functional Dyes, written by Makoto OKAWARA, Masaru MATSUOKA, Teijiro KITAO, and Tsuneaki HIRASHIMA, Kodansha Scientific Ltd.", the contents of which are incorporated herein by reference.

In addition, as the other infrared absorbers, inorganic fine particles can also be used. As the inorganic fine particles, metal oxide fine particles or metal fine particles are preferable from the viewpoint of further improving the infrared shielding property. Examples of the metal oxide fine particles include indium tin oxide (ITO) particles, antimony tin oxide (ATO) particles, zinc oxide (ZnO) particles, Al-doped zinc oxide (Al-doped ZnO) particles, fluorine-doped tin dioxide (F-doped $SnO_2$) particles, and niobium-doped titanium dioxide (Nb-doped $TiO_2$) particles. Examples of the metal fine particles include silver (Ag) particles, gold (Au) particles, copper (Cu) particles, and nickel (Ni) particles. In addition, as the inorganic fine particles, a tungsten oxide-based compound can be used. As the tungsten oxide-based compound, cesium tungsten oxide is preferable. With regard to details of the tungsten oxide-based compound, reference can be made to paragraph 0080 of JP2016-006476A, the content of which is incorporated herein by reference. A shape of the inorganic fine particles is not particularly limited, and may be a sheet shape, a wire shape, or a tube shape regardless of a spherical shape or a non-spherical shape.

An average particle diameter of the inorganic fine particles is preferably 800 nm or less, more preferably 400 nm or less, and still more preferably 200 nm or less. By setting the average particle diameter of the inorganic fine particles within such a range, the visible transparency is favorable. From the viewpoint of avoiding light scattering, a smaller average particle diameter is preferable, but for the reason of ease in handling during production, and the like, the average particle diameter of the inorganic fine particles is usually 1 nm or more.

In a case where the composition for forming a copper complex layer contains the other infrared absorbers, a content of the other infrared absorbers is preferably 0.1 to 50 parts by mass with respect to 100 parts by mass of the copper complex. The lower limit thereof is preferably 0.1 parts by mass or more, more preferably 0.5 parts by mass or more, and still more preferably 1 part by mass or more. The upper limit thereof is preferably 50 parts by mass or less, more preferably 40 parts by mass or less, and still more preferably 35 parts by mass or less.

It is preferable that the infrared absorber has a maximal absorption wavelength in a wavelength range of 700 to 1600 nm. That is, the infrared absorber is preferably a near infrared absorber.

A type of the infrared absorber is not particularly limited, and examples thereof include known materials. Examples of the infrared absorber include phthalocyanine-based colorants, naphthalocyanine-based colorants, metal-based complex colorants, boron complex-based colorants, cyanine-based colorants, oxonol-based colorants, squarylium-based colorants, rylene-based colorants, diimmonium-based colorants, diphenylamine-based colorants, triphenylamine-based colorants, quinone-based colorants, and azo-based colorants. In general, these colorants extend an absorption wavelength to a long wavelength side by extending the existing π-conjugated system, and exhibit a wide variety of absorption wavelengths depending on their structure.

The phthalocyanine-based colorant and the naphthalocyanine-based colorant are colorants having a planar structure and a wide π-conjugated plane.

The phthalocyanine-based colorant preferably has a structure represented by Formula (1A), and the naphthalocyanine-based colorant preferably has a structure represented by Formula (1B).

(1A)

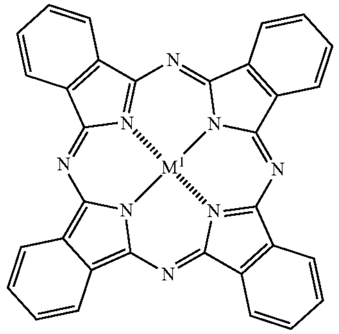

-continued (1B)

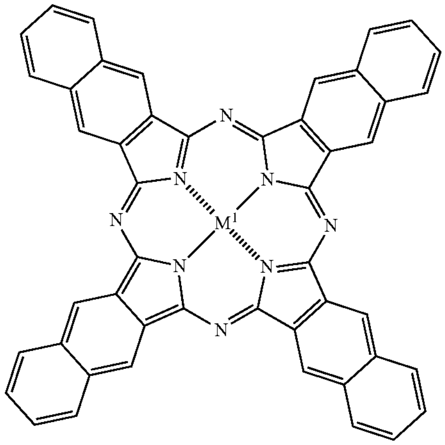

In Formula (1A) and Formula (1B), $M^1$ represents a hydrogen atom, a metal atom, a metal oxide, a metal hydroxide, or a metal halide.

Examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi.

Examples of the metal oxide include VO, GeO, and TiO. Examples of the metal hydroxide include $Si(OH)_2$, $Cr(OH)_2$, $Sn(OH)_2$, and AlOH.

Examples of the metal halide include $SiCl_2$, VCl, $VCl_2$, VOCl, FeCl, GaCl, ZrCl, and AlCl.

Among these, a metal atom such as Fe, Co, Cu, Ni, Zn, Al, and V, a metal oxide such as VO, or a metal hydroxide such as AlOH is preferable, and a metal oxide such as VO is more preferable.

The quinone-based colorant is a colorant having a wide range of absorption. The quinone-based colorant preferably has a structure represented by Formula (2).

(2)

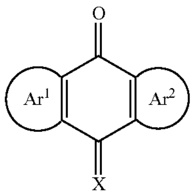

In Formula (2), X represents an oxygen atom or $=NR^b$. $R^b$ represents a hydrogen atom or a substituent. Examples of the substituent represented by $R^b$ include groups exemplified by a substituent W described later.

$Ar^1$ and $Ar^2$ each independently represent an aromatic ring or a heterocyclic ring, and from the viewpoint of extending the absorption wavelength to a long wavelength side, a heterocyclic ring is preferable.

The quinone-based colorant is preferably a compound represented by Formula (2-1).

(2-1)

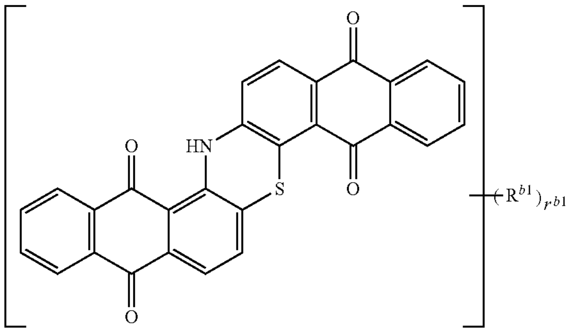

$R^{b1}$'s each independently represent a specific substituent. The specific substituent is preferably a group represented by Formula (Z).

$$*-L^{a1}-(R^{a1})_q \qquad \text{Formula (Z)}$$

In Formula (Z), $R^{a1}$ represents a hydrophilic group. In Formula (Z), in a case where q is 1, $L^{a1}$ represents a single bond or a divalent linking group, and in a case where q is 2 or more, $L^{a1}$ represents a (q+1)-valent linking group.

Examples of the divalent linking group include a divalent hydrocarbon group (for example, a divalent aliphatic hydrocarbon group such as an alkylene group (preferably having 1 to 10 carbon atoms and more preferably having 1 to 5 carbon atoms), an alkenylene group (preferably having 1 to 10 carbon atoms and more preferably having 1 to 5 carbon atoms), and an alkynylene group (preferably having 1 to 10 carbon atoms and more preferably having 1 to 5 carbon atoms), and a divalent aromatic hydrocarbon ring group such as an arylene group), a divalent heterocyclic group, —O—, —S—, —NH—, —N(Q)-, —CO—, and a group obtained by combining these groups (for example, —O-divalent hydrocarbon group-, —(O-divalent hydrocarbon group)$_m$-O— (m represents an integer of 1 or more), -divalent hydrocarbon group-O—CO—, and the like). Q represents a hydrogen atom or an alkyl group.

In a case where q is 2 or more, examples of the (q+1)-valent linking group represented by $L^{a1}$ include a trivalent linking group (q=2) and a tetravalent linking group (q=3).

Examples of the trivalent linking group include a residue formed by removing three hydrogen atoms from a hydrocarbon, a residue formed by removing three hydrogen atoms from a heterocyclic compound, and a group obtained by combining the residue and the above-described divalent linking group.

Examples of the tetravalent linking group include a residue formed by removing four hydrogen atoms from a hydrocarbon, a residue formed by removing four hydrogen atoms from a heterocyclic compound, and a group obtained by combining the residue and the above-described divalent linking group.

q represents an integer of 1 or more, and is preferably an integer of 1 to 4, more preferably 1 or 2, and still more preferably 1.

$r^{b1}$ represents an integer of 1 to 12, and is preferably an integer of 1 to 4.

The cyanine-based colorant is a colorant having strong absorption in a near infrared region. The cyanine-based colorant is preferably a compound represented by Formula (3) or a compound represented by Formula (4).

(3)

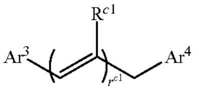

(4)

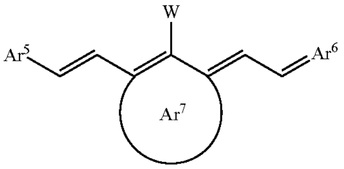

In Formula (3), $Ar^3$ and $Ar^4$ each independently represent a heterocyclic group which may have a specific substituent, and R represents a hydrogen atom or a substituent. However, at least one of $Ar^3$ or $Ar^4$ represents a heterocyclic group having a specific substituent.

The specific substituent included in the heterocyclic group represented by $Ar^3$ and $Ar^4$ is as described above.

Examples of a heterocyclic ring constituting the heterocyclic group include an indolenine ring, a benzoindolenine ring, an imidazole ring, a benzimidazole ring, a naphthimidazole ring, thiazole ring, a benzothiazole ring, a naphthothiazole ring, a thiazoline ring, an oxazole ring, a benzoxazole ring, a naphthoxazole ring, an oxazoline ring, a selenazole ring, a benzoselenazole ring, a naphthoselenazole ring, and a quinoline ring, and an indolenine ring, a benzoindolenine ring, a benzothiazole ring, or a naphthothiazole ring is preferable.

The specific substituent may be substituted on a heteroatom in the heterocyclic ring, or may be substituted on a carbon atom in the heterocyclic ring.

The heterocyclic group may have only one specific substituent, or may have a plurality of (for example, 2 or 3) specific substituents.

$r^{c1}$ represents an integer of 1 to 7, and is preferably an integer of 3 to 5.

$R^{c1}$ represents a hydrogen atom or a substituent. The type of the substituent is not particularly limited, examples thereof include known substituents, and an alkyl group which may have a substituent, an aryl group which may have a substituent, or a heteroaryl group which may have a substituent is preferable.

Examples of the substituent which may be included in the alkyl group, the aryl group, and the heteroaryl group include an alkyl group, an alkenyl group, an alkynyl group, an aryl group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfamoyl group, a carbamoyl group, an alkylthio group, an arylthio group, an aromatic heterocyclicthio group, a ureide group, a halogen atom, a cyano group, a nitro group, a heterocyclic group (for example, a heteroaryl group), a silyl group, and a group obtained by combining these groups (hereinafter, these groups are also collectively referred to as "substituent W"). The above-described substituent may be further substituted with the substituent W.

In Formula (4), $Ar^5$ and $Ar^6$ each independently represent a heterocyclic group which may have a specific substituent, $Ar^7$ represents a cyclic skeleton having 5 to 7 carbon atoms, and W represents a hydrogen atom, a halogen atom, a methyl group, a phenyl group which may have a substituent, a benzyl group which may have a substituent, a pyridyl group, a morpholyl group, a piperidyl group, a phenylamino group which may have a substituent, a phenoxy group which may have a substituent, an alkylthio group which may have a substituent, or a phenylthio group which may have a substituent. However, at least one of $Ar^5$ or $Ar^6$ represents a heterocyclic group having a specific substituent.

The specific substituent included in the heterocyclic group represented by $Ar^5$ and $Ar^6$ is as described above.

Examples of a heterocyclic ring constituting the heterocyclic group include an indolenine ring, a benzoindolenine ring, an imidazole ring, a benzimidazole ring, a naphthimidazole ring, thiazole ring, a benzothiazole ring, a naphthothiazole ring, a thiazoline ring, an oxazole ring, a benzoxazole ring, a naphthoxazole ring, an oxazoline ring, a selenazole ring, a benzoselenazole ring, a naphthoselenazole ring, and a quinoline ring, and an indolenine ring, a benzoindolenine ring, a benzothiazole ring, or a naphthothiazole ring is preferable.

Examples of the substituent which may be included in the phenyl group, the benzyl group, the phenylamino group, the phenoxy group, the alkylthio group, and the phenylthio group represented by W include the groups exemplified by the substituent W described above and a hydrophilic group.

The number of carbon atoms in the alkylthio group represented by W is not particularly limited, but is preferably 1 to 5 and more preferably 1 to 3.

The compound represented by Formula (4) has an intramolecular salt type having a cation and an anion in one molecule or has an intermolecular salt type, and examples of the intermolecular salt type include a halide salt, perchlorate, fluoroantimonate, fluorophosphate, fluoroborate, trifluoromethanesulfonate, bis(trifluoromethane)sulfonic acid imide salt, and organic salts of naphthalene sulfonic acid or the like.

Specific examples thereof include indocyanine green and water-soluble colorants described in JP1988-033477A (JP-S63-033477A).

The compound represented by Formula (4) is preferably a compound represented by Formula (4-1).

(4-1)

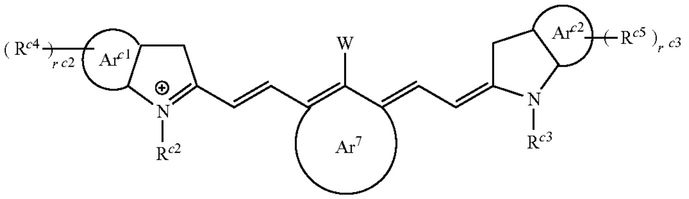

In Formula (4-1), $R^{c2}$ to $R^{c5}$ each independently a hydrogen atom or a substituent; $Ar^{c1}$ and $Ar^{c2}$ each independently represent an aromatic hydrocarbon ring (for example, a benzene ring or a naphthalene ring); $Ar^7$ represents a cyclic skeleton having 5 to 7 carbon atoms; W represents a hydrogen atom, a halogen atom, a methyl group, a phenyl group which may have a substituent, a benzyl group which may have a substituent, a pyridyl group, a morpholyl group, a piperidyl group, a phenylamino group which may have a substituent, a phenoxy group which may have a substituent, an alkylthio group which may have a substituent, or a phenylthio group which may have a substituent; $r^{c2}$ represents an integer of 1 to 3; and $r^{c3}$ represents an integer of 1 to 3.

Examples of the substituent represented by $R^{c2}$ to $R^{c5}$ include the groups exemplified by the substituent W and the specific substituent.

Examples of the substituent which may be included in the phenyl group, the benzyl group, the phenylamino group, the phenoxy group, the alkylthio group, and the phenylthio group represented by W include the groups exemplified by the substituent W and the specific substituent.

The squarylium-based colorant is a colorant having a squaric acid in a central skeleton. The squarylium-based colorant is preferably a compound represented by Formula (5).

(5)

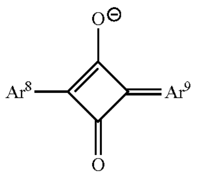

In Formula (5), $Ar^8$ and $Ar^9$ each independently represent a heterocyclic group which may have a specific substituent. $Ar^8$ and $Ar^9$ are preferably the above-described heterocyclic ring represented by $Ar^6$.

The compound represented by Formula (5) also has an intramolecular salt type or an intermolecular salt type, and has a salt form same as the cyanine-based colorant.

The squarylium-based colorant having a hydrophilic group is preferably a compound represented by Formula (5-1) or a compound represented by Formula (5-2).

(5-1)

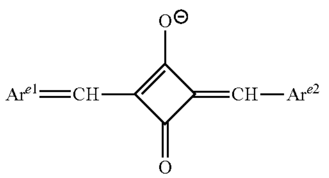

(5-2)

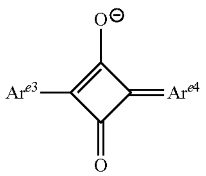

In Formula (5-1), $Ar^{c1}$ represents a heterocyclic group which may have a specific substituent. $Ar^{c2}$ represents a heterocyclic group including $N^+$, which may have a specific substituent. However, at least one of the heterocyclic group represented by $Ar^{c1}$ or the heterocyclic group represented by $Ar^{c2}$ has the specific substituent.

In Formula (5-2), $Ar^{c3}$ represents a heterocyclic group which may have a specific substituent. $Ar^{c4}$ represents a heterocyclic group including $N^+$, which may have a specific substituent. However, at least one of the heterocyclic group represented by $Ar^{c3}$ or the heterocyclic group represented by $Ar^{c4}$ has the specific substituent.

The azo-based colorant is a colorant absorbing a visible light region and is mainly used for a water-soluble ink. However, there also commercially available azo-based colorants which can absorb light in even near infrared range because their absorption band has been widened.

Examples of the azo-based colorant include C. I. Acid Black 2 (manufactured by Orient Chemical Industries Co., Ltd.) and C. I. Direct Black 19 (manufactured by Sigma-Aldrich Corporation) described in JP5979728B.

In addition, the azo-based colorant can also form a complex with a metal atom. Examples of the complex including the azo-based colorant include a compound represented by Formula (6).

(6)

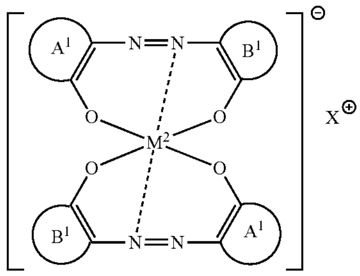

In Formula (6), $M^2$ represents a metal atom, and examples thereof include cobalt and nickel.

$A^1$ and $B^1$ each independently represent an aromatic ring which may have a specific substituent. However, any one of $A^1$ or $B^1$ represents an aromatic ring having a specific substituent.

Examples of the aromatic ring include a benzene ring and a naphthalene ring.

$X^+$ represents a cation. Examples of the cation include $H^+$, an alkali metal cation, and an ammonium cation.

Examples of the complex including the azo-based colorant include colorants described in JP1984-011385A (JP-S59-011385A).

Examples of the metal complex-based colorant include a compound represented by Formula (7) and a compound represented by Formula (8).

(7)

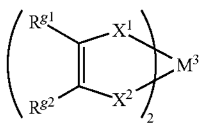

(8)

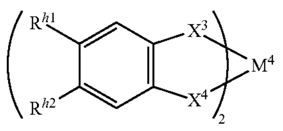

In Formula (7), $M^3$ represents a metal atom, $R^{g1}$ and $R^{g2}$ each independently represent a hydrogen atom or a substituent, at least one of $R^{g1}$ or $R^{g2}$ represents a specific substituent, and $X^1$ and $X^2$ each independently represent an oxygen atom, a sulfur atom, or —$NR^{g3}$—. $R^{g3}$ represents a hydrogen atom, an alkyl group, or an aryl group.

Examples of the metal atom represented by $M^3$ include Pd, Ni, Co, and Cu, and Ni is preferable.

The type of the substituent represented by $R^{g1}$ and $R^{g2}$ is not particularly limited, and examples thereof include the groups exemplified by the substituent W described above and the specific substituent. At least one of $R^{g1}$ or $R^{g2}$ may represent the specific substituent or both $R^{g1}$ and $R^{g2}$ may represent the specific substituent.

In Formula (8), $M^4$ represents a metal atom, $R^{h1}$ and $R^{h2}$ each independently represent a hydrogen atom or a substituent, at least one of $R^{h1}$ or $R^{h2}$ represents a specific substituent, and $X^3$ and $X^4$ each independently represent an oxygen atom, a sulfur atom, or —$NR^{h3}$—. $R^{h3}$ represents a hydrogen atom, an alkyl group, or an aryl group.

Examples of the metal atom represented by $M^4$ include Pd, Ni, Co, and Cu, and Ni is preferable.

The type of the substituent represented by $R^{h1}$ and $R^{h2}$ is not particularly limited, and examples thereof include the groups exemplified by the substituent W described above and the specific substituent. At least one of $R^{h1}$ or $R^{h2}$ may represent the specific substituent or both $R^{h1}$ and $R^{h2}$ may represent the specific substituent.

Examples of the boron complex-based colorant include a compound represented by Formula (9).

(9)

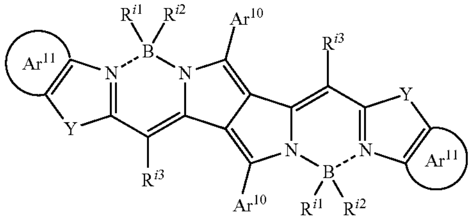

In Formula (9), $R^{i1}$ and $R^{i2}$ each independently represent a hydrogen atom, an alkyl group, or a phenyl group; $R^{i3}$'s each independently represent an electron withdrawing group; $Ar^{10}$'s each independently represent an aryl group which may have a specific substituent; at least one of two $Ar^{10}$'s represents an aryl group having the specific substituent; $Ar^{11}$'s each independently represent an aromatic hydrocarbon ring or an aromatic heterocyclic ring, which may have a substituent; and Y represents a sulfur atom or an oxygen atom.

The electron withdrawing group represented by $R^{i3}$ is not particularly limited, and represents a substituent having a positive Hammett's sigma para value (σp value), and examples thereof include a cyano group, an acyl group, an alkyloxycarbonyl group, an aryloxycarbonyl group, a sulfamoyl group, a sulfinyl group, and a heterocyclic group.

These electron withdrawing groups may be further substituted.

The Hammett's substituent constant σ value will be described. The Hammett's rule is an empirical rule advocated by L. P. Hammett in 1935 so as to quantitatively discuss the effect of substituent on the reaction or equilibrium of benzene derivatives and its propriety is widely admitted at present. Substituent constants obtained by the Hammett's rule are an σp value and an σm value, and these values can be found in many general books. For example, it is specifically described in Chem. Rev., 1991, vol. 91, pages 165 to 195. In the present invention, a substituent having the Hammett's substituent constant σp value of 0.20 or more is preferable as the electron withdrawing group. The σp value is preferably 0.25 or more, more preferably 0.30 or more, and still more preferably 0.35 or more. The upper limit thereof is not particularly limited, but is preferably 0.80 or less.

Specific examples thereof include a cyano group (0.66), a carboxyl group (—COOH: 0.45), an alkoxycarbonyl group (—COOMe: 0.45), an aryloxycarbonyl group (—COOPh: 0.44), a carbamoyl group (—$CONH_2$: 0.36), an alkylcarbonyl group (—COMe: 0.50), an arylcarbonyl group (—COPh: 0.43), an alkylsulfonyl group (—$SO_2Me$: 0.72), and an arylsulfonyl group (—$SO_2Ph$: 0.68).

The aryl group which may have a specific substituent represented by $Ar^{10}$ is preferably a phenyl group which may have a specific substituent.

The definition of the specific substituent is as described above, and the aspect of q=1 is preferable.

The aromatic hydrocarbon ring in the aromatic hydrocarbon ring which may have a substituent, represented by $Ar^{11}$, is preferably a benzene ring or a naphthalene ring.

Examples of the substituent which may be included in the aromatic hydrocarbon ring and the aromatic heterocyclic ring represented by $Ar^{11}$ include the groups exemplified by the substituent W described above and the specific substituent.

The diimonium-based colorant is a colorant having absorption on a relatively long wavelength side (950 to 1100 nm) even in a near infrared region, and is preferably a compound represented by Formula (10).

(10)

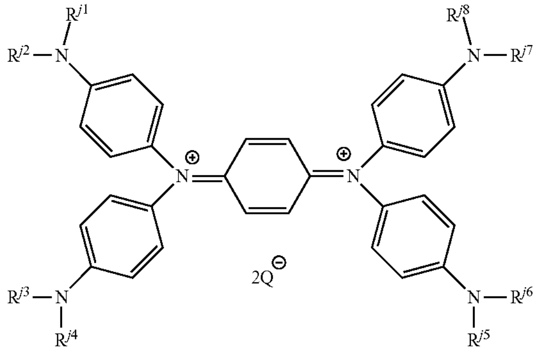

In Formula (10), $R^{j1}$ to $R^{j8}$ each independently an alkyl group which may have a substituent or an aromatic ring group which may have a substituent, and at least one of $R^{j1}$ to $R^{j8}$ represents an alkyl group having a specific substituent or an aromatic ring group having a specific substituent.

$Q^-$ represents an anion, and examples thereof include halide ions, perchlorate ions, fluoroantimonate ions, fluorophosphate ions, fluoroborate ions, trifluoromethanesulfonate ions, bis(trifluoromethane)sulfonic acid imide ions, and naphthalene sulfonic acid ions.

The oxonol-based colorant is preferably a compound represented by Formula (11).

(11)

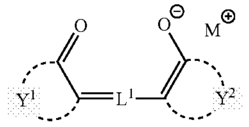

In Formula (11), $Y^1$ and $Y^2$ each independently represent an aliphatic ring or a non-metal atomic group forming a heterocyclic ring, $M^+$ represents a proton, a monovalent alkali metal cation, or an organic cation, $L^1$ represents a methine chain consisting of 5 or 7 methine groups, and a methine group at the center of the methine chain has a substituent represented by Formula (A).

$*—S^A\text{-}T^A$ Formula (A)

In Formula (A), $S^A$ represents a single bond, an alkylene group, an alkenylene group, an alkynylene group, —O—, —S—, —$NR^{L1}$—, —C(═O)—, —C(═O)O—, —C(═O)$NR^{L1}$—, —S(═O)$_2$—, —$OR^{L2}$—, or a group obtained by combining these groups; $R^{L1}$ represents a hydrogen atom, a halogen atom, an alkyl group, an aryl group, or a heteroaryl group; $R^{L2}$ represents an alkylene group, an arylene group, or a divalent heterocyclic group; $T^A$ represents a halogen atom, an alkyl group, a cycloalkyl group, an aryl group, a heteroaryl group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group; in a case where $S^A$ represents a single bond or an alkylene group and $T^A$ represents an alkyl group, the total number of carbon atoms included in $S^A$ and $T^A$ is 3 or more; and * represents a bonding site with the central methine group of the methine chain.

The oxonol-based colorant having a hydrophilic group is more preferably a compound represented by Formula (12).

(12)

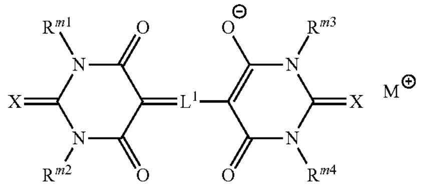

In Formula (12), $M^+$ and $L^1$ are the same as $M^+$ and $L^1$ in Formula (11).

$R^{m1}$, $R^{m2}$, $R^{m3}$, and $R^{m4}$ each independently represent a hydrogen atom, an alkyl group, an aryl group, or a heteroaryl group, and X's each independently represent an oxygen atom, a sulfur atom, or a selenium atom.

The oxonol-based colorant having a hydrophilic group is still more preferably a compound represented by Formula (13).

(13)

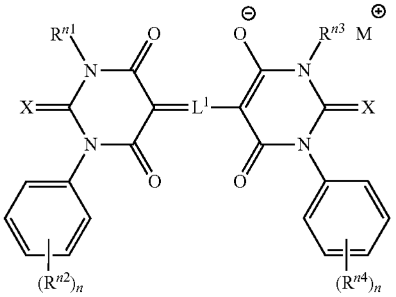

In Formula (13), $M^+$, $L^1$, and X are the same as $M^+$, $L^1$, and X in Formula (11).

$R^{n1}$ and $R^{n3}$ each independently represent a hydrogen atom, an alkyl group, an aryl group, or a heteroaryl group; $R^{n2}$ and $R^{n4}$ each independently represent an alkyl group, a halogen atom, an alkenyl group, an aryl group, a heteroaryl group, a nitro group, a cyano group, —$OR^{L3}$, —C(═O)$R^{L3}$, —C(═O)$OR^{L3}$, —OC(═O)$R^{L3}$, —N$(R^{L3})_2$, —NHC(═O)$R^{L3}$, —C(═O)N$(R^{L3})_2$, —NHC(═O)$OR^{L3}$, —OC(═O)N$(R^{L3})_2$, —NHC(═O)N$(R^{L3})_2$, —$SR^{L3}$, —S(═O)$_2R^{L3}$, —S(═O)$_2OR^{L3}$, —NHS(═O)$_2R^{L3}$, or —S(═O)$_2$N$(R^{L3})_2$; $R^{L3}$'s each independently represent a hydrogen atom, an alkyl group, an alkenyl group, an aryl group, or a heteroaryl group; and n's each independently represent an integer of 1 to 5.

In the present specification, the term "rylene" refers to a compound having a molecular structure of a naphthalene unit bonded to a peri-position. Depending on the number of naphthalene units, the "rylene" may be, for example, perylene (n=2), terylene (n=3), quaterrylene (n=4), or higher rylene.

The rylene-based formula is preferably a compound represented by Formula (14), a compound represented by Formula (15), or a compound represented by Formula (16).

(14)

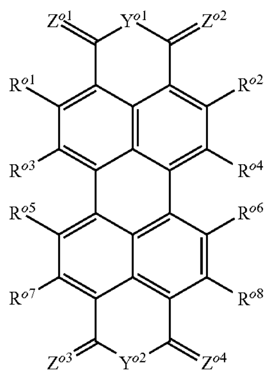

-continued (15)

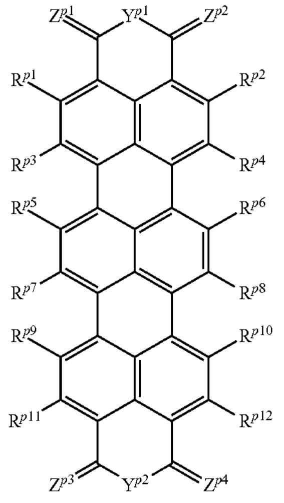

(16)

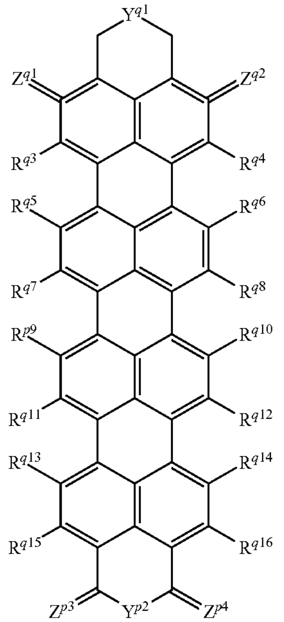

In Formula (14), $Y^{c1}$ and $Y^{c2}$ each independently represent an oxygen atom or $NR^{w1}$; $R^{w1}$ represents a hydrogen atom or a substituent; $Z^{o1}$ to $Z^{o4}$ each independently represent an oxygen atom or $NR^{W2}$; $R^{w2}$ represents a hydrogen atom or a substituent; $R^{o1}$ to $R^{o8}$ each independently represent a hydrogen atom or a substituent; and at least one of $R^{o1}$ to $R^{o8}$, or $R^{z}$ represents the specific substituent. $R^{W1}$ and $R^{W2}$ may be bonded to each other to form a ring which may have a substituent. In a case where the ring to be formed has two or more substituents, the substituents may be bonded to each other to form a ring (for example, an aromatic ring).

In Formula (15), $Y^{p1}$ and $Y^{p2}$ each independently represent an oxygen atom or $NR^{w3}$; $R^{w3}$ represents a hydrogen atom or a substituent; $Z^{p1}$ to $Z^{p4}$ each independently represent an oxygen atom or $NR^{W4}$; $R^{w4}$ represents a hydrogen atom or a substituent; $R^{p1}$ to $R^{p12}$ each independently represent a hydrogen atom or a substituent; and at least one of $R^{p1}$ to $R^{p12}$, or $R^{z}$ represents the specific substituent. $R^{W3}$ and $R^{W4}$ may be bonded to each other to form a ring which may have a substituent. In a case where the ring to be formed has two or more substituents, the substituents may be bonded to each other to form a ring (for example, an aromatic ring).

In Formula (16), $Y^{q1}$ and $Y^{q2}$ each independently represent an oxygen atom or $NR^{w5}$; $R^{w5}$ represents a hydrogen atom or a substituent; $Z^{q1}$ to $Z^{q4}$ each independently represent an oxygen atom or $NR^{W6}$; $R^{w6}$ represents a hydrogen atom or a substituent; $R^{q1}$ to $R^{q16}$ each independently represent a hydrogen atom or a substituent; and at least one of $R^{q1}$ to $R^{q16}$, or $R^{z}$ represents the specific substituent. $R^{W5}$ and $R^{W6}$ may be bonded to each other to form a ring which may have a substituent. In a case where the ring to be formed has two or more substituents, the substituents may be bonded to each other to form a ring (for example, an aromatic ring).

<<Solvent>>

The composition for forming a copper complex layer preferably contains a solvent. The solvent is not particularly limited as long as it can uniformly dissolve or disperse the respective components, and can be appropriately selected according to the purpose. Examples thereof include water and an organic solvent.

Examples of the organic solvent include alcohols, ketones, esters, aromatic hydrocarbons, halogenated hydrocarbons, dimethylformamide, dimethylacetamide, dimethyl sulfoxide, and sulfolane. Among these, one kind may be used alone, or two or more kinds may be used in combination.

Specific examples of the alcohols, the aromatic hydrocarbons, and the halogenated hydrocarbons include those described in paragraphs 0136 and the like of JP2012-194534A, the contents of which are incorporated herein by reference. Specific examples of the esters, the ketones, and the ethers include those described in paragraph 0497 of JP2012-208494A (corresponding to [0609] of US2012/0235099A). Further examples thereof include N-amyl acetate, ethyl propionate, dimethyl phthalate, ethyl benzoate, methyl sulfate, acetone, methyl isobutyl ketone, diethyl ether, and ethylene glycol monobutyl ether acetate.

As the solvent, at least one selected from 1-methoxy-2-propanol, cyclopentanone, cyclohexanone, propylene glycol monomethyl ether acetate, N-methyl-2-pyrrolidone, butyl acetate, ethyl lactate, or propylene glycol monomethyl ether is preferably used.

<<Resin>>

The composition for forming a copper complex layer preferably contains a resin. The type of the resin is not particularly limited as long as the resin can be used for an optical material. The resin is preferably a highly transparent resin. Specific examples thereof include polyolefin resins such as polyethylene, polypropylene, carboxylated polyolefin, chlorinated polyolefin, and cycloolefin polymer; polystyrene resins; (meth)acrylic resins such as a (meth)acrylic ester resin and a (meth)acrylamide resin; vinyl acetate resins; vinyl halide resins; polyvinyl alcohol resins; polyamide resins; polyurethane resins; polyester resins such as polyethylene terephthalate (PET) and polyarylate (PAR); polycarbonate resins; epoxy resins; polymaleimide resins; polyurea resins; and polyvinyl acetal resins such as polyvinyl butyral resin. Among these, a (meth)acrylic resin, a polyurethane resin, a polyester resin, a polymaleimide resin, or a polyurea resin is preferable; a (meth)acrylic resin, a polyurethane resin, or a polyester resin is more preferable; and a (meth)acrylic acid ester resin is still more preferable. In addition, it is also preferable that a sol-gel cured product of a compound having an alkoxysilyl group is used as the resin. Examples of the compound having an alkoxysilyl group include materials described in the section of a crosslinking compound, which will be described later.

A weight-average molecular weight of the resin is preferably 1,000 to 300,000. The lower limit thereof is more preferably 2,000 or more and still more preferably 3,000 or more. The upper limit thereof is more preferably 100,000 or less and still more preferably 50,000 or less.

A number-average molecular weight of the resin is preferably 500 to 150,000. The lower limit thereof is more preferably 1,000 or more and still more preferably 2,000 or more. The upper limit thereof is more preferably 200,000 or less and still more preferably 100,000 or less.

In addition, in a case of the epoxy resin, the weight-average molecular weight (Mw) of the epoxy resin is preferably 100 or more and more preferably 200 to 2,000,000. The upper limit thereof is preferably 1,000,000 or less and more preferably 500,000 or less. The lower limit thereof is preferably 100 or more, more preferably 200 or more, still more preferably 2,000 or more, and particularly preferably 5,000 or more.

Examples of the epoxy resin include an epoxy resin which is a glycidyl etherified product of a phenol compound, an epoxy resin which is a glycidyl etherified product of various novolac resins, an alicyclic epoxy resin, an aliphatic epoxy resin, a heterocyclic epoxy resin, a glycidyl ester-based epoxy resin, a glycidyl amine-based epoxy resin, an epoxy resin obtained by glycidylating halogenated phenols, a condensate of a silicon compound having an epoxy group and another silicon compound, and a copolymer of a polymerizable unsaturated compound having an epoxy group and another polymerizable unsaturated compound.

Examples of the epoxy resin which is a glycidyl etherified product of a phenol compound include 2-[4-(2,3-epoxypropoxy)phenyl]-2-[4-[1,1-bis[4-(2,3-hydroxy)phenyl]ethyl]phenyl]propane, bisphenol A, bisphenol F, bisphenol S, 4,4'-biphenol, tetramethylbisphenol A, dimethylbisphenol A, tetramethylbisphenol F, dimethylbisphenol F, tetramethylbisphenol S, dimethylbisphenol S, tetramethyl-4,4'-biphenol, dimethyl-4,4'-biphenol, 1-(4-hydroxyphenyl)-2-[4-(1,1-bis-(4-hydroxyphenyl)ethyl)phenyl]propane, 2,2'-methylene-bis(4-methyl-6-tert-butylphenol), 4,4'-butylidene-bis(3-methyl-6-tert-butylphenol), trishydroxyphenylmethane, resorcinol, hydroquinone, pyrogallol, phloroglucinol, phenols having a diisopropylidene skeleton, phenols having a fluorene skeleton such as 1,1-di-4-hydroxyphenylfluorene, and epoxy resins which are glycidyl etherified products of a polyphenol compound, such as phenolated polybutadiene.

Examples of the epoxy resin which is a glycidyl etherified product of a novolac resin include novolac resins formed from various phenols of phenol, cresols, ethylphenols, butylphenols, octylphenols, bisphenols such as bisphenol A, bisphenol F, and bisphenol S, naphthols, and the like; and glycidyl etherified products of various novolac resins, such as a xylylene skeleton-containing phenol novolac resin, a dicyclopentadiene skeleton-containing phenol novolac resin, a biphenyl skeleton-containing phenol novolac resin, and a fluorene skeleton-containing phenol novolac resin.

Examples of the alicyclic epoxy resin include alicyclic epoxy resins having an aliphatic ring skeleton, such as 3,4-epoxycyclohexylmethyl-(3,4-epoxy)cyclohexylcarboxylate and bis(3,4-epoxycyclohexylmethyl) adipate.

Examples of the aliphatic epoxy resin include glycidyl ethers of polyhydric alcohols such as 1,4-butanediol, 1,6-hexanediol, polyethylene glycol, and pentaerythritol.

Examples of the heterocyclic epoxy resin include heterocyclic epoxy resins having a heterocyclic ring such as an isocyanuric ring and a hydantoin ring.

Examples of the glycidyl ester-based epoxy resin include epoxy resins consisting of carboxylic acid esters such as hexahydrophthalic acid diglycidyl ester.

Examples of the glycidyl amine-based epoxy resin include epoxy resins obtained by glycidylating amines such as aniline and toluidine.

Examples of the epoxy resin obtained by glycidylating halogenated phenols include epoxy resins obtained by glycidylating halogenated phenols such as brominated bisphenol A, brominated bisphenol F, brominated bisphenol S, brominated phenol novolac, brominated cresol novolac, chlorinated bisphenol S, and chlorinated bisphenol A.

Examples of commercially available products of the copolymer of a polymerizable unsaturated compound having an epoxy group and another polymerizable unsaturated compound include MARpROOF G-0150M, G-0105SA, G-0130SP, G-0250SP, G-1005S, G-1005SA, G-1010S, G-2050M, G-01100, and G-01758 (all of which are manufactured by NOF Corporation).

Examples of the polymerizable unsaturated compound having an epoxy group include glycidyl acrylate, glycidyl methacrylate, and 4-vinyl-1-cyclohexene 1,2-epoxide.

In addition, examples of the copolymer with another polymerizable unsaturated compound include methyl (meth)acrylate, benzyl (meth)acrylate, cyclohexyl (meth)acrylate, styrene, and vinylcyclohexane; and methyl (meth)acrylate, benzyl (meth)acrylate, or styrene is preferable.

An epoxy equivalent of the epoxy resin is preferably 310 to 3300 g/eq, more preferably 310 to 1700 g/eq, and still more preferably 310 to 1000 g/eq. One kind of the epoxy resin or a mixture of two or more kinds of epoxy resins may be used.

As the epoxy resin, a commercially available product can also be used. Examples of the commercially available product include the following products.

Examples of the bisphenol A-type epoxy resin include JER827, JER828, JER834, JER1001, JER1002, JER1003, JER1055, JER1007, JER1009, and JER1010 (all of which are manufactured by Mitsubishi Chemical Corporation); and EPICLON 860, EPICLON 1050, EPICLON 1051, and EPICLON 1055 (all of which are manufactured by DIC Corporation).

Examples of the bisphenol F-type epoxy resin include JER806, JER807, JER4004, JER4005, JER4007, and JER4010 (all of which are manufactured by Mitsubishi Chemical Corporation); EPICLON 830 and EPICLON 835 (both of which are manufactured by DIC Corporation); and LCE-21 and RE-602S (both of which are manufactured by Nippon Kayaku Co., Ltd.).

Examples of the phenol novolac-type epoxy resin include JER152, JER154, JER157S70, and JER157S65 (all of which are manufactured by Mitsubishi Chemical Corporation); and EPICLON N-740, EPICLON N-770, and EPICLON N-775 (all of which are manufactured by DIC Corporation).

Examples of the cresol novolac-type epoxy resin include EPICLON N-660, EPICLON N-665, EPICLON N-670, EPICLON N-673, EPICLON N-680, EPICLON N-690, and EPICLON N-695 (all of which are manufactured by DIC Corporation); and EOCN-1020 (manufactured by Nippon Kayaku Co., Ltd.).

Examples of the aliphatic epoxy resin include ADEKA RESIN EP-4080S, EP-4085S, and EP-4088S (all of which are manufactured by ADEKA Corporation); CELLOXIDE 2021P, CELLOXIDE 2081, CELLOXIDE 2083, CELLOX- IDE 2085, EHPE 3150, EPOLEAD PB 3600, and EPOLEAD PB 4700 (all of which are manufactured by Daicel Corporation); and DENACOL EX-212L, EX-214L, EX-216L, EX-321L, and EX-850L (all of which are manufactured by Nagase ChemteX Corporation).

Other examples thereof include ADEKA RESIN EP-4000S, ADEKA RESIN EP-4003S, ADEKA RESIN EP-4010S, and ADEKA RESIN EP-4011S (all of which manufactured by ADEKA Corporation), NC-2000, NC-3000, NC-7300, XD-1000, EPPN-501, and EPPN-502 (all of which are manufactured by ADEKA Corporation), and JER1031S (manufactured by Mitsubishi Chemical Corporation).

It is also preferable that the resin is a resin having at least one kind of repeating units represented by Formulae (A1-1) to (A1-7).

(A1-1)

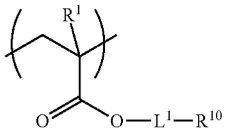

(A1-2)

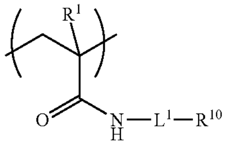

(A1-3)

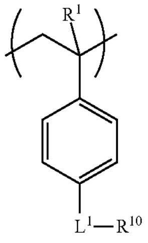

(A1-4)

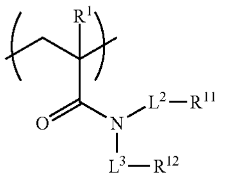

(A1-5)

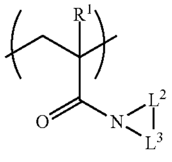

(A1-6)

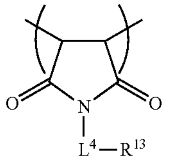

-continued (A1-7)

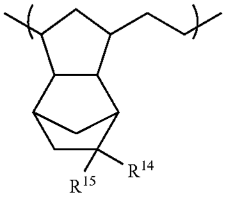

In the formulae, $R^1$ represents a hydrogen atom or an alkyl group, $L^1$ to $L^4$ each independently represent a single bond or a divalent linking group, and $R^{10}$ to $R^{13}$ each independently represent an alkyl group or an aryl group. $R^{14}$ and $R^{15}$ each independently represent a hydrogen atom or a substituent.

The number of carbon atoms in the alkyl group represented by $R^1$ is preferably 1 to 5, more preferably 1 to 3, and still more preferably 1. It is preferable that $R^1$ is a hydrogen atom or a methyl group.

$L^1$ to $L^4$ each independently represent a single bond or a divalent linking group. Examples of the divalent linking group include an alkylene group, an arylene group, —O—, —S—, —SO—, —CO—, —COO—, —OCO—, —$SO_2$—, —NRa—(Ra represents a hydrogen atom or an alkyl group and preferably a hydrogen atom), and a group consisting of a combination thereof. The number of carbon atoms in the alkylene group preferably is 1 to 30, more preferably 1 to 15, and still more preferably 1 to 10. The alkylene group may have a substituent, but is preferably unsubstituted. The alkylene group may be linear, branched, or cyclic. In addition, the cyclic alkylene group may be monocyclic or polycyclic. The number of carbon atoms in the arylene group is preferably 6 to 18, more preferably 6 to 14, and still more preferably 6 to 10.

The alkyl group represented by $R^{10}$ may be linear, branched, or cyclic, and is preferably cyclic. The alkyl group may have a substituent or may be unsubstituted. The number of carbon atoms in the alkyl group is preferably 1 to 30, more preferably 1 to 20, and still more preferably 1 to 10. The number of carbon atoms in the aryl group represented by $R^{10}$ is preferably 6 to 18, more preferably 6 to 12, and still more preferably 6. It is preferable that $R^{10}$ is a cyclic alkyl group or an aryl group.

The alkyl group represented by $R^{11}$ and $R^{12}$ may be linear, branched, or cyclic, and is preferably linear or branched. The alkyl group may have a substituent or may be unsubstituted. The number of carbon atoms in the alkyl group is preferably 1 to 12, more preferably 1 to 6, and still more preferably 1 to 4. The number of carbon atoms in the aryl group represented by $R^{11}$ and $R^{12}$ is preferably 6 to 18, more preferably 6 to 12, and still more preferably 6. It is preferable that $R^{11}$ and $R^{12}$ are a linear or branched alkyl group.

The alkyl group represented by $R^{13}$ may be linear, branched, or cyclic, and is preferably linear or branched. The alkyl group may have a substituent or may be unsubstituted. The number of carbon atoms in the alkyl group is preferably 1 to 12, more preferably 1 to 6, and still more preferably 1 to 4. The number of carbon atoms in the aryl group represented by $R^{13}$ is preferably 6 to 18, more preferably 6 to 12, and still more preferably 6. It is preferable that $R^{13}$ is a linear or branched alkyl group or an aryl group.

Examples of the substituent represented by $R^{14}$ and $R^{15}$ include a halogen atom, a cyano group, a nitro group, an alkyl group, an alkenyl group, an alkynyl group, an aryl group, a heteroaryl group, an aralkyl group, an alkoxy group, an aryloxy group, a heteroaryloxy group, an alkylthio group, an arylthio group, a heteroarylthio group, $—NR^{a1}R^{a2}$, $—COR^{a3}$, $—COOR^{a4}$, $OCOR^{a5}$, $—NHCOR^{a6}$, $—CONR^{a7}R^{a8}$, $—NHCONR^{a9}R^{a10}$, $—NHCOOR^{a11}$, $—SO_2R^{a12}$, $—SO_2OR^{a13}$, $—NHSO_2R^{a14}$, and $—SO_2NR^{a15}R^{a16}$. $R^{a1}$ to $R^{a16}$ each independently represent a hydrogen atom, an alkyl group, an alkenyl group, an alkynyl group, an aryl group, or a heteroaryl group. Among these, it is preferable that at least one of $R^{14}$ or $R^{15}$ represents a cyano group or $—COOR^{a4}$. It is preferable that $R^{a4}$ represents a hydrogen atom, an alkyl group, or an aryl group.

Examples of a commercially available product of the resin having the repeating unit represented by Formula (A1-7) include ARTON F4520 (manufactured by JSR Corporation). In addition, details of the resin having the repeating unit represented by Formula (A1-7) can be found in paragraphs 0053 to 0075 and 0127 to 0130 of JP2011-100084A, the contents of which are incorporated herein by reference.

The resin is preferably a resin having the repeating unit represented by Formula (A1-1) and/or Formula (A1-4), and more preferably a resin having the repeating unit represented by Formula (A1-4). According to this aspect, thermal shock resistance of a cured film to be obtained tends to be improved. Furthermore, compatibility between the copper complex and the resin is improved, and a cured film with few precipitates and the like can be manufactured. The resin including the repeating unit having a crosslinkable group is preferably used after being stored at a low temperature (for example, 25 °C or lower, more preferably 0 °C or lower).

It is also preferable that the resin is a resin including a repeating unit having a crosslinkable group. According to this aspect, a cured film having excellent solvent resistance, thermal shock resistance, and the like is easily obtained. In particular, a resin including the repeating unit represented by Formula (A1-1) and/or Formula (A1-4) and the repeating unit having a crosslinkable group is more preferable.

As the crosslinkable group, a group having an ethylenically unsaturated bond, a cyclic ether group, a methylol group, or an alkoxysilyl group is preferable; a group having an ethylenically unsaturated bond, a cyclic ether group, or an alkoxysilyl group is more preferable; a cyclic ether group or an alkoxysilyl group is still more preferable; and an alkoxysilyl group is even more preferable. Examples of the group having an ethylenically unsaturated bond include a vinyl group, a (meth)allyl group, and a (meth)acryloyl group. Examples of the cyclic ether group include an epoxy group (oxiranyl group), an oxetanyl group, and an alicyclic epoxy group. Examples of the alkoxysilyl group include a monoalkoxysilyl group, a dialkoxysilyl group, and a trialkoxysilyl group.

Examples of the repeating unit having a crosslinkable group include repeating units represented by Formulae (A2-1) to (A2-4), and a repeating unit represented by Formula (A2-1) or (A2-3) is preferable.

(A2-1)

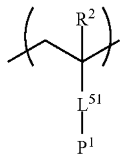

(A2-2)

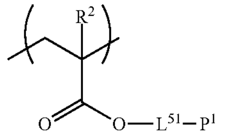

-continued (A2-3)

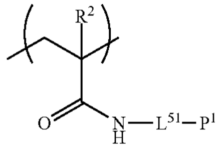

(A2-4)

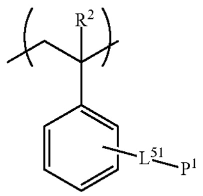

$R^2$ represents a hydrogen atom or an alkyl group. The number of carbon atoms in the alkyl group is preferably 1 to 5, more preferably 1 to 3, and still more preferably 1. It is preferable that $R^2$ is a hydrogen atom or a methyl group.

$L^{51}$ represents a single bond or a divalent linking group. Examples of the divalent linking group include the divalent linking groups described in $L^1$ to $L^4$ in Formulae (A1-1) to (A1-7) above. $L^{51}$ is preferably an alkylene group or a group formed by combining an alkylene group and —O—. The number of atoms constituting the chain of $L^{51}$ is preferably 2 or more, more preferably 3 or more, and still more preferably 4 or more. The upper limit thereof can be, for example, 200 or less.

$P^1$ represents a crosslinkable group. Examples of the crosslinkable group include a group having an ethylenically unsaturated bond, a cyclic ether group, a methylol group, and an alkoxysilyl group; and a group having an ethylenically unsaturated bond, a cyclic ether group, or an alkoxysilyl group is preferable, a cyclic ether group or an alkoxysilyl group is more preferable, and an alkoxysilyl group is still more preferable. Examples of details of the group having an ethylenically unsaturated bond, the cyclic ether group, and the alkoxysilyl group include the groups described above. The number of carbon atoms in an alkoxy group of the alkoxysilyl group is preferably 1 to 5, more preferably 1 to 3, and particularly preferably 1 or 2.

In a case where the resin is a resin including a repeating unit having a crosslinkable group, a content of the repeating unit having a crosslinkable group in all repeating units of the resin is preferably 10% to 90% by mass, more preferably 10% to 80% by mass, and still more preferably 30% to 80% by mass. According to this aspect, a cured film having excellent solvent resistance is easily obtained.

The resin may contain other repeating units in addition to the above-described repeating units. With regard to components constituting the other repeating units, reference can be made to the description in paragraphs 0068 to 0075 of JP2010-106268A (corresponding to paragraphs 0112 to 0118 of US2011/0124824A), the contents of which are incorporated herein by reference.

Specific examples of the resin include resins having the following structures. A numerical value described together with the repeating unit are a mass ratio.

A-1

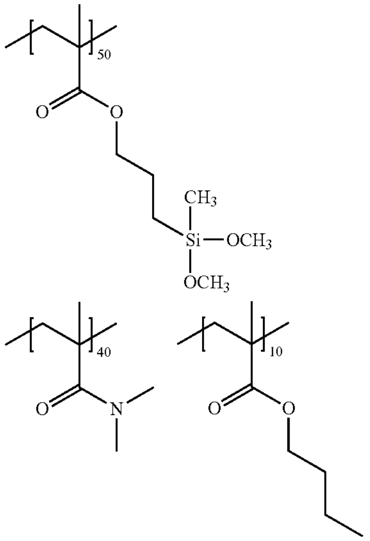

A-2

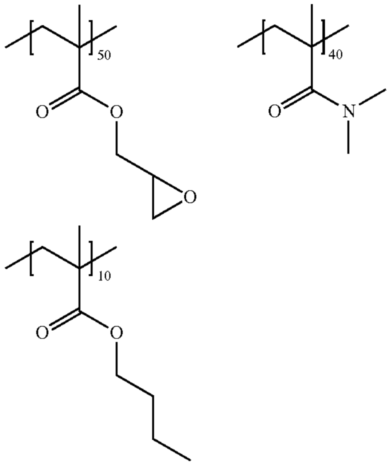

A-3

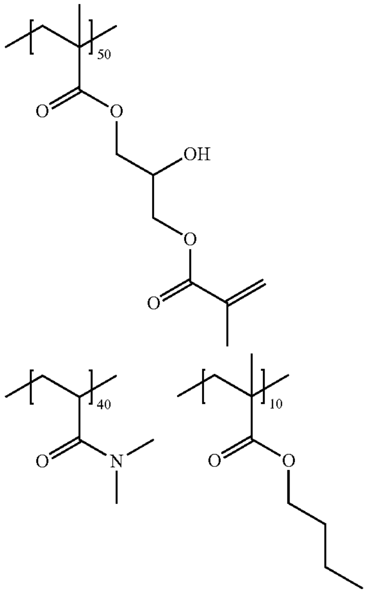

In a case where the composition for forming a copper complex layer contains the resin, a content of the resin is preferably 1% to 90% by mass with respect to the total solid content of the composition for forming a copper complex layer. The lower limit thereof is preferably 5% by mass or more, more preferably 10% by mass or more, and still more preferably 15% by mass or more. The upper limit thereof is preferably 80% by mass or less and more preferably 75% by mass or less. The resin may be used alone or in combination of two or more kinds thereof. In a case of two or more kinds thereof, the total amount thereof is preferably within the above-described range.

<<Compound Having Crosslinkable Group (Crosslinking Compound)>>

The composition for forming a copper complex layer may contain a compound having a crosslinkable group (hereinafter, also referred to as a crosslinking compound). Examples of the crosslinking compound include a compound which has a group having an ethylenically unsaturated bond, a compound having a cyclic ether group, a compound having a methylol group, and a compound having an alkoxysilyl group.

Examples of the group having an ethylenically unsaturated bond include a vinyl group, a (meth)allyl group, and a (meth)acryloyl group.

Examples of the cyclic ether group include an epoxy group (oxiranyl group), an oxetanyl group, and an alicyclic epoxy group.

Examples of the alkoxysilyl group include a monoalkoxysilyl group, a dialkoxysilyl group, and a trialkoxysilyl group.

The crosslinking compound may be in any form of a monomer or a polymer, but is preferably a monomer. A molecular weight of the monomer-type crosslinking compound is preferably 100 to 3,000. The upper limit thereof is preferably 2,000 or less and more preferably 1,500 or less. The lower limit thereof is preferably 150 or more and more preferably 250 or more.

In addition, it is also preferable that the crosslinking compound is a compound having substantially no molecular weight distribution. Here, the expression of having substantially no molecular weight distribution means that a dispersity (weight-average molecular weight (Mw)/number-average molecular weight (Mn)) of the compound is preferably 1.0 to 1.5 and more preferably 1.0 to 1.3.

A crosslinkable group equivalent of the crosslinking compound is preferably 3.0 to 8.0 mmol/g, more preferably 3.5 to 8.0 mmol/g, and still more preferably 4.0 to 7.0 mmol/g. In addition, the crosslinking compound preferably has two or more crosslinkable groups in one molecule. The upper limit thereof is preferably 15 or less, more preferably 10 or less, and still more preferably 6 or less. The crosslinkable group equivalent of the crosslinking compound is defined by the amount (mmol) of crosslinkable groups included in 1 g of a sample.

In the present invention, the crosslinking compound is preferably the compound which has a group having an ethylenically unsaturated bond, the compound having a cyclic ether group, or the compound having an alkoxysilyl group, and more preferably the compound having an alkoxysilyl group.

In addition, a silicon value of the compound having an alkoxysilyl group is preferably 3.0 to 8.0 mmol/g, more preferably 3.5 to 8.0 mmol/g, and still more preferably 4.0 to 7.0 mmol/g. The silicon value of the crosslinking compound is defined by the amount (mmol) of silicon included in 1 g of a sample.

(Compound which has Group Having Ethylenically Unsaturated Bond)

In the present invention, the compound which has a group having an ethylenically unsaturated bond can be used as the crosslinking compound. The compound which has a group having an ethylenically unsaturated bond is preferably a monomer.

A molecular weight of the above-described compound is preferably 100 to 3,000. The upper limit thereof is preferably 2,000 or less and more preferably 1,500 or less. The lower limit thereof is preferably 150 or more and more preferably 250 or more. The above-described compound is preferably a (meth)acrylate compound having 3- to 15-functional groups and more preferably a (meth)acrylate compound having 3- to 6-functional groups.

As an example of the compound which has a group having an ethylenically unsaturated bond, the description described in paragraphs 0033 and 0034 of JP2013-253224A can be referred to, the contents of which are incorporated herein by reference.

As the compound which has a group having an ethylenically unsaturated bond, ethyleneoxy-modified pentaerythritol tetraacrylate (as a commercially available product, NK ESTER ATM-35E manufactured by Shin-Nakamura Chemical Co., Ltd.), dipentaerythritol triacrylate (as a commercially available product, KAYARAD D-330 manufactured by Nippon Kayaku Co., Ltd.), dipentaerythritol tetraacrylate (as a commercially available product, KAYARAD D-320 manufactured by Nippon Kayaku Co., Ltd.), dipentaerythritol penta(meth)acrylate (as a commercially available product, KAYARAD D-310 manufactured by Nippon Kayaku Co., Ltd.), dipentaerythritol hexa(meth)acrylate (as a commercially available product, KAYARAD DPHA manufactured by Nippon Kayaku Co., Ltd., A-DPH-12E, manufactured by Shin-Nakamura Chemical Co., Ltd.), or a structure in which the (meth)acryloyl group is bonded through an ethylene glycol residue or a propylene glycol residue is preferable. In addition, an oligomer type of these compounds can also be used. In addition, reference can be made to the description in paragraphs 0034 to 0038 of JP2013-253224A, the contents of which are incorporated herein by reference. In addition, examples thereof include polymerizable monomers described in paragraph 0477 of JP2012-208494A (corresponding to paragraph 0585 of US2012/0235099A), the contents of which are incorporated herein by reference.

In addition, diglycerin ethylene oxide (EO)-modified (meth)acrylate (as a commercially available product, M-460 manufactured by Toagosei Co., Ltd.), pentaerythritol tetraacrylate (A-TMMT manufactured by Shin-Nakamura Chemical Co., Ltd.), 1,6-hexanediol diacrylate (KAYARAD HDDA manufactured by Nippon Kayaku Co., Ltd.), or Rp-1040 (manufactured by Nippon Kayaku Co., Ltd.) is also preferable.

The compound which has a group having an ethylenically unsaturated bond may have an acid group such as a carboxyl group, a sulfo group, and a phosphate group. Examples of the compound having an acid group include an ester of an aliphatic polyhydroxy compound and an unsaturated carboxylic acid. A compound obtained by reacting a non-aromatic carboxylic acid anhydride with an unreacted hydroxyl group of an aliphatic polyhydroxy compound to provide an acid group is preferable, and in this ester, an ester in which the aliphatic polyhydroxy compound is pentaerythritol and/or dipentaerythritol is particularly preferable. Examples of a commercially available product thereof include M-305, M-510, and M-520 of ARONIX series as polybasic acid-modified acrylic oligomers (manufactured by Toagosei Co., Ltd.).

An acid value of the compound having an acid group is preferably 0.1 to 40 mgKOH/g. The lower limit thereof is preferably 5 mgKOH/g or more. The upper limit thereof is preferably 30 mgKOH/g or less.

As the compound which has a group having an ethylenically unsaturated bond, a compound having a caprolactone structure is also a preferred aspect. The compound having a caprolactone structure is not particularly limited as long as it has a caprolactone structure in the molecule thereof, and examples thereof include ε-caprolactone-modified polyfunctional (meth)acrylate obtained by esterification of a polyhydric alcohol such as trimethylolethane, ditrimethylolethane, trimethylolpropane, ditrimethylolpropane, pentaerythritol, dipentaerythritol, tripentaerythritol, glycerin, diglycerol, and trimethylolmelamine with (meth)acrylic acid and ε-caprolactone.

With regard to the compound having a caprolactone structure, reference can be made to the description in paragraphs 0042 to 0045 of JP2013-253224A, the contents of which are incorporated herein by reference. Examples of the compound having a caprolactone structure include commercially available products as KAYARAD DPCA series from Nippon Kayaku Co., Ltd., such as DPCA-20, DPCA-30, DPCA-60, and DPCA-120; SR-494 manufactured by Arkema, which is a tetrafunctional acrylate having four ethyleneoxy chains; and TPA-330 which is a trifunctional acrylate having three isobutyleneoxy chains.

As the compound which has a group having an ethylenically unsaturated bond, urethane acrylates described in JP1973-041708B (JP-S48-041708B), JP1976-037193A (JP-S51-037193A), JP1990-032293B (JP-H2-032293B), and JP1990-016765B (JP-H2-016765B), or urethane compounds having an ethylene oxide-based skeleton, described in JP1983-049860B (JP-S58-049860B), JP1981-017654B (JP-S56-017654B), JP1987-039417B (JP-S62-039417B), and JP1987-039418B (JP-S62-039418B), are also suitable. In addition, it is also preferable to use compounds described in JP1988-277653A (JP-S63-277653A), JP1988-260909A (JP-S63-260909A, and JP1989-105238A (JP-H1-105238A). Examples of a commercially available product thereof include urethane oligomers UAS-10 and UAB-140 (manufactured by Sanyo Kokusaku Pulp Co., Ltd.), UA-7200 (manufactured by Shin-Nakamura Chemical Co., Ltd.), DPHA-40H (manufactured by Nippon Kayaku Co., Ltd.), and UA-306H, UA-306T, UA-306I, AH-600, T-600, and AI-600 (manufactured by Kyoeisha Chemical Co., Ltd.).

(Compound Having Cyclic Ether Group)

In the present invention, the compound having a cyclic ether group can also be used as the crosslinking compound. Examples of the cyclic ether group include an epoxy group and an oxetanyl group, and an epoxy group is preferable.

Examples of the compound having a cyclic ether group include a polymer having a cyclic ether group at a side chain and a monomer or oligomer having two or more cyclic ether groups in a molecule. Examples thereof include a bisphenol A-type epoxy resin, a bisphenol F-type epoxy resin, a phenol novolac-type epoxy resin, a cresol novolac-type epoxy resin, and an aliphatic epoxy resin. In addition, a monofunctional or polyfunctional glycidyl ether compound can also be used. A weight-average molecular weight of the compound having a cyclic ether group is preferably 500 to 5,000,000 and more preferably 1,000 to 500,000.

As a commercially available product of the compound having a cyclic ether group, for example, the description in paragraph 0191 of JP2012-155288A and the like can be referred to, the contents of which are incorporated herein by reference. In addition, examples thereof include polyfunctional aliphatic glycidyl ether compounds such as DENACOL EX-212L, EX-214L, EX-216L, EX-321L, and EX-850L (all of which are Nagase ChemteX Corporation). These are low-chlorine products, but EX-212, EX-214, EX-216, EX-321, EX-850, and the like, which are not low-chlorine products, can also be used in the same manner. In addition, examples thereof also include ADEKA RESIN EP-4000S, ADEKA RESIN EP-4003S, ADEKA RESIN EP-4010S, and ADEKA RESIN EP-4011S (all of which are manufactured by ADEKA Corporation); NC-2000, NC-3000, NC-7300, XD-1000, EPPN-501, and EPPN-502 (all of which are manufactured by ADEKA Corporation); JER1031S, CELLOXIDE 2021P, CELLOXIDE 2081, CELLOXIDE 2083, CELLOXIDE 2085, EHPE3150, EPOLEAD PB 3600, and EPOLEAD PB 4700 (all of which are manufactured by Daicel Corporation); and CYCLOMER P ACA 200M, CYCLOMER P ACA 230AA, CYCLOMER P ACA Z250, CYCLOMER PACA Z251, CYCLOMER PACA Z300, and CYCLOMER P ACA Z320 (all of which are manufactured by Daicel Corporation). Furthermore, examples of the commercially available product of the phenol novolac-type epoxy resin include JER-157S65, JER-152, JER-154, and JER-157S70 (all of which are manufactured by Mitsubishi Chemical Corporation). In addition, specific examples of the polymer having an oxetanyl group at the side chain and the polymerizable monomer or oligomer having two or more oxetanyl groups in the molecule include ARON OXETANE OXT-121, OXT-221, OX-SQ, and PNOX (all of which are manufactured by Toagosei Co., Ltd.).

(Compound Having Alkoxysilyl Group)

In the present invention, the compound having an alkoxysilyl group can also be used as the crosslinking compound. The number of carbon atoms in an alkoxy group of the alkoxysilyl group is preferably 1 to 5, more preferably 1 to 3, and particularly preferably 1 or 2. The number of alkoxysilyl groups in one molecule is preferably 2 or more and more preferably 2 or 3.

Specific examples of the compound having an alkoxysilyl group include methyltrimethoxysilane, dimethyldimethoxysilane, phenyltrimethoxysilane, methyltriethoxysilane, dimethyl diethoxysilane, phenyltriethoxysilane, n-propyltrimethoxysilane, n-propyltriethoxysilane, hexyl trimethoxysilane, hexyl triethoxysilane, octyl triethoxysilane, decyl trimethoxysilane, 1,6-bis(trimethoxysilyl)hexane, trifluoropropyltrimethoxysilane, hexamethyldisilazane, vinyl trimethoxysilane, 2-(3,4-epoxycyclohexyl)ethyltrimethoxysilane, 3-3-glycidoxypropyltrimethoxysilane, 3-glycidoxypropylmethyldimethoxysilane, vinyltriethoxysilane, glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, N-(vinylbenzyl)-2-aminoethyl-3-aminopropyltrimethoxysilane hydrochloride, tris-(trimethoxysilylpropyl)isocyanurate, 3-ureidopropyltriethoxysilane, 3-mercaptopropylmethyldimethoxysilane, 3-mercaptopropyltrimethoxysilane, and bis(triethoxysilylpropyl)tetrasulfide, and 3-isocyanatepropyltriethoxysilane. In addition to the above, an alkoxy oligomer can be used. In addition, the following compounds can also be used.

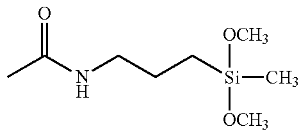

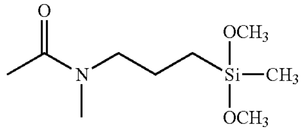

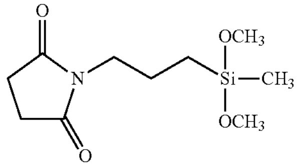

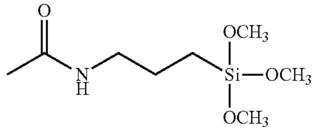

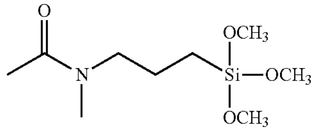

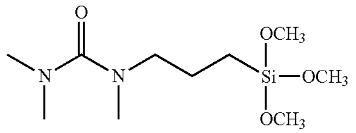

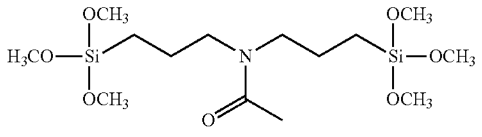

Examples of a commercially available product thereof include KBM-13, KBM-22, KBM-103, KBE-13, KBE-22, KBE-103, KBM-3033, KBE-3033, KBM-3063, KBM-3066, KBM-3086, KBE-3063, KBE-3083, KBM-3103, KBM-3066, KBM-7103, SZ-31, KPN-3504, KBM-1003, KBE-1003, KBM-303, KBM-402, KBM-403, KBE-402, KBE-403, KBM-1403, KBM-502, KBM-503, KBE-502, KBE-503, KBM-5103, KBM-602, KBM-603, KBM-903, KBE-903, KBE-9103, KBM-573, KBM-575, KBM-9659, KBE-585, KBM-802, KBM-803, KBE-846, KBE-9007, X-40-1053, X-41-1059A, X-41-1056, X-41-1805, X-41-1818, X-41-1810, X-40-2651, X-40-2655A, KR-513, KC-89S, KR-500, X-40-9225, X-40-9246, X-40-9250, KR-401N, X-40-9227, X-40-9247, KR-510, KR-9218, KR-213, X-40-2308, and X-40-9238, all manufactured by Shin-Etsu Silicone Co., Ltd.

In a case where the composition for forming a copper complex layer contains a crosslinking compound, a content of the crosslinking compound is preferably 1% to 30% by mass, more preferably 1% to 25% by mass, and still more preferably 1% to 20% by mass with respect to the total solid content of the composition for forming a copper complex layer. The crosslinking compound may be used alone or in combination of two or more kinds thereof. In a case of two or more kinds thereof, the total amount thereof is preferably within the above-described range.

<<Dehydrating Agent>>

It is also preferable that the composition for forming a copper complex layer contains a dehydrating agent. In a case where the composition for forming a copper complex layer contains a dehydrating agent, storage stability of the solution can be improved.

Specific examples of the dehydrating agent include silane compounds such as vinyltrimethoxysilane, dimethyldimethoxysilane, tetraethoxysilane, methyltrimethoxysilane, methyltriethoxysilane, tetramethoxysilane, phenyltrimethoxysilane, and diphenyldimethoxysilane; orthoester compounds such as methyl orthoformate, ethyl orthoformate, methyl orthoacetate, ethyl orthoacetate, trimethyl orthopropionate, triethyl orthopropionate, trimethyl orthoisopropionate, triethyl orthoisopropionate, trimethyl orthobutyrate, triethyl orthobutyrate, trimethyl orthoisobutyrate, and triethyl orthoisobutyrate; ketal compounds such as acetone dimethyl ketal, diethyl ketone dimethyl ketal, acetophenone dimethyl ketal, cyclohexanone dimethyl ketal, cyclohexanone diethyl ketal, and benzophenone dimethyl ketal; and lower alcohols having 1 to 4 carbon atoms, such as methanol and ethanol. These may be used alone or in combination of two or more.

The dehydrating agent may be added, for example, to the components before the resin is polymerized, may be added during the polymerization of the resin, or may be added at the time of mixing the obtained resin with other components, and there is no particular limitation.

A content of the dehydrating agent is not particularly limited, but is preferably 0.5 to 20 parts by mass and more preferably 2 to 10 parts by mass with respect to 100 parts by mass of the resin.

<<Polymerization Initiator>>

The composition for forming a copper complex layer may contain a polymerization initiator. The polymerization initiator is not particularly limited as long as it has an ability to initiate a polymerization of a polymerizable compound by any one or both of light and heat, but a photopolymerization initiator is preferable. In the case where the polymerization is initiated by light, a polymerization initiator having photosensitivity to light in the ultraviolet region to the visible region is preferable. In addition, in a case where the polymerization is initiated by heat, a polymerization initiator which decomposes at 150 °C to 250 °C is preferable.

As the polymerization initiator, a compound having an aromatic group is preferable. Examples thereof include an acylphosphine compound, an acetophenone compound, an α-hydroxyketone compound, an α-aminoketone compound, a benzophenone compound, a benzoin ether compound, a ketal derivative compound, a thioxanthone compound, an oxime compound, a hexaarylbiimidazole compound, a trihalomethyl compound, an azo compound, an organic peroxide, an onium salt compound such as a diazonium compound, an iodonium compound, a sulfonium compound, an azinium compound, and a metallocene compound, an organoboron salt compound, a disulfone compound, and a thiol compound. Details of the polymerization initiator can be found in paragraphs 0217 to 0228 of JP2013-253224A, the content of which is incorporated herein by reference.

The polymerization initiator is preferably an oxime compound, an α-hydroxyketone compound, an α-aminoketone compound, or an acylphosphine compound. As the α-hydroxyketone compound, IRGACURE-184, DAROCUR-1173, IRGACURE-500, IRGACURE-2959, or IRGACURE-127 (all of which are manufactured by BASF) can be used. As the α-aminoketone compound, IRGACURE-907, IRGACURE-369, IRGACURE-379, or IRGACURE-379EG (all of which are manufactured by BASF) can be used. As the acylphosphine compound, IRGACURE-819 or DAROCUR-TPO (all of which are manufactured by BASF) can be used. As the oxime compound, IRGACURE-OXE01, IRGACURE-OXE02, IRGACURE-OXE03, and IRGACURE-OXE04 (all of which are manufactured by BASF); TR-PBG-304 (manufactured by TRONLY); ADEKA ARKLS NCl-831 (manufactured by ADEKA Corporation); ADEKA ARKLS NCl-930 (manufactured by ADEKA Corporation); or ADEKA OPTOMER N-1919 (manufactured by ADEKA Corporation; photopolymerization initiator 2 described in JP2012-14052A) can be used.

A content of the polymerization initiator is preferably 0.01% to 30% by mass with respect to the total solid content of the composition for forming a copper complex layer. The lower limit thereof is preferably 0.1% by mass or more. The upper limit thereof is preferably 20% by mass or less and more preferably 15% by mass or less. The polymerization initiator may be used alone or in combination of two or more kinds thereof. In a case of two or more kinds thereof, the total amount thereof is preferably within the above-described range.

A support to be used is a member having a function as a base material for applying the composition. The support may be a so-called temporary support.

Examples of the support (temporary support) include a plastic substrate and a glass substrate. Examples of a material constituting the plastic substrate include a polyester resin such as polyethylene terephthalate, a polycarbonate resin, a (meth)acrylic resin, an epoxy resin, a polyurethane resin, a polyamide resin, a polyolefin resin, a cellulose resin, a silicone resin, and polyvinyl alcohol.

A thickness of the support may be approximately 5 to 1000 μm, preferably 10 to 250 μm and more preferably 15 to 90 μm.

In addition, in a case where the near infrared light absorbing layer is used in a state of including the support, it is preferable that the support contains an ultraviolet absorber. By containing the ultraviolet absorber int the support, light resistance of the near infrared light absorbing layer can be improved.

<<Surfactant>>

The composition for forming a copper complex layer may contain a surfactant. The surfactant may be used alone or in combination of two or more kinds thereof. A content of the surfactant is preferably 0.0001% to 5% by mass with respect to the total solid content of the composition for forming a copper complex layer. The lower limit thereof is preferably 0.005% by mass or more and more preferably 0.01% by mass or more. The upper limit thereof is preferably 2% by mass or less and more preferably 1% by mass or less.

As the surfactant, various surfactants such as a fluorine-based surfactant, a nonionic surfactant, a cationic surfactant, an anionic surfactant, and a silicone-based surfactant can be used. It is preferable that the composition for forming a copper complex layer contains at least one of a fluorine-based surfactant or a silicone-based surfactant. Interfacial tension between a surface to be coated and a coating liquid is reduced, and wettability to the surface to be coated is improved. Therefore, liquid characteristics (particularly, fluidity) of the composition are improved, and uniformity of the coating thickness and liquid saving property are further improved. As a result, even in a case where a thin film having a thickness in several micrometers is formed with a small amount of the liquid, a film with a uniform thickness, which exhibits a small extent of thickness unevenness, can be formed.

A fluorine content of the fluorine-based surfactant is preferably 3% to 40% by mass. The lower limit thereof is preferably 5% by mass or more and more preferably 7% by mass or more. The upper limit thereof is preferably 30% by mass or less and more preferably 25% by mass or less. In a case where the fluorine content is within the above-described range, it is effective in terms of uniformity of the thickness of the coating film and liquid saving property, and the solubility is also favorable.

Specific examples of the fluorine-based surfactant include surfactants described in paragraphs 0060 to 0064 of JP2014-041318A (paragraphs 0060 to 0064 of the corresponding WO2014/017669A) and the like, and surfactants described in paragraphs 0117 to 0132 of JP2011-132503A, the contents of which are incorporated herein by reference. Examples of a commercially available product of the fluorine-based surfactant include MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, and MEGAFACE F780 (all of which are manufactured by DIC Corporation); FLUORAD FC430, FLUORAD FC431, and FLUORAD FC171 (all of which are manufactured by Sumitomo 3M Limited); SURFLON S-382, SURFLON SC-101, SURFLON SC-103, SURFLON SC-104, SURFLON SC-105, SURFLON SC1068, SURFLON SC-381, SURFLON SC-383, SURFLON S393, and SURFLON KH-40 (all of which are manufactured by ASAHI GLASS CO., LTD.); and PolyFox PF636, PF656, PF6320, PF6520, and PF7002 (all of which are manufactured by OMNOVA Solutions Inc.).

In addition, as the fluorine-based surfactant, an acrylic compound in which, in a case where heat is applied to a molecular structure which has a functional group including a fluorine atom, the functional group including a fluorine atom is cut and a fluorine atom is volatilized can also be suitably used. Examples of such a fluorine-based surfactant include MEGAFACE DS series manufactured by DIC Corporation (The Chemical Daily (Feb. 22, 2016) and Nikkei Business Daily (Feb. 23, 2016)), for example, MEGAFACE DS-21, which can be used.

As the fluorine-based surfactant, a block polymer can also be used. Examples thereof include compounds described in JP2011-089090A. As the fluorine-based surfactant, a fluorine-containing polymer compound can be preferably used, the fluorine-containing polymer compound including: a repeating unit derived from a (meth)acrylate compound having a fluorine atom; and a repeating unit derived from a (meth)acrylate compound having 2 or more (preferably 5 or more) alkyleneoxy groups (preferably an ethyleneoxy group and a propyleneoxy group). The following compound is also exemplified as the fluorine-based surfactant used in the present invention.

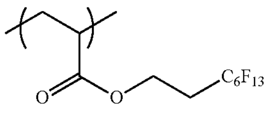

-continued

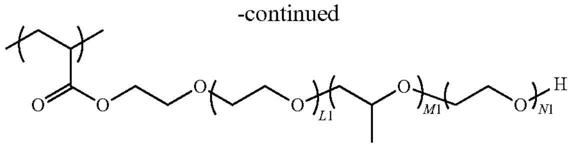

62%

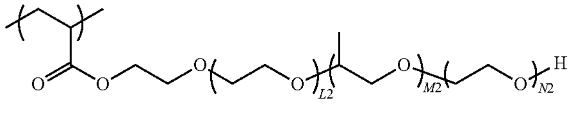

38%

L1 + N1 + L2 + N2 = 14
M1 + M2 = 17

A weight-average molecular weight of the above-described compound is preferably 3,000 to 50,000, and is, for example, 14,000. In the above-described compound, "%" representing the proportion of a repeating unit is % by mass.

In addition, as the fluorine-based surfactant, a fluorine-containing polymer having an ethylenically unsaturated group in the side chain can be used. Specific examples thereof include compounds described in paragraphs 0050 to 0090 and paragraphs 0289 to 0295 of JP2010-164965A, for example, MEGAFACE RS-101, RS-102, RS-718K, and RS-72-K manufactured by DIC Corporation. As the fluorine-based surfactant, compounds described in paragraphs 0015 to 0158 of JP2015-117327A can also be used.

Specific examples of the nonionic surfactant include nonionic surfactants described in paragraph 0553 of JP2012-208494A (corresponding to [0679] of US2012/0235099A), the contents of which are incorporated herein by reference.

Specific examples of the cationic surfactant include cationic surfactants described in paragraph 0554 of JP2012-208494A (corresponding to [0680] of US2012/0235099A), the contents of which are incorporated herein by reference.

Specific examples of the anionic surfactant include W004, W005, and W017 (manufactured by Yusho Co., Ltd.).

Examples of the silicone-based surfactant include silicone-based surfactants described in paragraph 0556 of JP2012-208494A (corresponding to [0682] of US2012/0235099A), the contents of which are incorporated herein by reference.

<<Ultraviolet Absorber>>

The composition for forming a copper complex layer can contain an ultraviolet absorber. According to this aspect, the near infrared light absorbing layer satisfying the above-described spectral characteristics can be formed by one layer.

Examples of the ultraviolet absorber include a conjugated diene compound, an aminodiene compound, a salicylate compound, a benzophenone compound, a benzotriazole compound, an acrylonitrile compound, and a hydroxyphenyltriazine compound. Among these, from the reason that compatibility with the copper complex and the like is favorable, absorption wavelength with the copper complex is suitable, and ultraviolet shielding property can be improved while maintaining excellent visible transparency, a benzotriazole compound or a hydroxyphenyltriazine compound is preferable. Details thereof can be found in paragraphs 0052 to 0072 of JP2012-208374A and paragraphs 0317 to 0334 of JP2013-068814A, the contents of which are incorporated herein by reference.

In addition, the conjugated diene compound is preferably a compound represented by Formula (UV-1).

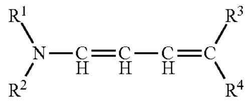

(UV-1)

In Formula (UV-1), $R^1$ and $R^2$ each independently represent a hydrogen atom, an alkyl group having 1 to 20 carbon atoms, or an aryl group having 6 to 20 carbon atoms, and $R^1$ and $R^2$ may be the same or different from each other, but $R^1$ and $R^2$ do not represent a hydrogen atom at the same time.

$R^1$ and $R^2$ may form a cyclic amino group together with a nitrogen atom to which $R^1$ and $R^2$ are bonded. Examples of the cyclic amino group include a piperidino group, a morpholino group, a pyrrolidino group, a hexahydroazepino group, and a piperazino group.

$R^1$ and $R^2$ each independently preferably an alkyl group having 1 to 20 carbon atoms, more preferably an alkyl group having 1 to 10 carbon atoms, and still more preferably an alkyl group having 1 to 5 carbon atoms.

$R^3$ and $R^4$ represent an electron withdrawing group. $R^3$ and $R^4$ are preferably an acyl group, a carbamoyl group, an alkyloxycarbonyl group, an aryloxycarbonyl group, a cyano group, a nitro group, an alkylsulfonyl group, an arylsulfonyl group, a sulfonyloxy group, or a sulfamoyl group, and more preferably an acyl group, a carbamoyl group, an alkyloxycarbonyl group, an aryloxycarbonyl group, a cyano group, an alkylsulfonyl group, an arylsulfonyl group, a sulfonyloxy group, or a sulfamoyl group. In addition, $R^3$ and $R^4$ may be bonded to each other to form a cyclic electron withdrawing group. Examples of the cyclic electron withdrawing group formed by bonding $R^3$ and $R^4$ to each other include a 6-membered ring including two carbonyl groups.

At least one of $R^1$, $R^2$, $R^3$, or $R^4$ described above may be in a form of a polymer derived from a monomer bonded to a vinyl group through a linking group. A copolymer with other monomers may also be formed.

With regard to the substituent of the ultraviolet absorber represented by Formula (UV-1), the description of paragraphs 0320 to 0327 of JP2013-068814A can be referred to, the contents of which are incorporated herein by reference. Examples of a commercially available product of the ultraviolet absorber represented by Formula (UV-1) include UV503 (manufactured by Daito Chemical Co., Ltd.).

Examples of the benzotriazole compound include 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-isobutylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole, 2-(2'-hydroxy-3',5'-di-tert-butylphenyl)benzotriazole, 2-(2'-hydroxy-5'-methylphenyl)benzotriazole, 2-[2'-hydroxy-5'-(1,1,3,3-tetramethyl)phenyl]benzotriazole, 2-(2-hydroxy-5-tert-butylphenyl)-2H-benzotriazole, 3-(2H-benzotriazol-2-yl)-5-(1,1-dimethylethyl)-4-hydroxy, 2-(2H-benzotriazol-2-yl)-4,6-bis(1-methyl-1-phenylethyl)phenol, and 2-(2H-benzotriazol-2-yl)-6-(1-methyl-1-phenylethyl)-4-(1,1,3,3-tetramethylbutyl)phenol. Examples of a commercially available product thereof include TINUVIN PS, TINUVIN 99-2, TINUVIN 384-2, TINUVIN 900, TINUVIN 928, and TINUVIN 1130 (all of which are manufactured by BASF).

As the benzotriazole compound, MYUA series (manufactured by Miyoshi Oil&Fat Co., Ltd.; The Chemical Daily, Feb. 1, 2016) may be used.

Examples of the hydroxyphenyltriazine compound include mono(hydroxyphenyl)triazine compounds such as 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, and 2-(2,4-dihydroxyphenyl)-4,6-bis(2,4-dimethylphenyl)-1,3,5-triazine; bis(hydroxyphenyl)triazine compounds such as 2,4-bis(2-hydroxy-4-propyloxyphenyl)-6-(2,4-dimethylphenyl)-1,3,5-triazine, 2,4-bis(2-hydroxy-3-methyl-4-propyloxyphenyl)-6-(4-methylphenyl)-1,3,5-triazine, and 2,4-bis(2-hydroxy-3-methyl-4-hexyloxyphenyl)-6-(2,4-dimethylphenyl)-1,3,5-triazine; and tris(hydroxyphenyl)triazine compounds such as 2,4-bis(2-hydroxy-4-butoxyphenyl)-6-(2,4-dibutoxyphenyl)-1,3,5-triazine, 2,4,6-tris(2-hydroxy-4-octyloxyphenyl)-1,3,5-triazine, and 2,4,6-tris[2-hydroxy-4-(3-butoxy-2-hydroxypropyloxy)phenyl]-1,3,5-triazine.

In addition, a reaction product of 2-(4,6-bis(2,4-dimethylphenyl)-1,3,5-triazin-2-yl)-5-hydroxyphenyl and alkyloxymethyloxirane, a reaction product of 2-(2,4-dihydroxyphenyl)-4,6-bis-(2,4-dimethylphenyl)-1,3,5-triazine and (2-ethylhexyl)-glycidic acid ester, or the like can also be used. Examples of a commercially available product thereof include TINUVIN 400, TINUVIN 405, TINUVIN 460, TINUVIN 477, and TINUVIN 479 (all of which are manufactured by BASF).

A content of the ultraviolet absorber is preferably 0.01% to 10% by mass and more preferably 0.01% to 5% by mass with respect to the total solid content of the composition for forming a copper complex layer.

<<Other Components>>

The composition for forming a copper complex layer may further contain a dispersant, a sensitizer, a curing accelerator, a filler, a thermal curing accelerator, a thermal polymerization inhibitor, a plasticizer, an adhesion promoter, and other auxiliaries (for example, conductive particles, a filling agent, an anti-foaming agent, a flame retardant, a leveling agent, a peeling accelerator, an antioxidant, a fragrance, a surface tension adjuster, and a chain transfer agent). By appropriately containing these components, target properties such as stability of the near infrared light absorbing layer and film properties can be adjusted.

Details of these components can be found in the description of paragraphs 0101 to 0104, 0107 to 0109, and the like of JP2008-250074A, the content of which is incorporated herein by reference. In addition, examples of the antioxidant include a phenol compound, a phosphite compound, and a thioether compound. Among these, a phenol compound having a molecular weight of 500 or more, a phosphite compound having a molecular weight of 500 or more, or a thioether compound having a molecular weight of 500 or more is preferable. A mixture of two or more kinds of these compounds may be used.

As the phenol compound, any phenol compound known as a phenol-based antioxidant can be used. As the phenol compound, for example, a hindered phenol compound is preferable. In particular, a compound having a substituent at a position (ortho position) adjacent to a phenolic hydroxyl group is preferable. The above-described substituent is preferably a substituted or unsubstituted alkyl group having 1 to 22 carbon atoms, and more preferably a methyl group, an ethyl group, a propionyl group, an isopropionyl group, a butyl group, an isobutyl group, a t-butyl group, a pentyl group, an isopentyl group, a t-pentyl group, a hexyl group, an octyl group, an isooctyl group, or a 2-ethylhexyl group. In addition, a compound (antioxidant) having a phenol group and a phosphite group in the same molecule is also preferable.

In addition, as the antioxidant, a phosphorus-based antioxidant can also be suitably used. Examples of the phosphorus-based antioxidant include at least one compound selected from the group consisting of tris[2-[2,4,8,10-tetrakis(1,1-dimethylethyl)dibenzo[d,f][1,3,2]dioxaphosphepin-6-yl]oxy]ethyl]amine, tris[2-[(4,6,9,11-tetra-tert-butyldibenzo[d,f][1,3,2]dioxaphosphepin-2-yl)oxy]ethyl]amine, and ethyl bis(2,4-di-tert-butyl-6-methylphenyl) phosphite. These compounds are easily available as commercial products, and examples thereof of the antioxidant include ADK STAB AO-20, ADK STAB AO-30, ADK STAB AO-40, ADK STAB AO-50, ADK STAB AO-50F, ADK STAB AO-60, ADK STAB AO-60G, ADK STAB AO-80, and ADK STAB AO-330 (ADEKA Corporation).

A content of the antioxidant is preferably 0.01% to 20% by mass and more preferably 0.3% to 15% by mass with respect to the total solid content of the composition. As the antioxidant, one kind may be used alone, or two or more kinds may be used. In a case of two or more kinds thereof, the total amount thereof is preferably within the above-described range.

{Method for Preparing Near Infrared Light Absorbing Layer}

The near infrared light absorbing layer of the present invention may further contain a resin, a crosslinked product of a compound having a crosslinkable group, a catalyst, a heat stability imparting agent, a surfactant, or the like. Those operations are described in detail later.

Preferred aspects of the near infrared light absorbing layer of the present invention include the following aspects (1) to (4). In a case of the aspect (1), there is an advantage that only a single layer is required. In any of the following aspects, each layer may be laminated on a support. The support is not particularly limited as long as it is formed of a material having high transmittance of visible light. Examples thereof include glass, crystals, and resins. Examples of the glass include soda-lime glass, borosilicate glass, non-alkali glass, and quartz glass. Examples of the crystal include rock crystal, lithium niobate, and sapphire. Examples of the resin include polyester resins such as polyethylene terephthalate and polybutylene terephthalate, polyolefin resins such as polyethylene, polypropylene, and ethylene vinyl acetate copolymer, a norbornene resin, acrylic resins such as polyacrylate and polymethylmethacrylate, a urethane resin, a vinyl chloride resin, a fluororesin, a polycarbonate resin, a polyvinyl butyral resin, and a polyvinyl alcohol resin.

(1) near infrared light absorbing layer which includes a layer containing the copper complex and the ultraviolet absorber
(2) near infrared light absorbing layer which includes a copper complex layer and a layer containing the ultraviolet absorber
(3) near infrared light absorbing layer which includes a copper complex layer and a dielectric multi-layer film
(4) near infrared light absorbing layer which includes a copper complex layer, a layer containing the ultraviolet absorber, and a dielectric multi-layer film In the case of the aspect (1), a film thickness of the layer containing the copper complex and the ultraviolet absorber is preferably 10 to 500 μm and more preferably 50 to 300 μm. The layer containing the copper complex and the ultraviolet absorber may be formed on the support.

The near infrared light absorbing layer according to the above-described aspect (1) can be formed using a composition containing at least the copper complex and the ultraviolet absorber. The composition may further contain a resin, a compound having a crosslinkable group, a catalyst, a polymerization initiator, a heat stability imparting agent, a surfactant, or the like. Those operations are described in detail later.

The near infrared light absorbing layer according to the above-described aspect (1) can be manufactured, for example, through a step of applying the composition containing at least the copper complex and the ultraviolet absorber onto the support to form a film, a step of drying the film, and the like. In addition, a step of forming a pattern may be further performed.

As a method of applying the above-described composition in the step of forming a film, a known method can be used. Examples thereof include a dropping method (drop casting); a slit coating method; a spray method; a roll coating method; a spin coating method (spin coating); a cast coating method; a slit and spin method; a pre-wet method (for example, a method described in JP2009-145395A), various printing methods such as an ink jet (for example, on-demand type, piezo type, thermal type), a discharge printing such as nozzle jet, a flexo printing, a screen printing, a gravure printing, a reverse offset printing, and a metal mask printing method; a transfer method using molds and the like; and a nanoimprinting method. The ink jet application method is not particularly limited as long as it is a method capable of ejecting the composition, and for example, a method (in particular, pp. 115 to 133) described in "Extension of Use of Ink Jet—Infinite Possibilities in Patent—" (February 2005, S.B. Research Co., Ltd.) and methods described in JP2003-262716A, JP2003-185831A, JP2003-261827A, JP2012-126830A, and JP2006-169325A can be used.

In a case of the dropping method (drop casting), it is preferable that a drop region of the composition in which a photoresist is used as a partition wall is formed on the support such that a film having a predetermined uniform film thickness can be obtained. A desired film thickness can be obtained by adjusting the drop amount and concentration of solid contents of the composition and the area of the drop region. The thickness of the film after drying is not particularly limited and can be appropriately selected according to the purpose.

In the step of drying the film, drying conditions vary depending on the types, blend amounts, and the like of the respective components. For example, the drying is preferably performed at a temperature of 60 °C to 150 °C for 30 seconds to 15 minutes.

Examples of the step of forming a pattern include a pattern forming method using a photolithography method or a pattern forming method using a dry etching method. In the pattern forming method using a photolithography method, as a developer, an alkaline aqueous solution obtained by diluting an alkaline agent with pure water is preferably used. A concentration of the alkaline agent in the alkaline aqueous solution is preferably 0.001% to 10% by mass and more preferably 0.01% to 1% by mass. From the viewpoint of easiness of transport, storage, and the like, the developer may be obtained by temporarily preparing a concentrated solution and diluting the concentrated solution to a necessary concentration during use. The dilution ratio is not particularly limited, and can be set to, for example, a range of 1.5 to 100 times.

The method of manufacturing the near infrared light absorbing layer may include other steps. The other steps are not particularly limited and can be appropriately selected according to the purpose. Examples thereof include a surface treatment step of a base material, a pre-heating step (pre-baking step) of the film, a curing treatment step of the film, and a post-heating step (post-baking step) of the film.

A heating temperature in the pre-heating step and the post-heating step is preferably 80 °C to 200 °C. The upper limit thereof is preferably 150 °C or lower. The lower limit thereof is preferably 90 °C or higher. In addition, a heating time in the pre-heating step and the post-heating step is preferably 30 to 240 seconds. The upper limit thereof is preferably 180 seconds or less. The lower limit thereof is preferably 60 seconds or more.

The curing treatment step is a step of performing a curing treatment on the formed film as necessary, and by performing this treatment, a mechanical strength of the near infrared light absorbing layer is improved. The curing treatment step is not particularly limited, and can be appropriately selected according to the purpose. Suitable examples thereof include an exposure treatment and a heating treatment. Here, the "exposure" in the present invention is used in a meaning including not only irradiation with light having various wavelengths but also irradiation with radiation such as electron beams and X-rays.

The exposure is preferably performed by irradiation with radiation, and as the radiation which can be used during the exposure, ultraviolet rays such as electron beams, KrF, ArF, g-rays, h-rays, and i-rays, and/or visible light is particularly preferable. Examples of the exposure method include stepper exposure and exposure using a high-pressure mercury lamp. An exposure amount is preferably 5 to 3000 mJ/$cm^2$. The upper limit thereof is preferably 2000 mJ/$cm^2$ or less and more preferably 1000 mJ/$cm^2$ or less. The lower limit thereof is preferably 10 mJ/$cm^2$ or more and more preferably 50 mJ/$cm^2$ or more. Examples of the method of the exposure treatment include a method of exposing the entire surface of the formed film. An exposure device is not particularly limited and can be appropriately selected according to the purpose, and suitable examples thereof include an ultraviolet exposure device such as an ultra-high-pressure mercury lamp.

Examples of the method of the heating treatment include a method of heating the entire surface of the formed film. By the heating treatment, a film hardness of the pattern is increased. A heating temperature is preferably 100 °C to 260 °C. The lower limit thereof is preferably 120 °C or higher and more preferably 160 °C or higher. The upper limit thereof is preferably 240 °C or lower and more preferably 220 °C or lower. In a case where the heating temperature is within the above-described range, a film having excellent strength is easily obtained. A heating time is preferably 1 to 180 minutes. The lower limit thereof is preferably 3 minutes or more. The upper limit thereof is preferably 120 minutes or less. A heating device is not particularly limited and can be appropriately selected from known devices according to the purpose, and examples thereof include a dry oven, a hot plate, and an infrared heater.

In the above-described aspect (2), a film thickness of the copper complex layer is preferably 10 to 500 μm and more preferably 50 to 300 μm. In addition, a film thickness of the layer containing the ultraviolet absorber is preferably 1 to 200 μm and more preferably 1 to 100 μm.

In the above-described aspect (2), the copper complex layer may further contain the ultraviolet absorber. In the above-described aspect (2), the layer containing the ultraviolet absorber may be provided on only one surface of the copper complex layer, or may be provided on both surfaces of the copper complex layer. In addition, the layer containing the ultraviolet absorber may be formed on one surface of the support, and the copper complex layer may be formed on the other surface. Examples of the near infrared light absorbing layer of the above-described aspect (2) include the following aspects.

(2-1) copper complex layer/layer containing ultraviolet absorber (2-2) layer containing ultraviolet absorber/copper complex layer/layer containing ultraviolet absorber (2-3) support/copper complex layer/layer containing ultraviolet absorber (2-4) support/layer containing ultraviolet absorber/copper complex layer (2-5) support/layer containing ultraviolet absorber/copper complex layer/layer containing ultraviolet absorber (2-6) copper complex layer/support/layer containing ultraviolet absorber (2-7) layer containing ultraviolet absorber/support/layer containing ultraviolet absorber/copper complex layer (2-8) layer containing ultraviolet absorber/support/copper complex layer/layer containing ultraviolet absorber The near infrared light absorbing layer according to the above-described aspect (2) can be manufactured through a step of forming the layer containing the ultraviolet absorber and a step of forming the copper complex layer. The order of forming the layer containing the ultraviolet absorber and forming the copper complex layer is not particularly limited. The copper complex layer can be formed by the method described in the aspect (1) above. In addition, the layer containing the ultraviolet absorber can also be formed by the same method as the method of forming the copper complex layer, described in the aspect (1) above. In addition, in the near infrared light absorbing layer according to the above-described aspect (2), the copper complex layer can be formed using a composition containing at least the copper complex. In addition, the layer containing the ultraviolet absorber can be formed using a composition containing at least the ultraviolet absorber. These compositions may further contain a resin, a compound having a crosslinkable group, a catalyst, a polymerization initiator, a heat stability imparting agent, a surfactant, or the like. Those operations are described in detail later.

In the above-described aspect (3), a film thickness of the copper complex layer is preferably 10 to 500 μm and more preferably 50 to 300 μm. In addition, a film thickness of the dielectric multi-layer film is preferably 0.5 to 10 μm and more preferably 1 to 5 μm. In the above-described aspect (3), the copper complex layer may further contain the ultraviolet absorber.

In the above-described aspect (3), the dielectric multi-layer film may be provided on only one surface of the copper complex layer, or may be provided on both surfaces of the copper complex layer. In addition, the dielectric multi-layer film may be formed on one surface of the support, and the copper complex layer may be formed on the other surface. Examples of the near infrared light absorbing layer of the above-described aspect (3) include the following aspects.

(3-1) copper complex layer/dielectric multi-layer film (3-2) dielectric multi-layer film/copper complex layer/dielectric multi-layer film (3-3) support/copper complex layer/dielectric multi-layer film (3-4) support/dielectric multi-layer film/copper complex layer (3-5) support/dielectric multi-layer film/copper complex layer/dielectric multi-layer film (3-6) copper complex layer/support/dielectric multi-layer film (3-7) dielectric multi-layer film/support/dielectric multi-layer film/copper complex layer (3-8) dielectric multi-layer film/support/copper complex layer/dielectric multi-layer film The near infrared light absorbing layer according to the above-described aspect (3) can be manufactured through a step of forming the dielectric multi-layer film and a step of forming the copper complex layer. The order of forming the dielectric multi-layer film and forming the copper complex layer is not particularly limited. The copper complex layer can be formed by the method described in the aspect (1) above. In addition, in the near infrared light absorbing layer according to the above-described aspect (3), the copper complex layer can be formed using a composition containing at least the copper complex. In addition, the dielectric multi-layer film can be formed by the above-described method.

In the above-described aspect (4), a film thickness of the copper complex layer is preferably 10 to 500 μm and more preferably 50 to 300 μm. In addition, a film thickness of the layer containing the ultraviolet absorber is preferably 1 to 200 μm and more preferably 1 to 100 μm. In addition, a film thickness of the dielectric multi-layer film is preferably 0.5 to 10 μm and more preferably 1 to 5 μm. In the above-described aspect (4), the copper complex layer may further contain the ultraviolet absorber.

In the above-described aspect (4), the order of laminating the copper complex layer, the layer containing the ultraviolet absorber, and the dielectric multi-layer film is not particularly limited.

(4-1) copper complex layer/layer containing ultraviolet absorber/dielectric multi-layer film (4-2) copper complex layer/dielectric multi-layer film/layer containing ultraviolet absorber (4-3) dielectric multi-layer film/copper complex layer/layer containing ultraviolet absorber (4-4) support/copper complex layer/layer containing ultraviolet absorber/dielectric multi-layer film (4-5) support/copper complex layer/dielectric multi-layer film/layer containing ultraviolet absorber (4-6) support/dielectric multi-layer film/copper complex layer/layer containing ultraviolet absorber (4-7) support/dielectric multi-layer film/layer containing ultraviolet absorber/copper complex layer (4-8) support/layer containing ultraviolet absorber/copper complex layer/dielectric multi-layer film (4-9) support/layer containing ultraviolet absorber/dielectric multi-layer film/copper complex layer (4-10) copper complex layer/support/layer containing ultraviolet absorber/dielectric multi-layer film (4-11) copper complex layer/support/dielectric multi-layer film/layer containing ultraviolet absorber (4-12) dielectric multi-layer film/support/copper complex layer/layer containing ultraviolet absorber (4-13) dielectric multi-layer film/support/layer containing ultraviolet absorber/copper complex layer (4-14) layer containing ultraviolet absorber/support/copper complex layer/dielectric multi-layer film (4-15) layer containing ultraviolet absorber/support/dielectric multi-layer film/copper complex layer (4-16) dielectric multi-layer film/support/dielectric multi-layer film/copper complex layer/layer containing ultraviolet absorber (4-17) dielectric multi-layer film/support/copper complex layer/dielectric multi-layer film/layer containing ultraviolet absorber The near infrared light absorbing layer of the above-described aspect (4) can be manufactured through a step of forming the layer containing the ultraviolet absorber, the step of forming the dielectric multi-layer film, and the step of forming the copper complex layer. The order of forming the respective layers is not particularly limited. The copper complex layer can be formed by the method described in the aspect (1) above. In addition, the layer containing the ultraviolet absorber can be formed by the same method as the method of forming the copper complex layer, described in the aspect (1) above. In addition, the dielectric multi-layer film can be formed by the above-described method. In addition, in the near infrared light absorbing layer according to the above-described aspect (4), the copper complex layer can be formed using a composition containing at least the copper complex. In addition, the layer containing the ultraviolet absorber can be formed using a composition containing at least the ultraviolet absorber.

A viscosity of the composition for forming a copper complex layer is preferably 1 to 3000 mPa·s in a case of forming the near infrared light absorbing layer by coating. The lower limit thereof is preferably 10 mPa·s or more and more preferably 100 mPa·s or more. The upper limit thereof is preferably 2000 mPa·s or less and more preferably 1500 mPa·s or less.

A content of metals other than the copper in the composition for forming a copper complex layer is preferably 10% by mass or less, more preferably 5% by mass or less, and still more preferably 2% by mass or less with respect to the solid content of the copper complex. According to this aspect, a film in which foreign matter defects are suppressed is easily formed. In addition, a lithium content in the composition for forming a copper complex layer is preferably 100 ppm by mass or less. In addition, a potassium content in the composition for forming a copper complex layer is preferably 30 ppm by mass or less. The content of the metals other than the copper in the composition for forming a copper complex layer can be measured by inductively coupled plasma optical emission spectroscopy.

A content of water in the composition for forming a copper complex layer is preferably 5% by mass or less, more preferably 3% by mass or less, and still more preferably 1% by mass or less with respect to the solid content of the copper complex.

The total content of a free halogen anion and a halogen compound in the composition for forming a copper complex layer is preferably 5% by mass or less, more preferably 3% by mass or less, and still more preferably 1% by mass or less with respect to the total solid content of the copper complex.

A residual ratio of the copper component which is a raw material of the copper complex in the composition for forming a copper complex layer (content of the copper component which is not coordinated with a ligand) is preferably 10% by mass or less, more preferably 5% by mass or less, and even more preferably 2% by mass or less with respect to the solid content of the copper complex. In addition, a residual ratio of the ligand which is a raw material of the copper complex in the composition for forming a copper complex layer (content of the ligand which is not coordinated with copper) is preferably 10% by mass or less, more preferably 5% by mass or less, and even more preferably 2% by mass or less with respect to the solid content of the copper complex.

<Method for Preparing Composition>

The above-described composition can be prepared by mixing the respective components. In a case of producing the composition, it is preferable to use a kettle having an interior wall coated with a metal. In a case of producing the composition, the respective components constituting the composition may be blended with each other collectively, or the respective components may be dissolved and/or dispersed in a solvent and then sequentially blended with each other. In addition, the order of addition and working conditions at the time of blending are not particularly limited, but from the viewpoint of ensuring stirring property, it is preferable to add a high-viscosity component at the end. In addition, the preparation of the composition is preferably carried out in a closed system to prevent volatilization. In addition, the composition is preferably prepared in an atmosphere of dried air or nitrogen gas (preferably nitrogen gas).

In addition, in a case where the composition contains particles of a pigment or the like, it is preferable to include a process for dispersing the particles. In the process for dispersing the particles, examples of mechanical forces used to disperse the particles include compression, squeezing, impact, shear, and cavitation. Specific examples of these processes include a beads mill, a sand mill, a roll mill, a ball mill, a paint shaker, a microfluidizer, a high-speed impeller, a sand grinder, a flow jet mixer, high-pressure wet atomization, and ultrasonic dispersion. In addition, in the pulverization of the particles in a sand mill (beads mill), it is preferable to perform a treatment under the condition for increasing a pulverization efficiency by using beads having small diameters; increasing the filling rate of the beads; or the like. In addition, it is preferable to remove coarse particles by filtration, centrifugation, or the like after the pulverization treatment. In addition, as the process and the disperser for dispersing the particles, a process and a disperser described in "Complete Works of Dispersion Technology, Johokiko Co., Ltd., Jul. 15, 2005", "Dispersion Technique focusing on Suspension (Solid/Liquid Dispersion) and Practical Industrial Application, Comprehensive Reference List, Publishing Department of Management Development Center, Oct. 10, 1978", and paragraph 0022 of JP2015-157893A can be suitably used. In addition, in the process for dispersing the particles, a refining treatment of particles in a salt milling step may be performed. A material, a device, process conditions, and the like used in the salt milling step can be found in, for example, JP2015-194521A and JP2012-046629A.

In a case of producing the composition, it is preferable to use a kettle having an interior wall coated with a metal. In addition, the order of addition at the time of preparing the composition is appropriately set, but from the viewpoint of securing stirring property, it is preferable to add a high-viscosity component at the end. In addition, the preparation of the composition is preferably carried out in a closed system to prevent volatilization. In addition, the composition is preferably prepared in an atmosphere of dried air or nitrogen gas (preferably nitrogen gas).

In the present invention, it is preferable that the composition is filtered through a filter, for example, in order to remove foreign matter or to reduce defects. As the filter, any filters that have been used in the related art for filtration use and the like may be used without particular limitation. Examples of the filter include filters formed of materials including, for example, a fluororesin such as polytetrafluoroethylene (PTFE), a polyamide-based resin such as nylon (for example, nylon-6 and nylon-6,6), and a polyolefin resin (including a polyolefin resin having a high-density or an ultrahigh molecular weight) such as polyethylene and polypropylene (PP). Among these materials, polypropylene (including a high-density polypropylene) and nylon are preferable.

A pore diameter of the filter is suitably approximately 0.01 to 7.0 μm, preferably approximately 0.01 to 3.0 μm and more preferably approximately 0.05 to 0.5 μm. By setting the pore diameter of the filter to the above-described range, fine foreign matters can be reliably removed. A thickness of the filter is preferably 25.4 mm or more and more preferably 50.8 mm or more. In addition, it is also preferable to use a fibrous filter medium, examples of the filter medium include polypropylene fiber, nylon fiber, and glass fiber, and specifically, filter cartridges of SBP type series (SBP008 and the like), TPR type series (TPR002, TPR005, and the like), or SHPX type series (SHPX003 and the like), all manufactured by Roki Techno Co., Ltd., can be used.

In a case of using a filter, different filters may be combined. In this case, filtering with a first filter may be performed only once, or may be performed twice or more times.

In addition, first filters having different pore diameters within the above-described range may be combined. Here, the pore diameter of the filter can refer to a nominal value of a manufacturer of the filter. A commercially available filter can be selected from, for example, various filters provided by Nihon Pall Corporation, Advantec Toyo Kaisya, Ltd., Nihon Entegris K. K. (formerly Nippon Microlith Co., Ltd.), Kitz Micro Filter Corporation, and the like.

As the second filter, a filter formed of the same material as that of the first filter, or the like can be used. A pore diameter of the second filter is preferably 0.2 to 10.0 μm, more preferably 0.2 to 7.0 μm, and still more preferably 0.3 to 6.0 μm.

In a case where a storage container is filled with the composition, a filling rate of the composition in the storage container is preferably 70% to 100% for the purpose of avoiding contact between the composition and moisture in the storage container. In addition, it is also preferable to use dry air or dry nitrogen in the space in the storage container.

The storage container for the composition is not particularly limited, and a known storage container can be used.

For example, a container formed of various resins such as polypropylene can be used. In addition, as the storage container, it is also preferable to use a multilayer bottle having an interior wall constituted with 6 layers from 6 kinds of resins or a bottle having a 7-layer structure from 6 kinds of resins for the purpose of suppressing infiltration of impurities into raw materials or compositions. Examples of such a container include containers described in JP2015-123351A.

In addition, in a case where the composition contains a resin including a repeating unit having a crosslinkable group, it is also preferable that the composition is stored at a low temperature (preferably 25 °C or lower and more preferably 0 °C or lower). According to this aspect, thickening of the composition can be suppressed.

{Visible Light-Transmitting Property}

In the present invention, a visible light transmittance of the near infrared light absorbing layer is preferably 60% or more, more preferably 80% or more, and still more preferably 95% or more. It is preferable that the visible light transmittance of the near infrared light absorbing layer is 60% or more from the viewpoint of visible light-transmitting property or image visibility in a case of being formed into a laminate.

The visible light transmittance of the near infrared light absorbing layer may be measured by the same method as the method of measuring the visible light transmittance of the laminate described above.

{Transmittance Wavelength Dependency}

In the present invention, from the viewpoint of tint, in a case where transmittances of the near infrared light absorbing layer at wavelengths of 400, 550, and 700 nm are respectively represented by T(400), T(550), and T(700) [%], a value of T(400)/T(550) and a value of T(700)/T(550) are respectively preferably 0.6 to 1.2, more preferably 0.8 to 1.1, and still more preferably 0.9 to 1.

The method of measuring the transmittance at each wavelength is the same as the method of measuring the visible light transmittance described above, except that the wavelength of light used for the measurement is different.

{Haze}

In the present invention, from the viewpoint of visible light-transmitting property or image visibility in a case of being formed into a laminate, a haze value of the near infrared light absorbing layer is preferably less than 1%, more preferably less than 0.8%, and still more preferably less than 0.5%.

The haze may be measured using a haze meter NDH2000 (manufactured by NIPPON DENSHOKU INDUSTRIES Co., Ltd.).

{Near Infrared Light Shielding Property}

In the present invention, from the viewpoint of preventing near infrared light from being noise, an absorbance of the near infrared light absorbing layer to the near infrared light is preferably more than 0.4, more preferably more than 0.7, and still more preferably more than 1.

The absorbance to the near infrared light can be obtained from an expression of absorbance $Abs=-\log(I_1/I_0)$ in which a laser beam with a wavelength of 980 nm is incident on the near infrared light absorbing layer, and an intensity $I_1$ of transmitted laser beam and an intensity $I_0$ of laser beam before incidence are measured using a laser power meter LP-1 (manufactured by Sanwa Electric Instrument Co., Ltd.).

[Near Infrared Light Reflecting Layer]

The near infrared light reflecting layer is a layer having reflectivity with respect to a near infrared light band. Examples of such a near infrared light reflecting layer include a cholesteric liquid crystal layer in which cholesteric liquid crystals are immobilized, a dielectric multi-layer film in which a high refractive index material layer and a low refractive index material layer are alternately laminated, an aluminum deposited film, a noble metal thin film, and a resin layer in which metal oxide fine particles containing indium oxide as a main component and a small amount of tin oxide are dispersed.

Since the film thickness can be reduced and a reflection angle and reflection wavelength of reflected light can be easily controlled, the near infrared light reflecting layer is preferably a cholesteric liquid crystal layer.

{Cholesteric Liquid Crystal Layer (Normal Alignment)}

The cholesteric liquid crystal layer functions as a circularly polarized light selective reflection layer which selectively reflects any one of dextrorotatory circularly polarized light or levorotatory circularly polarized light and transmits circularly polarized light of the other sense in a selective reflection band (selective reflection wavelength region). That is, the sense of circularly polarized light to be reflected is left in a case where the sense of circularly polarized light to be transmitted is right, and the sense of circularly polarized light to be reflected is right in a case where the sense of circularly polarized light to be transmitted is left.

Many films formed from a composition containing a polymerizable liquid crystal compound have been known in the related art as a film exhibiting circularly polarized light selective reflectivity, and for the cholesteric liquid crystal layer, techniques of the related art can be referred to.

The cholesteric liquid crystal layer may be a layer in which the alignment of the liquid crystal compound as a cholesteric liquid crystalline phase is immobilized. Typically, the cholesteric liquid crystal layer may be a layer which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field and/or an external force. In the cholesteric liquid crystal layer, it is sufficient that optical properties of the cholesteric liquid crystalline phase are maintained in the layer, and the liquid crystalline compound in the layer may not exhibit liquid crystal properties anymore. For example, the polymerizable liquid crystal compound may have a high molecular weight by a curing reaction and no longer have liquid crystal properties.

The cholesteric liquid crystal layer exhibits circularly polarized light reflection derived from a helical structure of the cholesteric liquid crystal. In the present specification, the circularly polarized light reflection is referred to as selective reflection. The sense of the reflected circularly polarized light of the cholesteric liquid crystal layer coincides with a helical twisting direction. The helical twisting direction of each cholesteric liquid crystal layer in the selective reflection layer is either right or left.

A central wavelength λ of the selective reflection depends on a pitch length P (=helical period) of the helical structure in the cholesteric phase, and satisfies a relationship of $\lambda=n\times P$ with an average refractive index n of the cholesteric liquid crystal layer. In the present specification, the central wavelength λ of the selective reflection of the cholesteric liquid crystal layer means a wavelength at the centroid position of the reflection peak of a circularly polarized light reflection spectrum measured from the normal direction of the cholesteric liquid crystal layer. As can be seen from the above expression, the central wavelength of the selective reflection can be adjusted by controlling the pitch length of the helical structure. That is, for example, in order to selectively reflect either the dextrorotatory circularly polarized light or the levorotatory circularly polarized light by adjusting the n value and the P value, it is possible to adjust the central wavelength λ so that the apparent central wavelength of the selective reflection is in a wavelength range of near infrared light.

The apparent central wavelength of the selective reflection is a wavelength at the centroid position of the reflection peak of a circularly polarized light reflection spectrum of the cholesteric liquid crystal layer, in which the circularly polarized light reflection spectrum is measured from the observation direction in practical use. The pitch length of the cholesteric liquid crystalline phase depends on the type of chiral agents used together with the polymerizable liquid crystal compound and the addition concentration thereof, and thus, a desired pitch length can be obtained by adjusting these. Regarding the adjustment of the pitch, detailed description can be found in FUJIFILM Research Report No. 50 (2005), pp. 60 to 63. Regarding a method for measuring the helical sense and the pitch of the helix, it is possible to use the method described on page 46 of "Liquid Crystal Chemical Experiment Introduction" edited by Japan Liquid Crystal Society, published by Sigma Corporation in 2007, and page 196 of "Liquid Crystal Handbook" Liquid Crystal Handbook Editing Committee, Maruzen Publishing Co., Ltd.

In the present specification, the selective reflection central wavelength (for example, selective reflection central wavelength of the reflective layer and selective reflection central wavelength of the cholesteric liquid crystal layer) refers to an average value of two wavelengths indicating T½(%): a half-value transmittance expressed by the following expression, in a case where the minimum value of the transmittance of a target object (a member) is defined as Tmin (%).

Expression for obtaining half-value transmittance:

$$T½=100-(100-Tmin)/2$$

In the selective reflection layer, the half-width of each cholesteric liquid crystal layer in the selective reflection band is not particularly limited, but may be 1 nm, 10 nm, 50 nm, 100 nm, 150 nm, 200 nm, or the like. In a half-width $\Delta\lambda$(nm) in the selective reflection band indicating the circularly polarized light selective reflection, $\Delta\lambda$ depends on a birefringence $\Delta n$ of the liquid crystal compound and the above-described pitch length P, and satisfies a relationship of $\Delta\lambda=\Delta n\times P$. Therefore, the width in the selective reflection band can be controlled by adjusting $\Delta n$. $\Delta n$ can be adjusted by adjusting the type of the polymerizable liquid crystal compound and/or the mixing ratio thereof or controlling the temperature at the time of fixing the alignment. In order to form one type of cholesteric liquid crystal layer having the same selective reflection central wavelength, a plurality of cholesteric liquid crystal layers having the same period P and the same helical sense may be laminated. By lamination of the cholesteric liquid crystal layers having the same period P and the same helical sense, the circular polarization selectivity at a specific wavelength can be increased.

{Method of Producing Selective Reflection Layer}

In a case where the selective reflection layer includes a plurality of cholesteric liquid crystal layers, the cholesteric liquid crystal layers may be laminated by laminating separately produced cholesteric liquid crystal layers using an adhesive or the like, or a liquid crystal composition containing a polymerizable liquid crystal compound or the like may be directly applied to a surface of a cholesteric liquid crystal layer previously formed by a method described later, and steps of alignment and fixation may be repeated.

<Production Method of Layer in which Cholesteric Liquid Crystalline Phase is Immobilized>

Hereinafter, production materials and a producing method of the cholesteric liquid crystal layer will be described.

Examples of the material used for forming the above-described cholesteric liquid crystal layer include a liquid crystal composition containing a polymerizable liquid crystal compound and a chiral agent (optically active compound). The cholesteric liquid crystal layer can be formed by applying the above-described liquid crystal composition, which has been mixed with a surfactant, a polymerization initiator, or the like as necessary and dissolved in a solvent or the like, on a base material (a support, an alignment film, a cholesteric liquid crystal layer as an underlayer, or the like), aging cholesteric alignment, and then fixing the cholesteric alignment.

{Polymerizable Liquid Crystal Compound}

The polymerizable liquid crystal compound may be a rod-like liquid crystal compound or a disk-like liquid crystal compound, but a rod-like liquid crystal compound is preferable.

Examples of the rod-like polymerizable liquid crystal compound forming the cholesteric liquid crystal layer include a rod-like nematic liquid crystal compound. As the rod-like nematic liquid crystal compound, azomethines, azoxys, cyanobiphenyls, cyanophenyl esters, benzoic acid esters, cyclohexane carboxylic acid phenyl esters, cyanophenylcyclohexanes, cyano-substituted phenylpyrimidines, alkoxy-substituted phenylpyrimidines, phenyldioxanes, tolans, or alkenylcyclohexylbenzonitriles are preferably used. High-molecular-weight liquid crystal compounds can also be used as well as low-molecular-weight liquid crystal compounds.

The polymerizable liquid crystal compound is obtained by introducing a polymerizable group into the liquid crystal compound. Examples of the polymerizable group include an unsaturated polymerizable group, an epoxy group, and an aziridinyl group, and an unsaturated polymerizable group is preferable and an ethylenically unsaturated polymerizable group is more preferable. The polymerizable group can be introduced into the molecule of the liquid crystal compound by various methods. The number of polymerizable groups in the polymerizable liquid crystal compound is preferably 1 to 6 and more preferably 1 to 3. Examples of the polymerizable liquid crystal compound include compounds described in Makromol. Chem., Vol. 190, p. 2255 (1989), Advanced Materials Vol. 5, p. 107 (1993), U.S. Pat. Nos. 4,683,327A, 5,622,648A, 5,770,107A, WO95/22586A, WO95/024455A, WO97/000600A, WO98/023580A, WO98/052905A, JP1989-272551A (JP-H1-272551A), JP 1994-016616A (JP-H6-016616A), JP1995-110469A (JP-H7-110469A), JP1999-80081A (JP-H11-80081A), and JP2001-328973A. Two or more kinds of polymerizable liquid crystal compounds may be used in combination. In a case where two or more kinds of polymerizable liquid crystal compounds are used in combination, an alignment temperature can be decreased.

In addition, an addition amount of the polymerizable liquid crystal compound in the liquid crystal composition is preferably 80% to 99.9% by mass, more preferably 85% to 99.5% by mass, and still more preferably 90% to 99% by mass with respect to the solid content mass (mass excluding a solvent) of the liquid crystal composition.

Chiral Agent (Optically Active Compound)

The chiral agent has a function of inducing the helical structure of the cholesteric liquid crystalline phase. The chiral compound may be selected according to the purpose since the helical sense or the helical pitch of the induced helix varies depending on the compound.

The chiral agent is not particularly limited, and known compounds (for example, described in the Liquid Crystal Device Handbook, chapter 3, section 4-3, chiral agents for TN and STN, page 199, Japan Society for the Promotion of Science, Committee 142, 1989), and isosorbide and isomannide derivatives can be used.

The chiral agent generally includes an asymmetric carbon atom, but an axially chiral compound or a planar chiral compound including no asymmetric carbon atom can also be used as the chiral agent. Examples of the axially chiral compound or the planar chiral compound include binaphthyl, helicene, paracyclophane, and derivatives thereof. The chiral agent may also have a polymerizable group. In a case where both the chiral agent and the liquid crystal compound have a polymerizable group, a polymer having a repeating unit induced from the polymerizable liquid crystal compound and a repeating unit induced from the chiral agent can be formed by a polymerization reaction between the polymerizable chiral agent and the polymerizable liquid crystal compound. In this aspect, the polymerizable group in the polymerizable chiral agent is preferably the same group as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent has a photoisomerization group, a pattern having a desired reflection wavelength corresponding to a luminescence wavelength can be formed by irradiation with actinic ray or the like through a photo mask after coating and alignment, which is preferable. As the photoisomerization group, an isomerization site of a compound exhibiting photochromic properties, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

A content of the chiral agent in the liquid crystal composition is preferably 0.01% to 200% by mole and more preferably 1% to 30% by mole with respect to an amount of the polymerizable liquid crystal compound.

{Polymerization Initiator}

It is preferable that the liquid crystal composition contains a polymerization initiator. In the aspect in which the polymerization reaction is caused to proceed by ultraviolet irradiation, the polymerization initiator to be used is preferably a photopolymerization initiator capable of initiating the polymerization reaction by ultraviolet irradiation. Examples of the photopolymerization initiator include an α-carbonyl compound (described in U.S. Pat. No. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

A content of the photopolymerization initiator in the liquid crystal composition is preferably 0.1% to 20% by mass and more preferably 0.5% to 5% by mass with respect to the content of the polymerizable liquid crystal compound.

{Crosslinking Agent}

The liquid crystal composition may optionally contain a crosslinking agent in order to improve film hardness after curing and to improve durability. As the crosslinking agent, a material which is cured by ultraviolet light, heat, humidity, or the like can be suitably used.

The crosslinking agent is not particularly limited and can be appropriately selected according to the purpose, and examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl) propionate] and 4,4-bis(ethyleneiminocarbonylamino)diphenylmethane; isocyanate compounds such as hexamethylene diisocyanate and biuret-type isocyanate; polyoxazoline compounds having an oxazoline group in the side chain; and alkoxysilane compounds such as vinyltrimethoxysilane and N-(2-aminoethyl) 3-aminopropyltrimethoxysilane. In addition, a known catalyst can be used depending on reactivity of the crosslinking agent, and in addition to improving the film hardness and durability, productivity can be improved. Among these, one kind may be used alone, or two or more kinds may be used in combination.

A content of the crosslinking agent is preferably 3% to 20% by mass and more preferably 5% to 15% by mass with respect to the total mass of the polymerizable liquid crystal compound.

{Alignment Control Agent}

An alignment control agent which contributes to stably or rapidly forming a cholesteric liquid crystal layer having planar alignment may be added to the liquid crystal composition. Examples of the alignment control agent include fluorine (meth)acrylate polymers described in paragraphs [0018] to [0043] of JP2007-272185A, and compounds represented by Formulae (I) to (IV) described in paragraphs [0031] to [0034] of JP2012-203237A.

As the alignment control agent, one kind may be used alone, or two or more kinds may be used in combination.

An addition amount of the alignment control agent in the liquid crystal composition is preferably 0.01% to 10% by mass, more preferably 0.01% to 5% by mass, and still more preferably 0.02% to 1% by mass with respect to the total mass of the polymerizable liquid crystal compound.

{Other Additives}

In addition, the liquid crystal composition may contain at least one selected from various additives such as a surfactant for adjusting surface tension of the coating film to make a film thickness uniform, and a polymerizable monomer. In addition, as necessary, a polymerization inhibitor, an antioxidant, an ultraviolet absorber, a light stabilizer, a coloring material, metal oxide fine particles, and the like can be further added to the liquid crystal composition as long as the optical performance is not degraded.

Regarding the cholesteric liquid crystal layer, a cholesteric liquid crystal layer having fixed cholesteric regularity can be formed by applying a liquid crystal composition, which is obtained by dissolving a polymerizable liquid crystal compound, a polymerization initiator, and as necessary, a chiral agent, a surfactant, or the like in a solvent, onto a support, an alignment layer, or a cholesteric liquid crystal layer which is produced in advance, drying the liquid crystal composition to obtain a coating film, and irradiating the coating film with actinic ray to polymerize the cholesteric liquid crystalline composition. A laminated film composed of a plurality of cholesteric liquid crystal layers can be formed by repeating the manufacturing process of the cholesteric liquid crystal layer.

The solvent used for preparing the liquid crystal composition is not particularly limited and can be appropriately selected according to the purpose, but an organic solvent is preferably used.

The organic solvent is not particularly limited and can be appropriately selected depending on the purpose, and examples thereof include ketones, alkyl halides, amides, sulfoxides, heterocyclic compounds, hydrocarbons, esters, and ethers. Among these, one kind may be used alone, or two or more kinds may be used in combination. Among these, a ketone is particularly preferable in consideration of an environmental burden.

A method of applying the liquid crystal composition onto the base material is not particularly limited and can be appropriately selected according to the purpose, and examples thereof include a wire bar coating method, a curtain coating method, an extrusion coating method, a direct gravure coating method, a reverse gravure coating method, a die coating method, a spin coating method, a dip coating method, a spray coating method, and a slide coating method. In addition, the method can be performed by transferring the liquid crystal composition which has been separately applied onto a support onto the base material. By heating the applied liquid crystal composition, liquid crystal molecules are aligned. A heating temperature is preferably 200 °C or lower and more preferably 130 °C or lower. By the alignment treatment, an optical thin film in which the polymerizable liquid crystal compound is twist-aligned so as to have a helical axis in a direction substantially perpendicular to a film surface is obtained.

The aligned liquid crystal compound may be further polymerized. The polymerization may be either thermal polymerization or photopolymerization by light irradiation, but photopolymerization is preferable. It is preferable to use ultraviolet rays for the light irradiation. An irradiation energy is preferably 20 $mJ/cm^2$ to 50 $J/cm^2$ and more preferably 100 $mJ/cm^2$ to 1,500 $mJ/cm^2$. In order to promote the photopolymerization reaction, the light irradiation may be performed under heating conditions or in a nitrogen atmosphere. An irradiation ultraviolet light wavelength is preferably 350 to 430 nm. From the viewpoint of stability, a polymerization reaction rate is preferably high, preferably 70% or more and more preferably 80% or more. The polymerization reaction rate can be determined by a consumption proportion of polymerizable functional groups using an IR absorption spectrum.

{Support}

The support is not particularly limited. The support used for forming the cholesteric liquid crystal layer may be a temporary support which is peeled off after the cholesteric liquid crystal layer is formed. In a case where the support is a temporary support, since the support is not a layer constituting the reflective member, there is no particular limitation regarding optical characteristics such as transparency and refractive property. As the support (temporary support), glass or the like may be used in addition to a plastic film. Examples of a material contained in the plastic film include polyester such as polyethylene terephthalate (PET), polycarbonate, an acrylic resin, an epoxy resin, polyurethane, polyamide, polyolefin, a cellulose derivative, and silicone.

A film thickness of the support may be approximately 5 to 1000 μm, preferably 10 to 250 μm and more preferably 15 to 90 μm.

{Alignment Film}

The alignment film can be provided by means such as rubbing treatment of an organic compound or a polymer (a resin such as polyimide, polyvinyl alcohol, polyester, polyarylate, polyamidoimide, polyetherimide, polyamide, and modified polyamide), oblique vapor deposition of an inorganic compound, formation of a layer having microgrooves, or accumulation of compounds organic (for example, ω-tricosanoic acid, dioctadecylmethylammonium chloride, or methyl stearate) by Langmuir-Blodgett method (LB film). Furthermore, an alignment film in which an alignment function is generated by application of an electric field, application of a magnetic field, or light irradiation has been also known.

Particularly, it is preferable that an alignment film formed of a polymer is subjected to the rubbing treatment and the composition for forming the liquid crystal layer is applied onto the surface subjected to the rubbing treatment. The rubbing treatment can be performed by rubbing the surface of the polymer layer with paper or cloth several times in a certain direction.

The liquid crystal composition may be applied onto the surface of the support or the rubbed surface of the support without providing the alignment film.

In a case where the support is a temporary support, the alignment film is preferably peeled off together with the temporary support.

A thickness of the alignment layer is preferably 0.01 to 5 μm and more preferably 0.05 to 2 μm.

In the case where the light to be reflected is unpolarized light, since reflectivity can be increased, it is preferable to laminate a layer in which the helical direction of the cholesteric liquid crystal layer is left-handed and a layer in which the helical direction is right-handed. As the laminating method, a known method used for laminating a sheet-like material in an optical device, an optical element, or the like can be used, but in a case where a thickness of a bonding layer increases, unevenness of the reflective layer increases, which causes an increase in noise of reflected light, and thus it is preferable to laminate the layers such that the thickness of the bonding layer is as small as possible. Examples of the bonding method capable of thinning the bonding layer include a method using a UV adhesive and a method by plasma treatment, which will be described later.

{Cholesteric Liquid Crystal Layer (Tilt Alignment)}

As the near infrared light reflecting layer of the present invention, a cholesteric liquid crystal layer which is tilted and aligned with respect to a planar direction, described in JP2020-160404A, can also be used. Since the cholesteric liquid crystal layer of the normal alignment described above is mirror-reflective, the incident light angle and the reflected light angle are the same. However, the reflection angle can be adjusted by adjusting the inclined angle of the cholesteric liquid crystal, and a degree of freedom in arrangement of a near infrared light source and a near infrared light detector in the visual-line tracking system described later can be increased.

{Cholesteric Liquid Crystal Layer (Flapping Alignment)}

As the near infrared light reflecting layer of the present invention, a cholesteric liquid crystal layer which is flapped and aligned with respect to a planar direction, described in JP2018-087876A, can also be used. Although the cholesteric liquid crystal layer of the normal alignment described above is mirror-reflective, the cholesteric liquid crystal layer can have diffuse reflectivity by the flapping alignment, and a degree of freedom in arrangement of a near infrared light source and a near infrared light detector in the visual-line tracking system described later can be increased.

{Reflective Type Liquid Crystal Diffraction Element}

As the near infrared light reflecting layer of the present invention, a reflective type liquid crystal diffraction element described in WO2020/066429A can also be used. Since the cholesteric liquid crystal layer of the normal alignment described above is mirror-reflective, the incident light angle and the reflected light angle are the same. However, the reflective type liquid crystal diffraction element can adjust the reflection angle by adjusting the periodic structure pitch, and a degree of freedom in arrangement of a near infrared light source and a near infrared light detector in the visual-line tracking system described later can be increased.

{Dielectric Multi-Layer Film}

In the present invention, a dielectric multi-layer film can also be used as the near infrared light reflecting layer. As a material constituting the high refractive index material layer of the dielectric multi-layer film, a material having a refractive index of 1.7 or more can be used, and a material having a refractive index in a range of 1.7 to 2.5 is usually selected. Examples of such a material include materials containing titanium oxide, zirconium oxide, tantalum pentoxide, niobium pentoxide, lanthanum oxide, yttrium oxide, zinc oxide, zinc sulfide, indium oxide, or the like as a main component and containing a small amount of titanium oxide, tin oxide, and/or cerium oxide (for example, 0% to 10% with respect to the main component).

As a material constituting the low refractive index material layer, a material having a refractive index of less than 1.7 can be used, and a material having a refractive index in a range of 1.2 or more and less than 1.7 is usually selected. Examples of such a material include silica, alumina, lanthanum fluoride, magnesium fluoride, and sodium aluminum hexafluoride.

A method of laminating the high refractive index material layer and the low refractive index material layer is not particularly limited as long as a dielectric multi-layer film in which these material layers are laminated is formed. For example, a dielectric multi-layer film in which the high refractive index material layer and the low refractive index material layer are alternately laminated can be directly formed on the above-described base material by a CVD method, a vacuum deposition method, a sputtering method, an ion-assisted deposition method, an ion plating method, a radical-assisted sputtering method, an ion beam sputtering method, or the like. The ion-assisted deposition method, the ion plating method, or the radical-assisted sputtering method is preferable because a high-quality film in which the optical film thickness of the multilayer film to be obtained is unlikely to change depending on the environment is obtained. The ion-assisted deposition method is more preferable because the obtained optical filter has less warping.

In a case where a near infrared wavelength to be blocked is defined as λ (nm), a thickness of each layer of the high refractive index material layer and the low refractive index material layer is usually preferably an optical thickness of 0.1λ to 0.5λ, except for two layers adjacent to the base material and the outermost layer. In a case where the optical thickness is within this range, the product (n×d) of the refractive index (n) and the film thickness (d) is substantially the same value as the optical film thickness calculated at λ/4 and the thicknesses of the high refractive index material layer and the low refractive index material layer, and due to the relationship between the optical characteristics of reflection and refraction, blocking and/or transmission of specific wavelengths tends to be easily controlled.

In addition, the total number of the high refractive index material layers and the low refractive index material layers laminated in the dielectric multi-layer film is 5 to 60, preferably 10 to 50.

Furthermore, in a case where the warping occurs in the base material in a case where the dielectric multi-layer film is formed, in order to eliminate the warping, methods such as a method of forming the dielectric multi-layer film on both sides of the base material, and a method of irradiating the surface of the base material, on which the dielectric multi-layer film has been formed, with electromagnetic waves such as ultraviolet rays can be used. In a case of the irradiation with electromagnetic waves, the base material may be irradiated during the formation of the dielectric multi-layer film, or may be separately irradiated after the formation.

<Visual-Line Tracking System 1>

Figure 2:
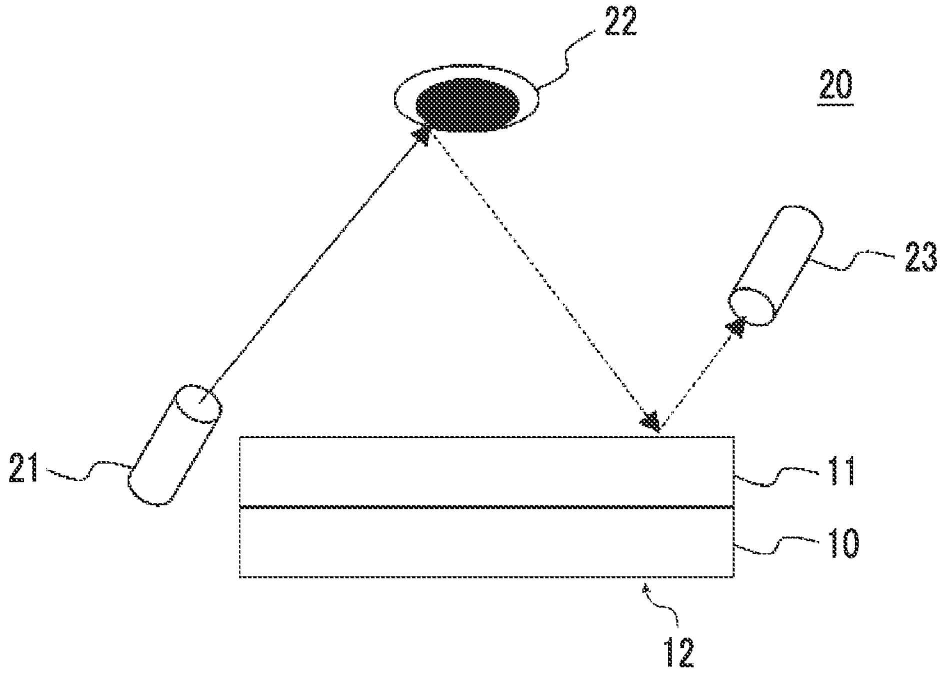
FIG. 2 is a diagram showing an example of a visual-line tracking system using the laminate according to the embodiment of the present invention.

The laminate according to the embodiment of the present invention can be adopted to a visual-line tracking system. FIG. 2 conceptually shows an example in which the laminate according to the embodiment of the present invention is adopted to the visual-line tracking system.

A visual-line tracking system 20 shown in FIG. 2 includes a near infrared light source 21, a laminate 12, and a near infrared light detector 23. In a case where the laminate 12 is disposed so as to face an eyeball 22 of a user, a near infrared light reflecting layer 11 side is disposed so as to face the eyeball 22. In addition, the near infrared light source 21 can emit near infrared light toward the eyeball 22 of the user, and is disposed at a position where the near infrared light source 21 can emit near infrared light so that near infrared light reflected by the eyeball 22 enters the laminate 12. In addition, the near infrared light detector 23 is disposed at a position where the near infrared light reflected by the eyeball 22 and reflected by the laminate 12 can be detected.

In such a visual-line tracking system 20, near infrared light is emitted from the near infrared light source 21 toward the eyeball 22 of the user. The near infrared light reflected by the eyeball 22 is reflected by the near infrared light reflecting layer 11 of the laminate 12, and is detected by the near infrared light detector 23. The visual-line tracking system 20 analyzes the detected image of the eyeball 22 and detects a visual-line direction of the user.

As a method of detecting the visual-line direction by the above-described system, a detection method described in WO2016/157485A can be used. In this method, the visual line is detected by irradiating the eyeball with infrared light and analyzing the reflected images of non-visible light reflected at a cornea anterior surface, crystalline lens anterior and posterior surfaces, and a cornea posterior surface. These reflected images are called Purkinje's images.

Figure 8:
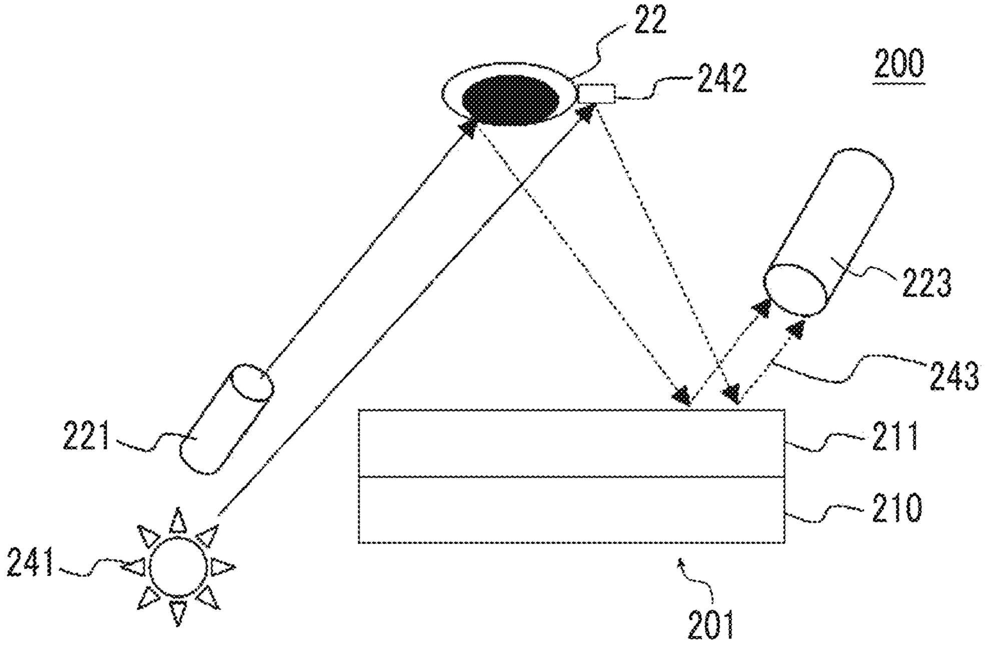
FIG. 8 PRIOR ART
FIG. 8 is a diagram showing an example of a visual-line tracking system using a laminate of the related art.

Here, in a laminate of the related art, in which a near infrared light reflecting layer and a near infrared light absorbing layer are laminated, is used in the visual-line tracking system, as a visual-line tracking system 200 shown in FIG. 8, in which a laminate 201 of the related art including a near infrared light reflecting layer 211 and a near infrared light absorbing layer 210 is used, in a case where infrared light from an external light 241 is reflected by a part 242 other than the eyeball 22 and enters the laminate 201, the near infrared light reflecting layer 211 of the laminate 201 may reflect this infrared light, and the reflected light 243 may be detected by a near infrared light detector 223. Therefore, since noise increases and clearness of the reflected light deteriorates, accuracy of the visual line tracking deteriorates.

On the other hand, in the visual-line tracking system 20 using the laminate according to the embodiment of the present invention, since $\Delta\theta_1 \leq 3°$ and $R_2/R_1 \leq 0.1$ are satisfied, it is possible to reduce the reflection intensity of the infrared light which has been reflected from a part other than the eyeball 22 and entered, and a component to be the noise can be reduced. Accordingly, the clearness of the reflected light is excellent, and the accuracy of the visual-line tracking can be increased.

<Visual-Line Tracking System 2>

Figure 3:
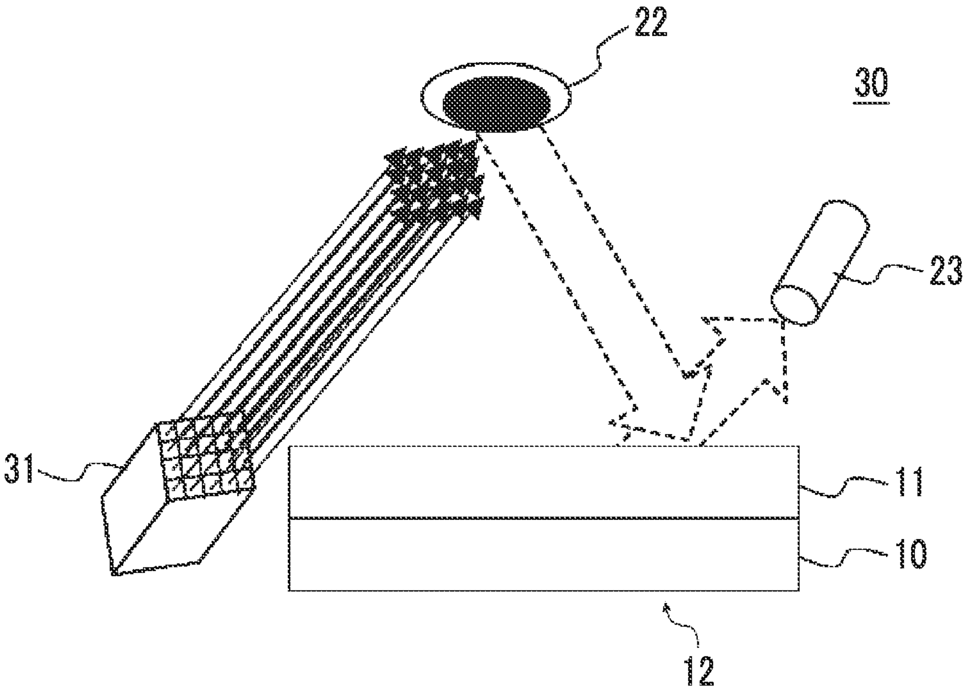
FIG. 3 is a diagram showing another example of the visual-line tracking system using the laminate according to the embodiment of the present invention.

FIG. 3 conceptually shows another example in which the laminate according to the embodiment of the present invention is adopted to the visual-line tracking system.

A visual-line tracking system 30 shown in FIG. 3 has the same configuration as the visual-line tracking system 20, except that an array of near infrared light sources 31 is provided instead of the near infrared light source 21. Descriptions of structures same as those in the visual-line tracking system 20 are omitted.

The near infrared light sources 31 has a plurality of light sources arranged in an array, and near infrared light of a plurality of points, 20 points in FIG. 3, is emitted to the eyeball 22 of the user. The near infrared light reflected by the eyeball 22 is reflected by the near infrared light reflecting layer 11 of the laminate 12, and is detected by the near infrared light detector 23. The visual-line direction of the user is detected from a change in pattern of the plurality of detected near infrared light. Compared to the image analysis using the Purkinje's image mentioned in the above-described visual-line tracking system 1, this method has the advantage that calculation load is smaller and the visual-line tracking can be performed at high speed.

<Visual-Line Tracking System 3>

Figure 4:
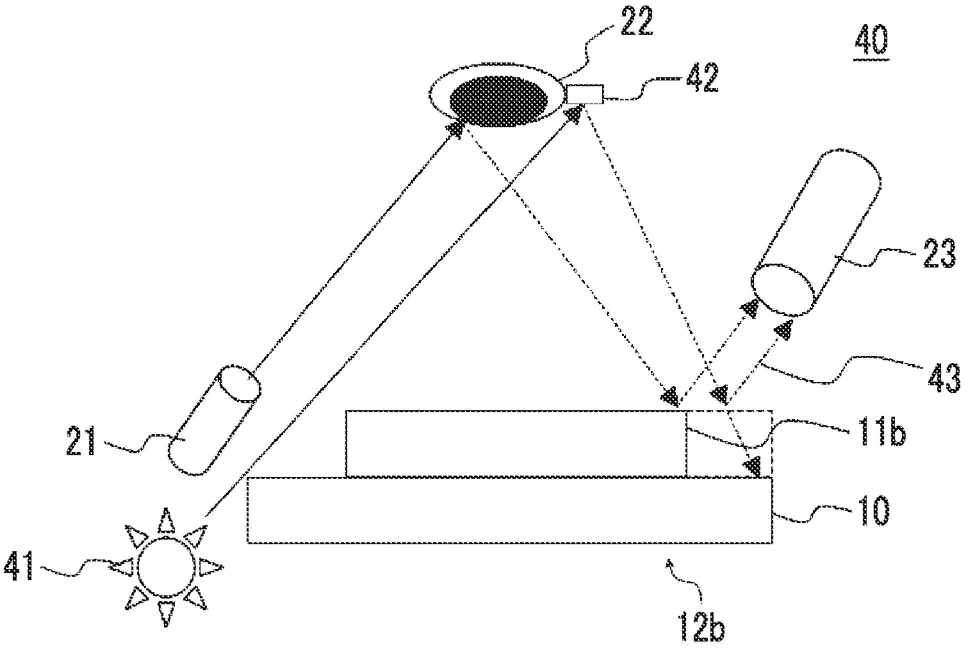
FIG. 4 is a diagram showing still another example of the visual-line tracking system using the laminate according to the embodiment of the present invention.

FIG. 4 conceptually shows still another example in which the laminate according to the embodiment of the present invention is adopted to the visual-line tracking system.

A visual-line tracking system 40 shown in FIG. 4 has the same configuration as the visual-line tracking system 20, except that a laminate 12*b* is provided instead of the laminate 12. Descriptions of structures same as those in the visual-line tracking system 20 are omitted.

The laminate 12*b* is the same as the laminate 12, except that an area of the near infrared light reflecting layer 11*b* in a plan view is smaller than an area of the near infrared light absorbing layer 10. In the example shown in FIG. 4, the near infrared light reflecting layer 11*b* and the near infrared light absorbing layer 10 are laminated such that the center positions thereof in a plan view match each other, and in a case where the laminate 12*b* is viewed from the near infrared light reflecting layer 11*b* side, the near infrared light absorbing layer 10 is exposed at an end part (periphery part) of the laminate 12*b*.

In such a visual-line tracking system 40, near infrared light is emitted from the near infrared light source 21 toward the eyeball 22 of the user. The near infrared light reflected by the eyeball 22 is reflected by the near infrared light reflecting layer 11*b* of the laminate 12*b*, and is detected by the near infrared light detector 23. On the other hand, near infrared light reflected at a position 42 other than the eyeball from an external light source 41 may be reflected by the near infrared light reflecting layer 11*b* and detected as a noise light 43 by the near infrared light detector 23. It has been found that, in a case where the area of the near infrared light reflecting layer 11*b* is reduced in order to reduce the noise light 43, the noise light 43 is absorbed by the near infrared light absorbing layer 10, and the reflected light from the eyeball 22, which is a signal, can be efficiently detected.

The area of the near infrared light absorbing layer 10 used in the above-described visual-line tracking system 40 is preferably 3 $cm^2$ or more and preferably 70 $cm^2$ or less. In a case where the area of the near infrared light absorbing layer 10 is too small, the noise reduction effect decreases, and in a case where the area thereof is too large, the size of the visual-line tracking system increases, which is not preferable.

In addition, the area of the near infrared light reflecting layer 11*b* used in the above-described visual-line tracking system 40 is preferably 80%, more preferably 70%, and particularly preferably 60% with respect to the area of the near infrared light absorbing layer 10. In a case where the area of the near infrared light reflecting layer 11*b* is too large, noise increases as described above, and in a case where the area thereof is too small, the reflected light from the eyeball, which is a signal, cannot be sufficiently reflected, which is not preferable.

<Visual-Line Tracking System 4>

Figure 5:
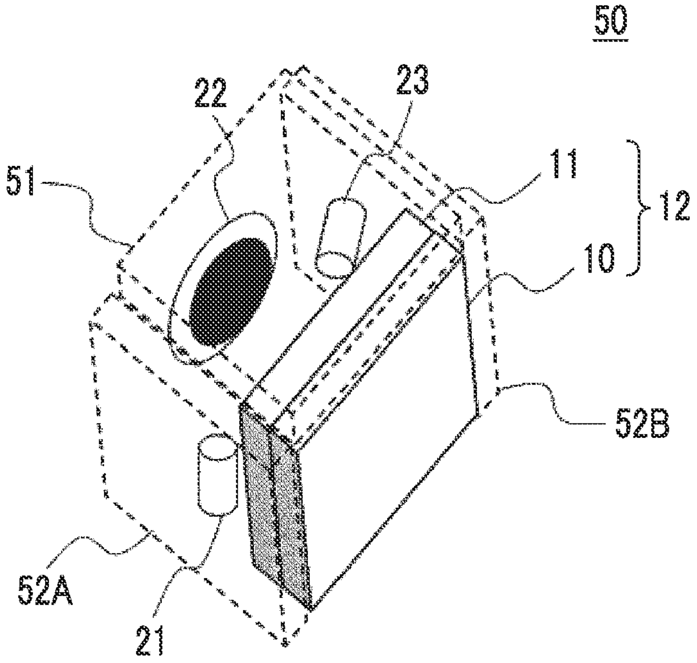
FIG. 5 is a diagram showing an example of the visual-line tracking system including an infrared light absorbing layer used in the present invention at a position different from the laminate according to the embodiment of the present invention.

FIG. 5 conceptually shows still another example in which the laminate according to the embodiment of the present invention is adopted to the visual-line tracking system.

A visual-line tracking system 50 shown in FIG. 5 has the same configuration as the visual-line tracking system 20, except that near infrared light absorbing layers 51, 52A, and 52B are further provided around the laminate 12. Descriptions of structures same as those in the visual-line tracking system 20 are omitted.

The visual-line tracking system 50 includes the near infrared light absorbing layers 51, 52A, and 52B which are arranged around the laminate 12 so as to be erected from the near infrared light reflecting layer 11 side of the laminate 12 toward the user side. That is, the near infrared light absorbing layers 51, 52A, and 52B are arranged so as to surround a space between the laminate 12 and the eyeball 22 of the user.

By arranging the near infrared light absorbing layers 51, 52A, and 52B in portions other than the laminate 12 as in the visual-line tracking system 50, near infrared light derived from an external light source, for example, sunlight, can be prevented from entering between the eyeball 22 and the near infrared light reflecting layer 11, and the near infrared rays detected as noise by the near infrared light detector 23 can be reduced.

As the near infrared light absorbing layers 51, 52A, and 52B, a near infrared light absorbing layer same as the near infrared light absorbing layer 10 can be used.

As a place other than the laminate, where the near infrared light absorbing layers are arranged, it is preferable to arrange the near infrared light absorbing layers in an upper portion (position of the near infrared light absorbing layer 51) or a portion (position of the near infrared light absorbing layers 52A and 52B) positioned in a side surface portion of the eyeball 22 of the user, from the viewpoint of preventing near infrared light derived from the external light source from an upper portion or a side surface.

The visual-line tracking system according to the embodiment of the present invention uses near infrared light as detection light for visual-line detection. A wavelength of the near infrared light is not limited, and may be any near infrared light in the wavelength range described above.

Here, in order to suppress the detection light for the visual-line detection from being visually recognized by the user, the wavelength of the infrared light is preferably 800 nm or more and more preferably 900 nm or more. In addition, in order to increase transmittance in the eye, the wavelength of the infrared light is preferably 1100 nm or less and more preferably 1000 nm or less.

As the near infrared light source, a known near infrared light source of the related art, which can emit the near infrared light having the above-described wavelength, such as a laser light source and a light-emitting diode (LED) light source, can be appropriately used.

As the near infrared light detector, a known near infrared light detector of the related art, which can detect the near infrared rays having the above-described wavelength, such as a CMOS sensor and a charge coupled device (CCD) sensor, can be appropriately used.

<Head-Mounted Display (HMD)>

By incorporating the above-described visual-line tracking system in an HMD, it is possible to provide an HMD having a highly accurate visual-line tracking function and excellent image visibility.

An image display device of the HMD is not limited, and various known image display devices used in the HMD can be used.

Examples thereof include a liquid crystal display, an organic electroluminescent display, and a micro LED display.

<Other Applications>

In addition to the above-described applications, the laminate according to the embodiment of the present invention can also be applied to, for example, a device equipped with a sensing device using near infrared light, such as a wearable terminal capable of pulse wave detection and a smartphone capable of face authentication.

EXAMPLES

Hereinafter, the present invention will be described in detail based on Examples. The materials, reagents, amounts and proportions of substances, operations, and the like described in the following examples can be appropriately modified as long as the gist of the present invention is maintained. Therefore, the present invention is not limited to Examples.

Example 1

<Production of Near Infrared Light Absorbing Layer 1>

7.6 g of copper (II) sulfate pentahydrate, 21.0 g of cyclopentanone, and 0.15 g of MEGAFACE F-781 (manufactured by DIC Corporation) (surfactant) were mixed to produce a composition (A). A zirconia 45 mL vessel was filled with 5 g of the composition (A) and zirconia beads (20 g) having an average particle diameter of 2 mm, and a milling treatment was performed for 50 minutes at a rotation speed of 300 rpm using a planetary ball mill P-7 classic line manufactured by Frisch GmbH to produce an infrared absorbing dispersion. 0.80 g of poly(methyl methacrylate) (manufactured by Sigma-Aldrich Co. LLC., Mw: ~15,000) was added to 4.2 g of the obtained infrared absorbing dispersion, and the mixture was further stirred to dissolve the poly(methyl methacrylate) to obtain an infrared absorbing liquid composition 1. The obtained infrared absorbing liquid composition 1 was drop-cast on a glass substrate, and the cyclopentanone was distilled off at room temperature to obtain a near infrared light absorbing layer 1.

Even in a case where a triacetylcellulose (TAC) film (manufactured by FUJIFILM Corporation, TD80UL) was used instead of the above-described glass substrate, the near infrared light absorbing layer 1 was obtained in the same manner, and from the viewpoint of handleability, the near infrared light absorbing layer 1 produced on the TAC film was used for a production of a laminate, which will be described later.

<Visible Light-Transmitting Property>

Using an ultraviolet-visible-near infrared analyzing photometer ("UV-3100", manufactured by Shimadzu Corporation), a transmittance T(550) [%] of the produced near infrared light absorbing layer 1 at a wavelength of 550 nm was measured and evaluated according to the following standard.

A: $T(550) \geq 95\%$

B: $80\% \leq T(550) < 95\%$

C: $60\% \leq T(550) < 80\%$

D: $T(550) < 60\%$

<Transmittance Wavelength Dependency>

Using an ultraviolet-visible-near infrared analyzing photometer ("UV-3100", manufactured by Shimadzu Corporation), transmittances T(400), T(550), and T(700) [%] of the produced near infrared light absorbing layer 1 at wavelengths of 400 nm, 550 nm, and 700 nm were measured, and T(400)/T(550) and T(700)/T(550) were calculated. From the viewpoint of preventing coloration of the film, each refractive index was preferably 0.6 to 1.2, more preferably 0.8 to 1.1, and particularly preferably 0.9 to 1.

<Haze>

Using a haze meter NDH2000 (manufactured by NIPPON DENSHOKU INDUSTRIES Co., Ltd.), a haze value H of the near infrared light absorbing layer 1 was measured and evaluated according to the following standard.

A: $H < 0.5\%$

B: $0.5\% \leq H < 0.8\%$

C: $0.8\% \leq H < 1\%$

D: $1\% \leq H$

<Near Infrared Light Shielding Property>

An absorbance $Abs = -\log(I_1/I_0)$ was obtained in which a laser beam with a wavelength of 980 nm was incident on the near infrared light absorbing layer 1, and an intensity $I_1$ of transmitted laser beam and an intensity $I_0$ of laser beam before incidence were measured using a laser power meter LP-1 (manufactured by Sanwa Electric Instrument Co., Ltd.), and evaluated according to the following standard.

A: $Abs > 1$

B: $0.7 < Abs \leq 1$

C: $0.4 < Abs \leq 0.7$

D: $Abs \leq 0.4$

<Production of Near Infrared Light Reflecting Layer 1>

As a liquid crystal composition for forming a near infrared light reflecting layer 1, the following composition A-1 was prepared.

| Composition A-1 | |
|---|---|
| Liquid crystal compound L-1 | 100.00 parts by mass |
| Chiral agent C-1 | 1.93 parts by mass |
| Polymerization initiator (manufactured by BASF, Irgacure OXE01) | 1.00 part by mass |
| Leveling agent T-1 | 0.08 parts by mass |
| Cyclopentanone | 900.00 parts by mass |

Liquid crystal compound L-1

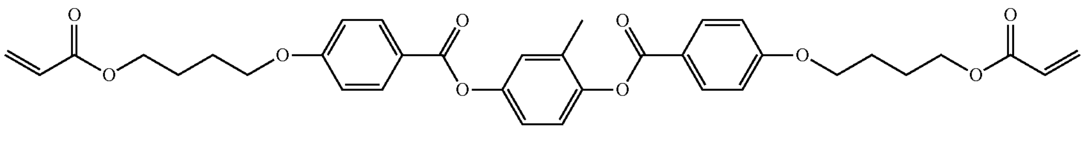

84%

-continued

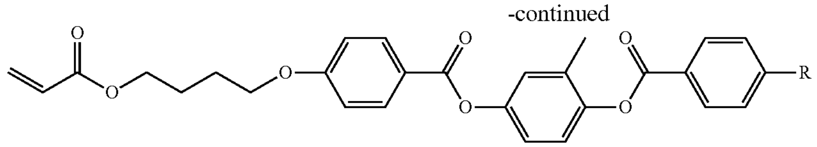

14%

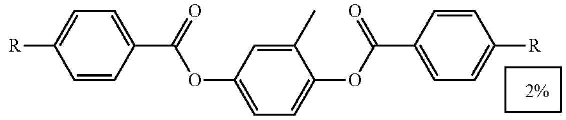

2%

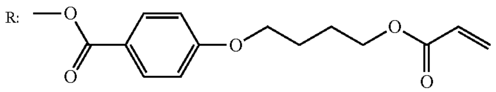

Chiral agent C-1

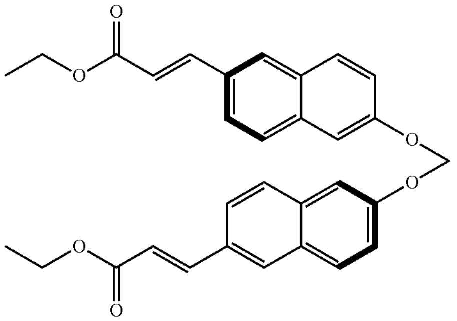

Leveling agent T-1

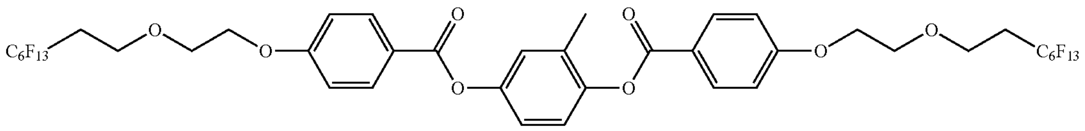

<Production of Cholesteric Liquid Crystal Layer A>

As an alignment layer, Poval PVA-103 manufactured by Kuraray Co., Ltd. was dissolved in pure water, a concentration was adjusted such that a dry film thickness was 0.5 μm, and a PET base was bar-coated with the solution and then heated at 100 °C for 5 minutes. Further, a surface thereof was subjected to a rubbing treatment to form an alignment layer.

Subsequently, the alignment layer was coated with the above-described composition A-1, the coating film was heated on a hot plate to 80 °C and then was irradiated with ultraviolet rays having a wavelength of 365 nm at an irradiation amount of 300 mJ/cm$^2$ using a high-pressure mercury lamp in a nitrogen atmosphere at 80 °C to fix the alignment of the liquid crystal compound, thereby forming a cholesteric liquid crystal layer.

Subsequently, the composition A-1 was applied to the cholesteric liquid crystal layer in an overlapping manner, heated, cooled, and then cured with ultraviolet rays under the same conditions as described above. In this way, the application was repeated until the total thickness of the cholesteric liquid crystal layer formed reached a desired film thickness, thereby producing a cholesteric liquid crystal layer A.

In a case where a cross section of the coating layer was observed with a scanning electron microscope (SEM), the number of helical pitches in a normal direction (thickness direction) with respect to a main surface was 19 pitches.

Using an ultraviolet-visible-near infrared analyzing photometer ("UV-3100", manufactured by Shimadzu Corporation), a reflection spectrum of the produced liquid crystal layer A was measured. From the obtained reflection spectrum, the selective reflection central wavelength was 980 nm.

<Production of Cholesteric Liquid Crystal Layer B>

A composition B-1 was prepared by changing the chiral agent C-1 to a chiral agent C-2 in the composition A-1.

In the same manner as in the production of the cholesteric liquid crystal layer A, the above-described composition B-1 was applied onto the alignment layer so as to have a desired film thickness, thereby forming a cholesteric liquid crystal layer B.

Chiral agent C-2

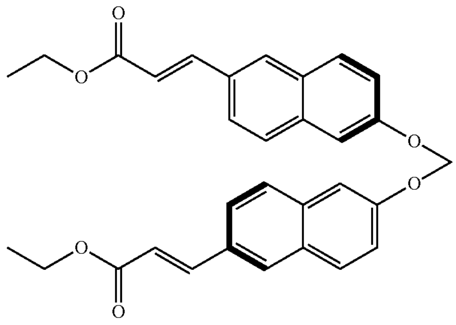

In the cholesteric liquid crystal layer B, the number of helical pitches was 19 pitches as in the cholesteric liquid crystal layer A, but a helical direction of the cholesteric liquid crystal layer B was opposite to that of the cholesteric liquid crystal layer A. The selective reflection central wavelength was 980 nm.

<Preparation of UV Adhesive Composition>

The following UV adhesive composition was prepared.

UV Adhesive Composition

CEL2021P (manufactured by Daicel Corporation) 70 parts by mass 1,4-Butanediol diglycidyl ether 20 parts by mass 2-Ethylhexyl glycidyl ether 10 parts by mass CPI-100P shown below 2.25 parts by mass

CPI-100P

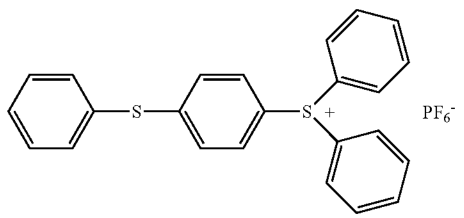

<Bonding of Cholesteric Liquid Crystal Layers A and B Using UV Adhesive>

A temporary support was bonded to the liquid crystal layer side of the cholesteric liquid crystal layer A. In this example, MASTACK AS3-304 manufactured by FUJIMORI KOGYO CO., LTD. was used as the temporary support.

Next, the PET base and the alignment film were peeled off to expose an interface of the cholesteric liquid crystal layer A on the alignment film side. The interface on the alignment film side and the liquid crystal layer side of the cholesteric liquid crystal layer B were bonded to each other using the above-described UV adhesive, and the temporary support was peeled off to produce a near infrared light reflecting layer 1.

<Production of Laminate>

The absorbing layer side of the near infrared light absorbing layer 1 and the liquid crystal layer side of the near infrared light reflecting layer 1 were bonded to each other using the above-described UV adhesive, and the PET base and the alignment film of the near infrared light reflecting layer 1 were peeled off to produce a laminate.

<Reflection Performance>

An intensity of reflected light at each reflection angle was measured by the above-described method. A half-width $\Delta\theta_1$ of a peak of reflected light having the highest intensity was calculated from the obtained intensity distribution of the reflected light at each reflection angle, and evaluated according to the following standard.

A: $\Delta\theta_1 \leq 1°$

B: $1° < \Delta\theta_1 \leq 2°$

C: $2° < \Delta\theta_1 \leq 3°$

D: $3° < \Delta\theta_1$

In addition, a reflection intensity of reflected light having the highest intensity was set to $R_1$ and a reflection intensity of reflected light having the second highest intensity was set to $R_2$, and a ratio $R_2/R_1$ of intensity of reflected light was calculated and evaluated according to the following standard.

A: $R_2/R_1 \leq 0.01$

B: $0.01 < R_2/R_1 \leq 0.05$

C: $0.05 < R_2/R_1 \leq 0.1$

D: $0.1 < R_2/R_1$

<Visible Light-Transmitting Property>

A visible light transmittance of the laminate was measured by the same method as the measurement of the visible light transmittance in the near infrared light absorbing layer 1, and evaluated according to the following standard.

A: $T(550) \geq 95\%$

B: $80\% \leq T(550) < 95\%$

C: $60\% \leq T(550) < 80\%$

D: $T(550) < 60\%$

Example 2

<Production of Near Infrared Light Absorbing Layer 2>

A near infrared light absorbing layer 2 was obtained in the same manner as in the production of the near infrared light absorbing layer 1, except that 11.2 g of copper trifluoromethanesulfonate was used instead of 7.6 g of copper (II) sulfate pentahydrate.

The visible light-transmitting property, the transmittance wavelength dependency, the haze, and the near infrared light shielding property of the produced near infrared light absorbing layer 2 were measured and evaluated in the same manner as in Example 1.

<Production of Laminate>

A laminate was produced in the same manner as in Example 1, except that the above-described near infrared light absorbing layer 1 was changed to the near infrared light absorbing layer 2.

The reflection performance and the visible light-transmitting property of the produced laminate were measured and evaluated in the same manner as in Example 1.

Example 3

<Production of Near Infrared Light Absorbing Layer 3>

A near infrared light absorbing layer 3 was produced according to the method described in paragraphs [0079] to [0082] of JP2020-129121A.

The visible light-transmitting property, the transmittance wavelength dependency, the haze, and the near infrared light shielding property of the produced near infrared light absorbing layer 3 were measured and evaluated in the same manner as in Example 1.

<Production of Laminate>

A laminate was produced in the same manner as in Example 1, except that the above-described near infrared light absorbing layer 1 was changed to the near infrared light absorbing layer 3.

The reflection performance and the visible light-transmitting property of the produced laminate were measured and evaluated in the same manner as in Example 1.

Example 6

<Production of Near Infrared Light Absorbing Layer 6>

3.6 g of a copper complex (B) and 130 mg of a colorant (1) were added to 21.0 g of cyclopentanone, and dissolved by stirring. 5.4 g of poly(methyl methacrylate) (manufactured by Sigma-Aldrich Co. LLC., Mw: ~15,000) was added thereto, and the mixture was further stirred to dissolve poly(methyl methacrylate). The obtained solution was filtered using a 0.45 μm PTFE filter to obtain an infrared absorbing liquid composition 6. The obtained infrared absorbing liquid composition 6 was drop-cast on a glass substrate, and the cyclopentanone was distilled off at room temperature to obtain a near infrared light absorbing layer 6.

Even in a case where a TAC film (manufactured by FUJIFILM Corporation, TD80UL) was used instead of the above-described glass substrate, the near infrared light absorbing layer 6 was obtained in the same manner, and from the viewpoint of handleability, the near infrared light absorbing layer 6 produced on the TAC film was used for a production of a laminate, which will be described later.

Colorant (1)

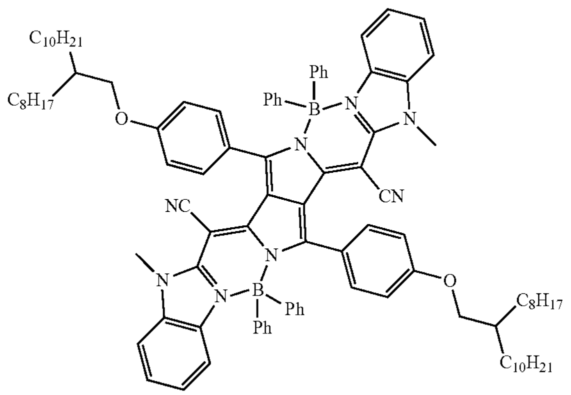

The visible light-transmitting property, the transmittance wavelength dependency, the haze, and the near infrared light shielding property of the produced near infrared light absorbing layer 6 were measured and evaluated in the same manner as in Example 1.

<Production of Laminate>

A laminate was produced in the same manner as in Example 1, except that the above-described near infrared light absorbing layer 1 was changed to the near infrared light absorbing layer 6.

The reflection performance and the visible light-transmitting property of the produced laminate were measured and evaluated in the same manner as in Example 1.

Example 7

<Production of Near Infrared Light Absorbing Layer 7>

A near infrared light absorbing layer 7 was obtained in the same manner as the near infrared light absorbing layer 6, except that 280 mg of a colorant (2) was used instead of 130 mg of the colorant (1).

Colorant (2)

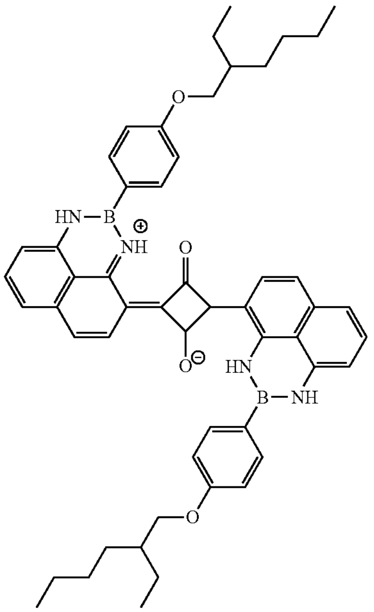

The visible light-transmitting property, the transmittance wavelength dependency, the haze, and the near infrared light shielding property of the produced near infrared light absorbing layer 7 were measured and evaluated in the same manner as in Example 1.

<Production of Laminate>

A laminate was produced in the same manner as in Example 1, except that the above-described near infrared light absorbing layer 1 was changed to the near infrared light absorbing layer 7.

The reflection performance and the visible light-transmitting property of the produced laminate were measured and evaluated in the same manner as in Example 1.

Example 8

<Production of Near Infrared Light Absorbing Layer 8>

A near infrared light absorbing layer 8 was obtained in the same manner as the near infrared light absorbing layer 6, except that 180 mg of a colorant (3) was used instead of 130 mg of the colorant (1).

Colorant (3)

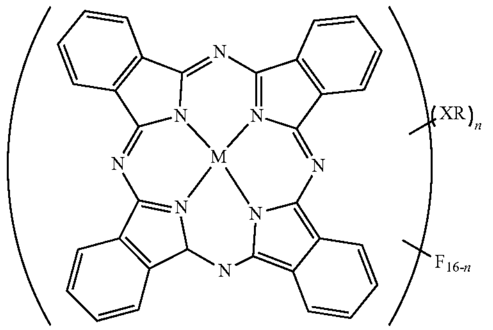

M = Cu, Zn, VO, $SnCl_2$ etc

X = O, S etc

The visible light-transmitting property, the transmittance wavelength dependency, the haze, and the near infrared light shielding property of the produced near infrared light absorbing layer 8 were measured and evaluated in the same manner as in Example 1.

<Production of Laminate>

A laminate was produced in the same manner as in Example 1, except that the above-described near infrared light absorbing layer 1 was changed to the near infrared light absorbing layer 8.

The reflection performance and the visible light-transmitting property of the produced laminate were measured and evaluated in the same manner as in Example 1.

Example 9

<Production of Near Infrared Light Absorbing Layer 9>

3.6 g of a copper complex (B), 90 mg of the colorant (1), and 120 mg of the colorant (3) were added to 21.0 g of cyclopentanone, and dissolved by stirring. 5.4 g of poly (methyl methacrylate) (manufactured by Sigma-Aldrich Co. LLC., Mw: ~15,000) was added thereto, and the mixture was further stirred to dissolve poly(methyl methacrylate). The obtained solution was filtered using a 0.45 μm PTFE filter to obtain an infrared absorbing liquid composition 9. The obtained infrared absorbing liquid composition 9 was drop-cast on a glass substrate, and the cyclopentanone was distilled off at room temperature to obtain a near infrared light absorbing layer 9.

Even in a case where a TAC film (manufactured by FUJIFILM Corporation, TD80UL) was used instead of the above-described glass substrate, the near infrared light absorbing layer 9 was obtained in the same manner, and from the viewpoint of handleability, the near infrared light absorbing layer 9 produced on the TAC film was used for a production of a laminate, which will be described later.

The visible light-transmitting property, the transmittance wavelength dependency, the haze, and the near infrared light shielding property of the produced near infrared light absorbing layer 9 were measured and evaluated in the same manner as in Example 1.

<Production of Laminate>

A laminate was produced in the same manner as in Example 1, except that the above-described near infrared light absorbing layer 1 was changed to the near infrared light absorbing layer 9.

The reflection performance and the visible light-transmitting property of the produced laminate were measured and evaluated in the same manner as in Example 1.

Example 10

<Production of Near Infrared Light Reflecting Layer 2>

A near infrared light reflecting layer 2 was produced in the same manner as the near infrared light reflecting layer 1, except that the cholesteric liquid crystal layer A and the cholesteric liquid crystal layer B were laminated by a plasma treatment described later.

<Lamination of Cholesteric Liquid Crystal Layers A and B by Plasma Treatment>

A temporary support was bonded to the liquid crystal layer side of the cholesteric liquid crystal layer A. In this example, MASTACK AS3-304 manufactured by FUJIMORI KOGYO CO., LTD. was used as the temporary support.

Next, the PET base and the alignment film were peeled off to expose an interface of the cholesteric liquid crystal layer A on the alignment film side. A silicon oxide layer (SiOx layer) was formed on both the interface on the alignment film side and the liquid crystal surface of the cholesteric liquid crystal layer B. The method of forming the silicon oxide layer is not limited, but vacuum deposition is preferably exemplified. In this example, the formation of the silicon oxide layer was performed using a vapor deposition device (model number: ULEYES) manufactured by ULVAC, Inc. As a vapor deposition source, $SiO_2$ powder was used. A thickness of the silicon oxide layer is not limited, but is preferably 50 nm or less. Also in this example, the thickness of the silicon oxide film was set to 50 nm or less.

Next, a plasma treatment was performed on both of the formed silicon oxide films, the formed silicon oxide layers were bonded to each other at 120 °C, and the temporary support was peeled off to produce a near infrared light reflecting layer 2.

<Production of Laminate>

A laminate was produced in the same manner as in Example 9, except that the near infrared light reflecting layer 1 was changed to the near infrared light reflecting layer 2.

The reflection performance and the visible light-transmitting property of the produced laminate were measured and evaluated in the same manner as in Example 1.

Example 11

<Production of Near Infrared Light Reflecting Layer 3>

100 parts of 8-methyl-8-methoxycarbonyltetracyclo [4.4.0.12,5.17,10]dodec-3-ene represented by Formula (a) (hereinafter, also referred to as "DNM"), 18 parts of 1-hexene (molecular weight modifier), and 300 parts of toluene (solvent for a ring-opening polymerization reaction) were charged into a nitrogen-substituted reaction container, and this solution was heated to 80 °C. Next, 0.2 parts of a toluene solution of triethylaluminum (concentration: 0.6 mol/liter) and 0.9 parts of a toluene solution of methanol-modified tungsten hexachloride (concentration: 0.025 mol/liter) were added as a polymerization catalyst to the solution in the reaction container, and this solution was heated and stirred at 80 °C for 3 hours to carry out a ring-opening polymerization reaction to obtain a ring-opening polymer solution. A polymerization conversion rate in the polymerization reaction was 97%.

(a)

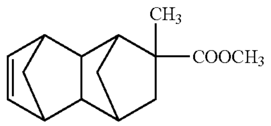

1,000 parts of the ring-opening polymer solution thus obtained was charged into an autoclave, 0.12 parts of $RuHCl(CO)[P(C_6H_5)_3]_3$ was added to the ring-opening polymer solution, and the mixture was heated and stirred for 3 hours under conditions of a hydrogen gas pressure of 100 kg/cm$^2$ and a reaction temperature of 165 °C to carry out a hydrogenation reaction.

After the obtained reaction solution (hydrogenated polymer solution) was cooled, the hydrogen gas was released. The reaction solution was poured into a large amount of methanol to separate and collect a coagulated product, and the coagulated product was dried to obtain a hydrogenated polymer (hereinafter, also referred to as "resin A"). The obtained resin A had a number-average molecular weight (Mn) of 32,000, a weight-average molecular weight (Mw) of 137,000, and a glass transition temperature (Tg) of 165 °C.

Methylene chloride was added to the resin A in the container to obtain a solution having a resin concentration of 20% by weight. Next, the obtained solution was cast on a smooth glass plate using a film applicator and dried at 20 °C for 8 hours, and then the formed coating film was peeled off from the glass plate. The peeled coating film was further dried under reduced pressure at 100 °C for 8 hours to obtain a resin substrate.

Subsequently, on one surface of the obtained resin substrate, a multi-layer deposited film [film obtained by alternately laminating a silica layer ($SiO_2$; film thickness: 83 to 199 nm) and a titania layer ($TiO_2$; film thickness: 101 to 125 nm); number of laminated layers: 20] which reflected near infrared light was formed at a vapor deposition temperature of 100 °C, and on the other surface of the resin substrate, a multi-layer deposited film [film obtained by alternately laminating a silica layer ($SiO_2$; film thickness: 77 to 189 nm) and a titania layer ($TiO_2$; film thickness: 84 to 118 nm); number of laminated layers: 26] which reflected near infrared ray was formed at a vapor deposition temperature of 100 °C, thereby obtaining a near infrared light reflecting layer 3 having a thickness of 0.105 mm. In each of the above-described multi-layer deposited films, the silica layer and the titania layer were alternately laminated in the order of the titania layer, the silica layer, the titania layer, . . . , the silica layer, the titania layer, and the silica layer from the resin substrate side, and the silica layer was used as the outermost layer of the reflective layer.

<Production of Laminate>

A laminate was produced in the same manner as in Example 9, except that the above-described near infrared light reflecting layer 1 was changed to the near infrared light reflecting layer 3.

The reflection performance and the visible light-transmitting property of the produced laminate were measured and evaluated in the same manner as in Example 1.

Comparative Example 1

<Production of Near Infrared Light Absorbing Layer 10>

The following compositional components were mixed with a stirrer according to paragraph [0279] of JP2013-151675A to prepare an infrared absorbing liquid composition 10. Using the infrared absorbing liquid composition 10, a near infrared light absorbing layer 10 was produced according to the method described in [0302].

YMF-02 (18.5% by mass dispersion liquid of cesium tungsten oxide manufactured by SUMITOMO METAL MINING CO., LTD. ($Cs_{0.33}WO_3$ (average dispersion particle diameter: 800 nm or less; maximal absorption wavelength (λmax)=1550 to 1650 nm (film)) 108.3 parts by mass KAYARAD DPHA (manufactured by Nippon Kayaku Co., Ltd.) (polymerizable compound) 5.8 parts by mass ACRYBASE FF-187 (copolymer of benzyl methacrylate and methacrylic acid manufactured by Fujikura Kasei Co., Ltd. (molar ratio of repeating unit=70:30; acid value=110 mgKOH/g)) (binder) 5.8 parts by mass Propylene glycol monomethyl ether acetate (PGMEA) 48.3 parts by mass MEGAFACE F-781 (manufactured by DIC Corporation) (surfactant) 0.3 parts by mass The visible light-transmitting property, the transmittance wavelength dependency, the haze, and the near infrared light shielding property of the produced near infrared light absorbing layer 10 were measured and evaluated in the same manner as in Example 1.

<Production of Laminate>

A laminate was produced in the same manner as in Example 1, except that the above-described near infrared light absorbing layer 1 was changed to the near infrared light absorbing layer 10.

The reflection performance and the visible light-transmitting property of the produced laminate were measured and evaluated in the same manner as in Example 1.

Comparative Example 5

<Production of Near Infrared Light Reflecting Layer 4>

A near infrared light reflecting layer 4 was produced in the same manner as the near infrared light reflecting layer 1, except that the cholesteric liquid crystal layer A and the cholesteric liquid crystal layer B were laminated using a pressure sensitive adhesive having a thickness of 25 μm (manufactured by Soken Chemical & Engineering Co., Ltd., trade name: SK-2057).

<Production of Laminate>

A laminate was prepared in the same manner as in Example 9, except that the near infrared light reflecting layer 1 was changed to the near infrared light reflecting layer 4.

The reflection performance and the visible light-transmitting property of the produced laminate were measured and evaluated in the same manner as in Example 1.

Comparative Example 6

<Production of Near Infrared Light Reflecting Layer 5>

A near infrared light reflecting layer 5 was produced in the same manner as the near infrared light reflecting layer 1, except that the thickness was adjusted such that the number of helical pitches of the cholesteric liquid crystal layer B was 6.

<Production of Laminate>

A laminate was prepared in the same manner as in Example 9, except that the near infrared light reflecting layer 1 was changed to the near infrared light reflecting layer 5.

The reflection performance and the visible light-transmitting property of the produced laminate were measured and evaluated in the same manner as in Example 1.

<Evaluation>

<Image Visibility>

The produced laminate was attached to the outermost surface of an iPad (registered trademark) manufactured by Apple Inc., an image was displayed and visually observed, and evaluation was performed according to the following standard.

A: visibility of the image was very good.

B: image was slightly blurred or had a tint, but it was not a noticeable level.

C: image was a little blurry or had some tint, but it was at a level that did not occur a practical problem.

D: image was clearly blurred or clearly colored, and it was at an unacceptable level.

<Reflected Light Clearness>

A mirror-finished aluminum plate was bonded to the near infrared light absorbing layer side of the produced laminate using a pressure sensitive adhesive, and the near infrared light reflecting layer side was irradiated with laser beam with a wavelength of 980 nm at an incidence angle of 45°. The reflected light was visualized with an infrared sensor card Q-11-R (manufactured by LUMITEK), and the appearance of the reflected light was visually observed and evaluated according to the following standard.

A: reflected light was only one point, and the shape thereof was sharp.

B: although the reflected light was only one point, the shape thereof was slightly blurred.

C: a plurality of clearly separated reflected light were observed, or the reflected light was blurred and could not be clearly observed.

The results of each evaluation are shown in Table 1 below. In addition, Table 2 shows the performance of the produced near infrared light absorbing layer.

TABLE 1

| | Configuration of laminate | | Evaluation result | | Performance of laminate | | |
|---|---|---|---|---|---|---|---|
| | | | | | Reflection performance | | |
| | Near infrared light absorbing layer | Near infrared light reflecting layer | Image visibility | Reflected light clearness | $\Delta\theta_1$ | $R_2/R_1$ | Visible light-transmitting property |
| Example 1 | Near infrared light absorbing layer 1 | Near infrared light reflecting layer 1 | C | B | B | B | C |
| Example 2 | Near infrared light absorbing layer 2 | Near infrared light reflecting layer 1 | C | B | B | B | C |
| Example 3 | Near infrared light absorbing layer 3 | Near infrared light reflecting layer 1 | C | B | B | B | C |
| Example 6 | Near infrared light absorbing layer 6 | Near infrared light reflecting layer 1 | B | B | B | B | B |
| Example 7 | Near infrared light absorbing layer 7 | Near infrared light reflecting layer 1 | B | B | B | B | B |
| Example 8 | Near infrared light absorbing layer 8 | Near infrared light reflecting layer 1 | A | B | B | B | B |
| Example 9 | Near infrared light absorbing layer 9 | Near infrared light reflecting layer 1 | A | B | B | B | B |
| Example 10 | Near infrared light absorbing layer 9 | Near infrared light reflecting layer 2 | A | A | A | A | B |
| Example 11 | Near infrared light absorbing layer 9 | Near infrared light reflecting layer 3 | A | B | C | C | B |
| Comparative Example 1 | Near infrared light absorbing layer 10 | Near infrared light reflecting layer 1 | D | B | B | B | D |
| Comparative Example 5 | Near infrared light absorbing layer 9 | Near infrared light reflecting layer 4 | A | C | D | C | B |
| Comparative Example 6 | Near infrared light absorbing layer 9 | Near infrared light reflecting layer 5 | A | C | B | D | B |

TABLE 2

| | Visible light-transmitting property | Transmittance wavelength dependency | | | Near infrared light shielding property |
|---|---|---|---|---|---|
| | | T(440)/T(550) | T(700)/T(550) | Haze | |
| Near infrared light absorbing layer 1 | B | 1 | 0.6 | C | C |
| Near infrared light absorbing layer 2 | B | 1 | 0.6 | B | C |
| Near infrared light absorbing layer 3 | B | 1 | 0.6 | B | C |
| Near infrared light absorbing layer 6 | B | 1 | 0.8 | A | A |
| Near infrared light absorbing layer 7 | B | 1 | 0.9 | A | A |
| Near infrared light absorbing layer 8 | B | 1 | 0.9 | A | A |
| Near infrared light absorbing layer 9 | B | 1 | 0.9 | A | A |
| Near infrared light absorbing layer 10 | C | 1 | 0.6 | D | C |

From the results in Table 1, it was found that the laminates of Examples 1 to 11 according to the embodiment of the present invention had favorable image visibility and reflected light clearness, could perform highly accurate visual-line tracking without impairing the visibility of the image, and could be suitably used for an HMD equipped with a visual-line tracking system.

From Comparative Example 1, it was found that, in a case where the visible light-transmitting property of the laminate was lower than 60%, the image visibility was deteriorated.

In Comparative Examples 3 and 4, it was found that the transmittance dependence of the near infrared light absorbing layer was poor, and the image visibility of the laminate was deteriorated.

In Comparative Examples 5 and 6, it was found that the reflection performance of the laminate was poor, and the reflected light clearness was deteriorated.

EXPLANATION OF REFERENCES

10: near infrared light absorbing layer
11: near infrared light reflecting layer
12: laminate
20, 30, 40, 50: visual-line tracking system
21: near infrared light source
22: eyeball of user
23: near infrared light detector
31: array of near infrared light sources
41: external light source
42: portion other than eyeball of user
43: noise light
51: near infrared light absorbing layer disposed in upper portion of eyeball of user
52A, 52B: near infrared light absorbing layer disposed in side surface portion of eyeball of user

What is claimed is:

1. A visual-line tracking system comprising:

a laminate including a near infrared light reflecting layer and a near infrared light absorbing layer;

a near infrared light source; and a near infrared light detector, wherein a visible light transmittance of the laminate is 60% or more, the near infrared light absorbing layer contains a near infrared absorbing compound, the laminate satisfies the following expressions (1) and (2), and at least a part of near infrared rays irradiated from the near infrared light source to an eyeball of a user is reflected by the eyeball of the user, at least a part of the reflected near infrared rays is reflected by the near infrared light reflecting layer, and the near infrared light detector detects the reflected near infrared rays, $$\Delta\theta_1 \le 3^\circ \quad (1)$$

$$R^2/R_1 \le 0.1 \quad (2)$$

$\Delta\theta_1$: a half-width of a peak of near infrared reflected light with a highest intensity, which is obtained from a measurement result of an angle dependence of intensity of near infrared light reflected by the near infrared light reflecting layer, $R_1$: a highest intensity of near infrared reflected light among peaks of the near infrared reflected light obtained from the measurement result of the angle dependence of the intensity of near infrared light reflected by the near infrared light reflecting layer, $R_2$: a second highest intensity of near infrared reflected light among the peaks of the near infrared reflected light obtained from the measurement result of the angle dependence of the intensity of near infrared light reflected by the near infrared light reflecting layer.

2. The visual-line tracking system according to claim 1, wherein near infrared light sources are arranged in an array.

3. A head-mounted display comprising:

the visual-line tracking system according to claim 2.

4. The visual-line tracking system according to claim 1, wherein an area of the near infrared light reflecting layer is smaller than an area of the near infrared light absorbing layer.

5. A head-mounted display comprising:

the visual-line tracking system according to claim 4.

6. The visual-line tracking system according to claim 1, further comprising:

a near infrared light absorbing layer at a position different from the near infrared light absorbing layer.

7. A head-mounted display comprising:

the visual-line tracking system according to claim 1.

* * * * *